(12) United States Patent
Onishi et al.

(10) Patent No.: US 8,525,882 B2
(45) Date of Patent: Sep. 3, 2013

(54) VEHICLE-MOUNTED CAMERA

(75) Inventors: Hiroaki Onishi, Kyoto (JP); Koji Hashimoto, Kyoto (JP); Mikio Ichiura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 718 days.

(21) Appl. No.: 12/816,060

(22) Filed: Jun. 15, 2010

(65) Prior Publication Data
US 2010/0321497 A1 Dec. 23, 2010

(30) Foreign Application Priority Data

| | | |
|---|---|---|
| Jun. 17, 2009 | (JP) | 2009-144015 |
| Jul. 14, 2009 | (JP) | 2009-165864 |
| Jul. 27, 2009 | (JP) | 2009-174138 |
| Aug. 24, 2009 | (JP) | 2009-193362 |
| Oct. 22, 2009 | (JP) | 2009-243148 |
| May 17, 2010 | (JP) | 2010-113038 |

(51) Int. Cl.
*H04N 7/18* (2006.01)

(52) U.S. Cl.
USPC .......................................... 348/148; 348/149

(58) Field of Classification Search
USPC ................. 345/7; 348/148, 149; 362/465, 362/494
See application file for complete search history.

(56) References Cited

U.S. PATENT DOCUMENTS

| | | | |
|---|---|---|---|
| 7,199,767 B2* | 4/2007 | Spero | 345/7 |
| 7,914,187 B2* | 3/2011 | Higgins-Luthman et al. | 362/465 |
| 8,040,376 B2 | 10/2011 | Yamada et al. | |
| 2004/0218041 A1 | 11/2004 | Yagi | |
| 2006/0098093 A1* | 5/2006 | Hahn et al. | 348/148 |
| 2007/0051646 A1 | 3/2007 | Imoto et al. | |
| 2007/0263400 A1* | 11/2007 | Walser et al. | 362/494 |
| 2008/0029701 A1* | 2/2008 | Onozawa et al. | 250/332 |
| 2011/0176003 A1* | 7/2011 | Higgins-Luthman et al. | 348/148 |
| 2012/0182425 A1* | 7/2012 | Higgins-Luthman et al. | 348/148 |

FOREIGN PATENT DOCUMENTS

| | | |
|---|---|---|
| CN | 1535867 | 10/2004 |
| CN | 10108004 | 11/2007 |
| JP | 2000-6854 | 1/2000 |
| JP | 2006-332288 | 12/2006 |
| JP | 2007-62670 | 3/2007 |
| JP | 2009-107393 | 5/2009 |

* cited by examiner

*Primary Examiner* — Quang N Nguyen
(74) *Attorney, Agent, or Firm* — Hamre, Schumann, Mueller & Larson, P.C.

(57) ABSTRACT

A vehicle-mounted camera includes a camera module mounted on a vehicle such as an automobile, and further includes a mirror occupying at least a part of an imaging range of the camera module. The camera module may be arranged to face a forward vehicle traveling direction. The mirror may occupy a lower part of the vertical direction in the imaging range. The camera module and the mirror may both be disposed in the vehicle.

24 Claims, 45 Drawing Sheets

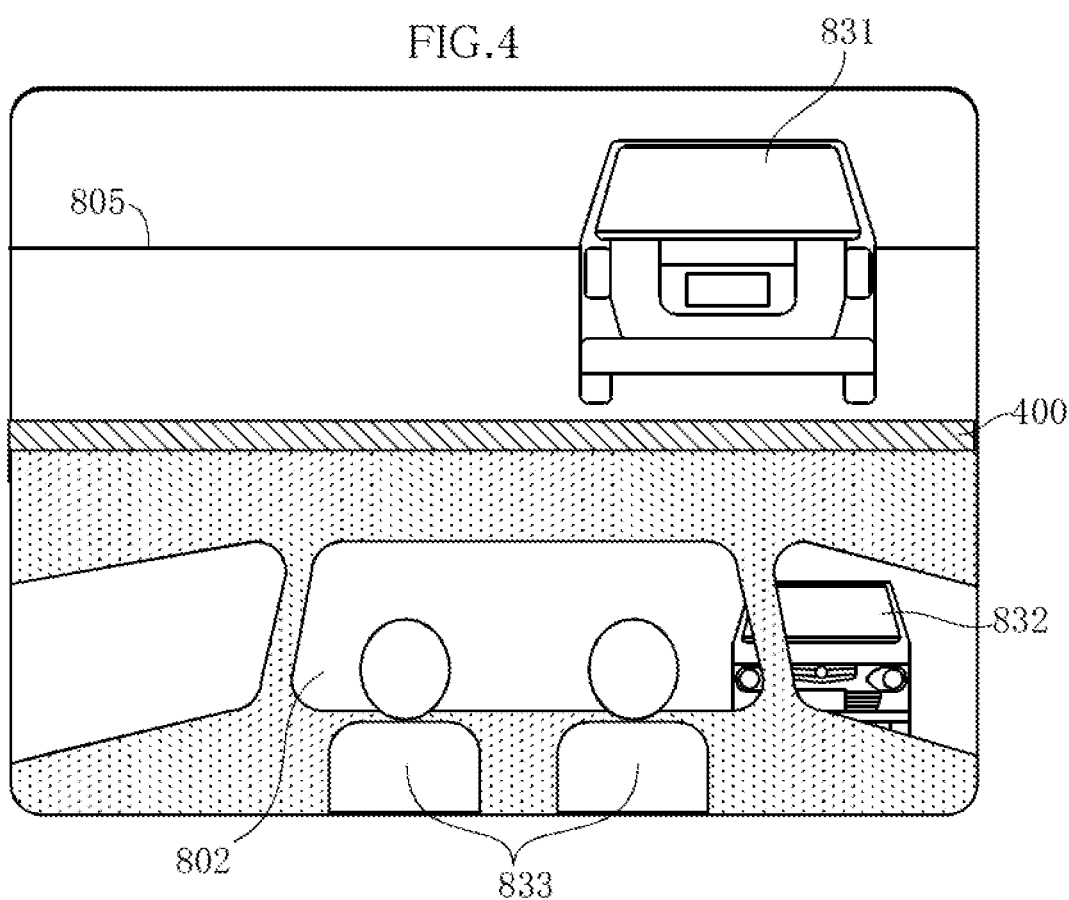
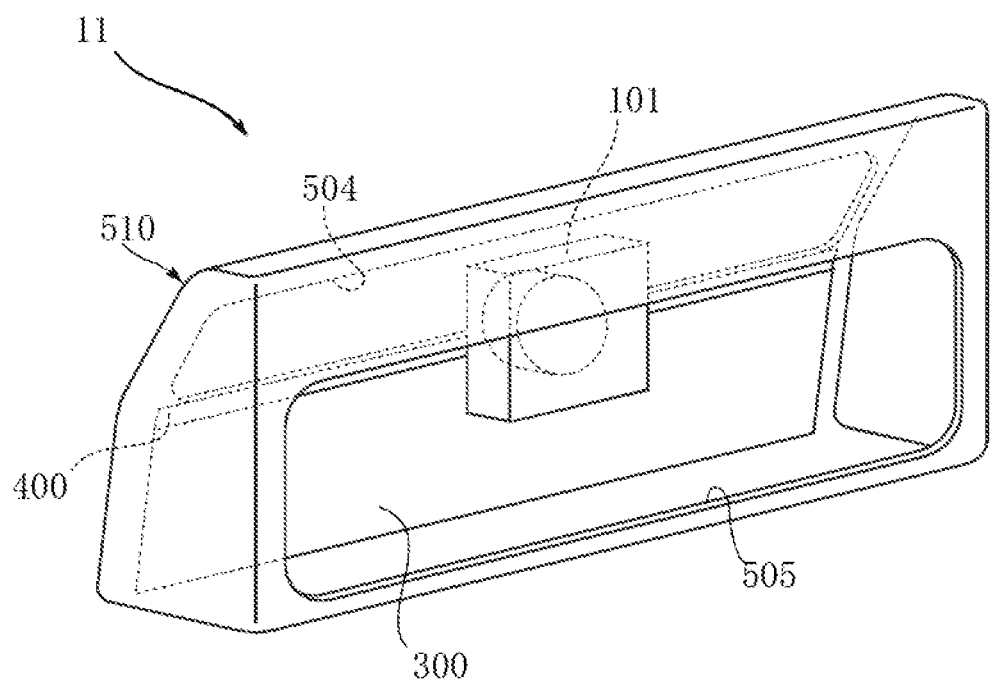

VEHICLE-MOUNTED CAMERA

BACKGROUND OF THE INVENTION

1. Field of the Invention

The present invention relates to a vehicle-mounted camera that is mounted on a vehicle such as a passenger vehicle.

2. Description of the Related Art

A vehicle-mounted camera that uses a camera module mounted on a vehicle is being widely used for recording the traveling state of the vehicle or assisting the driving of the vehicle. The vehicle-mounted camera 901 shown in FIG. 68 is used as a so-called drive recorder (for instance, refer to Japanese Patent Application Laid-open No. 2000-6854). The vehicle-mounted camera 901 films the forward vehicle traveling direction with a camera module mounted on the front window or the room mirror of the vehicle 801. The video picture of the vehicle-mounted camera 901 is recorded for a predetermined length of time from several seconds to several minutes retroactively, for instance, from the time that a motor vehicle accident occurs, or recorded continuously. Meanwhile, the vehicle-mounted camera 902 shown in FIG. 68 is used as a so-called rear-view monitor (for instance, refer to Japanese Patent Application Laid-open No. 2007-62670). The vehicle-mounted camera 902 is mounted in the vicinity, for example, of the license plate (not shown) of the vehicle 801, and captures the area immediately behind the vehicle 801. The video picture of the vehicle-mounted camera 902 is displayed, for example, on a monitor that is installed in the instrument panel. The driver confirms the existence of obstacles by visually observing the video picture of the monitor upon reversing the vehicle 801.

Nevertheless, demands are increasing for the vehicle-mounted camera 901 that is used as a drive recorder to film the interior of the vehicle 801 in addition to the status of the forward direction of the vehicle 801. For example, a case requiring the filming of the interior of a vehicle would be when a passenger engages in any wrongful act within a taxi. In order to meet the foregoing demands, it was necessary to provide a separate vehicle-mounted camera for filming the interior of the vehicle in addition to the vehicle-mounted camera 901 for filming the front of the vehicle.

Moreover, the vehicle-mounted camera 902 must be installed outside the vehicle in order to capture an area that is difficult for the driver to see. Thus, the vehicle-mounted camera 902 is constantly exposed to rain and wind. Thus, sufficient waterproofing measures must be taken for the vehicle-mounted camera 902. Moreover, connected to the vehicle-mounted camera 902 is a cable (not shown) for supplying power and sending the screen images. This cable needs to be dragged from the outside of the vehicle where the vehicle-mounted camera 902 is installed to the inside of the vehicle where the monitor and battery are disposed. The laying of the cable across the outside of the vehicle and the inside of the vehicle is troublesome and not easy.

A compact camera module is widely used as means for filming, for example, the status of the inside or the outside of a passenger vehicle. FIG. 69 shows an example of a conventional camera module (for instance, refer to Japanese Patent Application Laid-open No. 2006-332288). The camera module 903 shown in FIG. 69 has an imaging element (not shown) built into the case 911, and comprises a lens 912 for forming an image in the imaging element. Moreover, the case 911 is provided with a plurality of LED modules 913. Each LED module 913 is configured, for example, by an LED chip (not shown) being built into a translucent head. As shown in FIG. 69, the plurality of LED modules 913 are disposed so that their respective main emitting directions basically coincide with the optical axis of the lens 912. According to this kind of configuration, the plurality of LED modules 913 are able to illuminate the imaging area of the camera module 903 so as to compensate for the insufficient brightness of the screen image.

Nevertheless, in order to adequately capture the state within the vehicle, a lens 912 with a relatively wide viewing angle; for example, a viewing angle of 120 degrees or more, is used. The illumination angle that the respective LED modules 913 are able to brightly illuminate is relatively narrow relative to the foregoing wide viewing angle. Thus, there were cases where the plurality of LED modules 913 would illuminate only a part of the imaging area of the camera module 903. Under the foregoing circumstances, for example, there were inconveniences in that the center portion of the captured screen image would become extremely bright and cause a phenomenon known as a so-called whiteout condition, while the peripheral portion would become dark.

Contrarily, for a camera module that is used for filming afar, a lens with a relatively narrow viewing angle; for instance, a viewing angle of approximately 10 degrees, is used in substitute for the lens 912. Here, there were cases where sufficient light would not reach the imaging area in the distance with standard LED modules, whereby filming at night or in dark places was impossible.

A relatively compact camera module is widely used as means for filming the status behind the passenger vehicle. This camera module is often installed outside of the vehicle, and is required to comprise sufficient waterproof functions (for instance, refer to Japanese Patent Application Laid-open No. 2009-107393). FIG. 70 shows an example of a conventional camera module. The camera module 904 shown in FIG. 70 has a lens unit 914 and an inner case 919 built into the case 922. The inner case 919 is mounted with an imaging element 921 via a substrate 920. The lens unit 914 is structured so that two lenses 917, 918 and a diaphragm 916 are retained with a holder 915. The lens unit 914 and the inner case 919 are mutually connected, for example, with a screw structure not shown so as to cause their mutual positions to be adjustable. The focusing of the imaging element 921 of the lens unit 914 is thereby enabled. The case 922 is of a block construction having an upper case 923 and a lower case 924. A waterproof O-ring 925 is provided between the upper case 923 and the lower case 924. The camera module 904 is thereby equipped with a certain level of waterproof function enabling it to be used by being mounted outside the vehicle.

Nevertheless, upon manufacturing the camera module 904, foremost, it is necessary to focus the lens unit 914 and the imaging element 921. This process is performed, for example, by confirming the screen image of the test pattern that is displayed by the imaging element 921 while screwing the lens unit 914 into the inner case 919. Subsequently, the focused lens unit 914 and the inner case 919 are built into the case 922. In order to properly exhibit the waterproof function of the camera module 904, the insertion of the O-ring 925 must be performed carefully. Accordingly, when manufacturing the camera module 904, it is necessary to pay attention to the focusing of the lens unit 914 and the imaging element 921, and the assembly of the case 922 with the insertion of the O-ring 925, and these two troublesome processes are required. This contributed to the deterioration in the production efficiency and aggravated the production yield of the camera module 904.

Moreover, the camera module 904 must be equipped with a cable or the like in order to supply power to the imaging element 921 and externally send the image signal received from the imaging element 921. For example, the lower case 924 is provided with a cable hole through which the cable is inserted. When using the camera module 904 by mounting it outside the vehicle, waterproofing treatment must be performed between the cable hole and the cable. As this kind of waterproofing treatment, for example, if sealing is performed using resin, it is necessary to manage the temperature of the resin material and check its application status, and the process of filling resin was not an easy process.

SUMMARY OF THE INVENTION

The present invention has been proposed in view of the foregoing circumstances. Thus, an object of this invention is to provide a vehicle-mounted camera capable of capturing a plurality of imaging objects and simplifying the waterproofing measures.

Another object of this invention is to provide a camera module capable of capturing the imaging area with a more uniform brightness.

Still another object of this invention is to provide a camera module capable of capturing the imaging area by illuminating the imaging area with a more favorable illuminating light.

Yet another object of this invention is to provide a camera module capable of efficiently performing the focusing process and the waterproof treatment process.

Yet another object of this invention is to provide a waterproof cable penetration part and a camera module capable of appropriately waterproofing the space between the cable and the case.

The vehicle-mounted camera provided by the present invention comprises an imaging device mounted on a vehicle, and a reflector occupying at least a part of an imaging range of the imaging device.

In a preferred embodiment of the present invention, the imaging device and the reflector are both disposed in a vehicle.

In a preferred embodiment of the present invention, the imaging device is facing a forward vehicle traveling direction, and the reflector occupies a lower part of a vertical direction in an imaging range of the imaging device.

In a preferred embodiment of the present invention, the vehicle-mounted camera further comprises a light shield adjacent to an upper part of a vertical direction of the reflector in an imaging range of the imaging device.

In a preferred embodiment of the present invention, a range, outside a vehicle, in a reverse vehicle traveling direction is reflected on the reflector.

In a preferred embodiment of the present invention, a passenger seated in a backseat in a vehicle is reflected on the reflector.

In a preferred embodiment of the present invention, the vehicle-mounted camera further comprises a transparent bracket disposed in a forward vehicle traveling direction relative to the imaging device to face the imaging device, and the reflector is mounted on the transparent bracket.

In a preferred embodiment of the present invention, the transparent bracket includes a facing part that squarely faces the imaging device in a forward vehicle direction, a circuit part that extends from a forward vehicle direction relative to the imaging device to a reverse vehicle direction via an upper part of a vertical direction, and a posterior part that is positioned in a reverse vehicle direction relative to the imaging device and supports the imaging device.

In a preferred embodiment of the present invention, the transparent bracket is provided with a light shield adjacent to an upper part of a vertical direction of the reflector.

In a preferred embodiment of the present invention, the reflector assumes a position occupying a lower part of a vertical direction in an imaging range of the imaging device, and a position withdrawn from the imaging device.

In a preferred embodiment of the present invention, the imaging device is disposed in a vehicle, and the reflector is disposed outside a vehicle.

In a preferred embodiment of the present invention, the imaging device is disposed on an inner side of a vehicle window in a position of imaging outside a vehicle through the window, and the reflector is disposed at a position facing the imaging device, with the window interposed therebetween.

In a preferred embodiment of the present invention, an underside portion of the vehicle and the road are reflected on the reflector.

In a preferred embodiment of the present invention, the imaging device is a portable phone equipped with an imaging function.

In a preferred embodiment of the present invention, the imaging device is disposed at a position that is spaced from a rear vehicle window in a forward vehicle traveling direction, and the reflector is mounted on an outer side of the window.

In a preferred embodiment of the present invention, the imaging device comprises an imaging element, and an illuminator for illuminating at least a part of an imaging area that is imaged by the imaging element, and the illuminator is a camera module having a plurality of LED modules each including an LED chip, the LED modules having mutually different main emitting directions.

In a preferred embodiment of the present invention, the vehicle-mounted camera further comprises a case for housing the imaging element, and the case is provided with a plurality of retention holes for retaining the plurality of LED modules.

In a preferred embodiment of the present invention, each of the LED modules comprises a translucent head with the LED chip built therein, and a lead that establishes electrical continuity with the LED chip, each of the retention holes includes a head housing part which houses the translucent head and in which a depth direction thereof coincides with the main emitting direction of the LED module, and the lead housing part includes a root part which is connected to the head housing part and which extends in the main emitting direction, and a tip part that extends in a direction that is different from the direction extended from the root part.

In a preferred embodiment of the present invention, the lead housing part has a cross-section size that is smaller than that of the translucent head.

In a preferred embodiment of the present invention, the lead housing part has a cross-section size that is larger than that of the translucent head.

In a preferred embodiment of the present invention, the vehicle-mounted camera further comprises a substrate mounted with the plurality of LED modules, and each of the tip parts of the plurality of retention holes is orthogonal to the substrate.

In a preferred embodiment of the present invention, the vehicle-mounted camera further comprises a case which houses the imaging element and to which are formed a plurality of mounting surfaces facing mutually different directions, and a flexible wiring substrate having flexibility in which the plurality of LED modules are mounted on a surface thereof, and the flexible wiring substrate is sandwiched between the plurality of mounting surfaces and the LED module.

In a preferred embodiment of the present invention, the vehicle-mounted camera further comprises a substrate having a plurality of mounting surfaces facing mutually different directions, and the plurality of LED modules are mounted on the plurality of mounting surfaces.

In a preferred embodiment of the present invention, the imaging device comprises an imaging element, and an illuminator for illuminating at least a part of an imaging area that is imaged by the imaging element, and the illuminator is a camera module having an LED module, and an optical component for bending light from the LED module.

In a preferred embodiment of the present invention, the vehicle-mounted camera further comprises a wide-angle lens for converging light at the imaging element, and the optical component is a wide angle prism for widening the angle of light from the LED module.

In a preferred embodiment of the present invention, the wide angle prism is formed so that light from the LED module is bent more as the prism recedes from the wide-angle lens in a first direction that is orthogonal to an optical axis direction of the wide-angle lens.

In a preferred embodiment of the present invention, the wide angle prism is formed so that light from the LED module is bent more at the edge than the center in a second direction that is orthogonal to the optical axis direction and the first direction.

In a preferred embodiment of the present invention, the vehicle-mounted camera further comprises a narrow-angle lens for converging light at the imaging element, and the optical component includes a convex lens part for narrowing the angle of light from the LED module.

In a preferred embodiment of the present invention, each of the convex lens parts is formed to overlap with any one of the plurality of LED modules in an optical axis directional vision of the narrow-angle lens.

The other features and advantages of the present invention will become clearer based on the ensuing detailed explanation with reference to the attached drawings.

BRIEF DESCRIPTION OF THE DRAWINGS

FIG. 4 is an example of a video picture taken by the vehicle-mounted camera according to the first embodiment of the present invention;

FIG. 5 is a perspective view showing a modified example of the vehicle-mounted camera according to the first embodiment of the present invention;

DETAILED DESCRIPTION OF THE PREFERRED EMBODIMENTS

Figure 1:
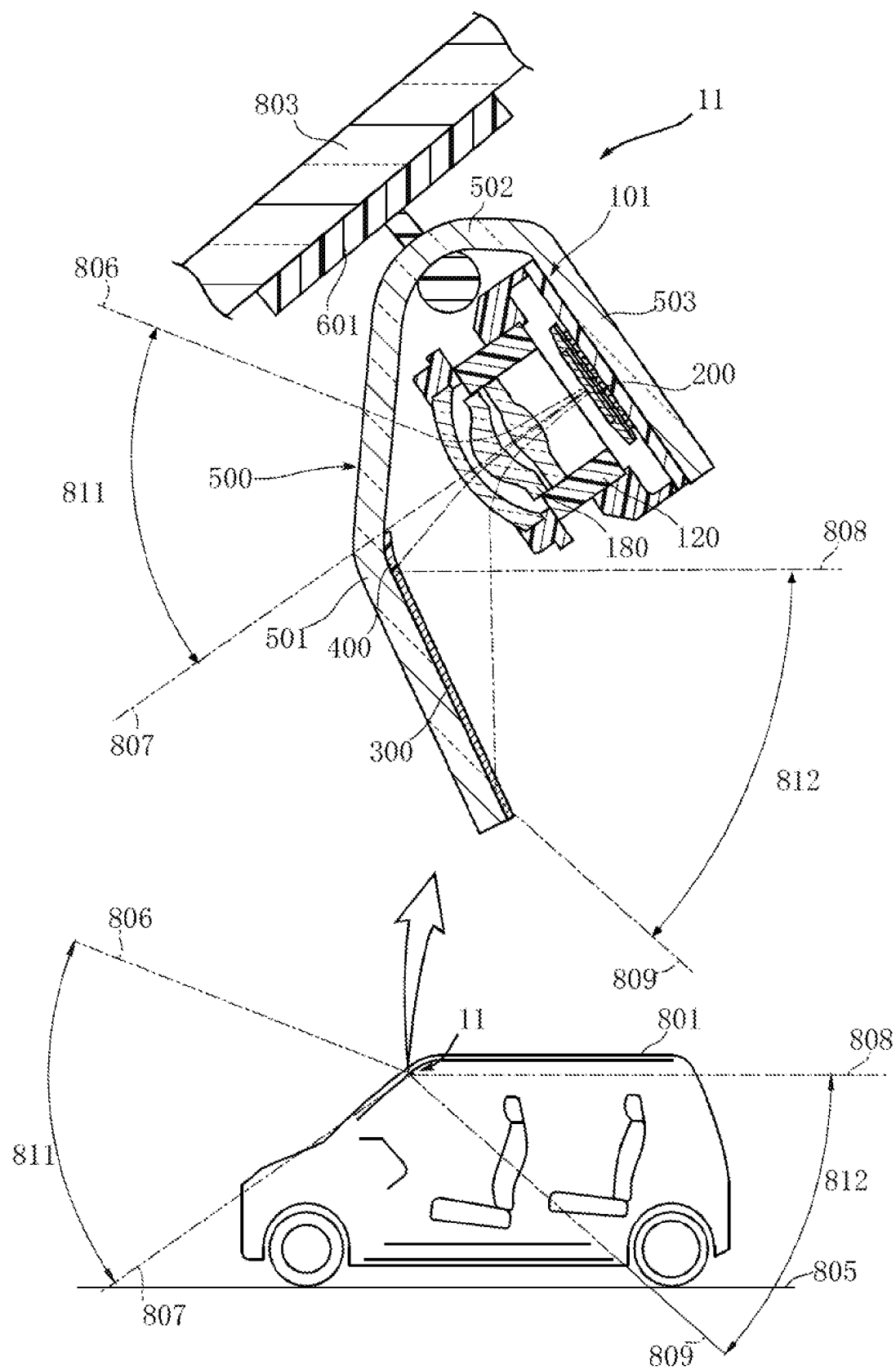
FIG. 1 is an overall configuration diagram and a cross section showing the vehicle-mounted camera according to the first embodiment of the present invention.
Figure 2:
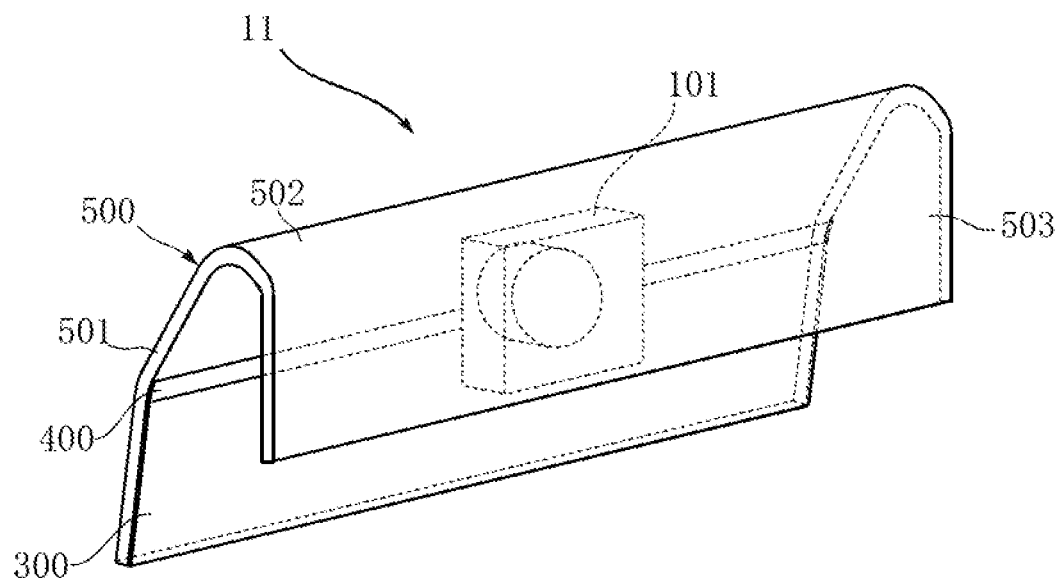
FIG. 2 is a perspective view showing the vehicle-mounted camera according to the first embodiment of the present invention.
Figure 3:
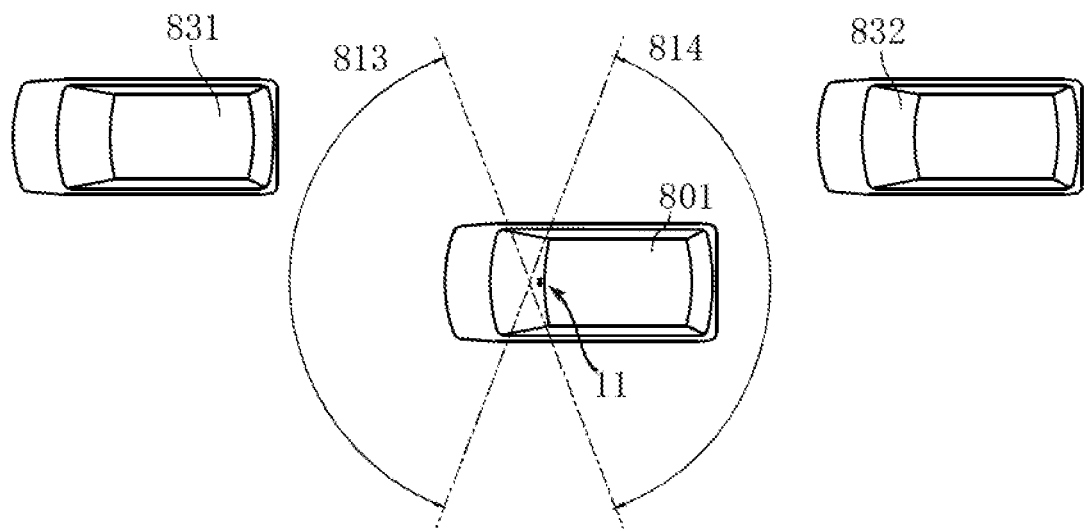
FIG. 3 is a plan view showing the vehicle-mounted camera according to the first embodiment of the present invention.

FIG. 1 to FIG. 3 show a vehicle-mounted camera according to the first embodiment of the present invention. The vehicle-mounted camera 11 of this embodiment comprises a camera module 101, a mirror 300, and a transparent bracket 500. The vehicle-mounted camera 11 is configured as a so-called drive recorder, and is able to simultaneously record the status in front of the traveling direction and the in-vehicle status of the vehicle 801.

The camera module 101 is an example of imaging devices referred to in the present invention and comprises, as shown in FIG. 1, a case 120, a lens unit 180, and an imaging element 200. The case 120 houses the lens unit 180 and the imaging element 200, and is formed from black plastic or the like. The lens unit 180 is configured by a plurality of lenses being overlapped, and performs image formation of light from a relatively wide visual field in the imaging element 200. The imaging element 200 is configured from a CCD element or the like, and is equipped with a photoelectric conversion function of converting light received with the acceptance surface (not shown) into electricity. An imaging signal is sent from the imaging element 200 to a video recording device or a monitor (both not shown) via a cable (not shown) or the like.

The transparent bracket 500 is configured, for example, from a transparent material such as acrylic resin, and includes a facing part 501, a circuit part 502, and a posterior part 503. As shown in FIG. 1 and FIG. 2, the facing part 501 is disposed at the front of the traveling direction of the vehicle 801 relative to the camera module 101, and is squarely facing the camera module 101. The facing part 501 covers approximately the entire visual field of the camera module 101. The circuit part 502 skirts from the facing part 501 to the rear of the camera module 101 via the upside of the camera module 101. The posterior part 503 is connected to the circuit part 502 and supports the camera module 101. The transparent bracket 500 of this embodiment can be formed by performing bending work to a plate made of acrylic resin or the like. Moreover, in this embodiment, the transparent bracket 500 is mounted on the front window 803 of the vehicle 801 with a bracket 601.

The mirror 300 is a standard mirror, a mirror-finished metal film or the like, and is an example of the reflector referred to in the present invention. The mirror 300 is mounted at the underside of the facing part 501 of the transparent bracket 500, and is formed in a horizontally long rectangular shape is evident from FIG. 2. As a result of this kind of arrangement, the mirror 300 will occupy roughly half of the underside of the visual field of the camera module 101.

The transparent bracket 500 is mounted with a light-resistant film 400. The light-resistant film 400 is a black resin film or the like, and is an example of the light shield referred to in the present invention. As evident from FIG. 2, the light-resistant film 400 is affixed to the mirror 300 at the upper side of the mirror 300 with no space therebetween.

In this embodiment, the visual field of the camera module 101 can be broadly classified into three ranges. Foremost, as shown in FIG. 1, the first range is sandwiched between boundary lines 806, 807. The viewing angle 811 in the vertical direction of this range is, for example, 50 degrees. The second range is sandwiched between boundary lines 808, 809. The boundary lines 808, 809 are both bent in the traveling direction of the vehicle 801 by the mirror 300. The viewing angle 812 in the vertical direction of this range is, for example, 50 degrees. The third range is sandwiched between boundary lines 807, 808, and the light-resistant film 400 is reflected thereon. Incidentally, as shown in FIG. 3, the viewing angle 813, 814 in the horizontal direction of the first and second ranges of the visual field of the camera module 101 are both approximately 120 degrees.

The operation of the vehicle-mounted camera 11 is now explained.

FIG. 4 shows a screen image of the camera module 101. The upper half displays the status in front of the vehicle 801. This corresponds to the range that is sandwiched between the boundary line 806, 807 of FIG. 1. Meanwhile, as shown in FIG. 4, the lower half of the screen image displays the in-vehicle status of the vehicle 801 and the status behind the vehicle 801. This corresponds to the range that is sandwiched between the boundary lines 808, 809 of FIG. 1. Thus, according to the vehicle-mounted camera 11 of this embodiment, even though the configuration only comprises one camera module 101, the status in front of the vehicle 801 and the in-vehicle status and the status behind the vehicle 801 can be simultaneously captured. Accordingly, the vehicle-mounted camera 11 can be used, for example, as a drive recorder for the purpose of self-analysis which records the status of the front-back vehicle direction at the time of a motor vehicle accident, and can also be used, for example, as a drive recorder for the purpose of crime prevention which records the status of a passenger of a taxi.

The screen image shown in FIG. 4 was captured under the circumstances shown in FIG. 3. Here, there is a vehicle 831 at the front right and a vehicle 832 at the rear right of the vehicle 801. In the screen image shown in FIG. 4, both vehicles 831, 832 are displayed on the right side of the screen image. This is because the mirror 300 is disposed to occupy the underside of the visual field of the camera module 101. A person viewing this screen image will be able to intuitively understand that both vehicles 831, 832 are on the right side. This is particularly suitable, for example, in order to prevent the erroneous recognition of the left and right positions of the rear status when investigating the circumstances at the time of the accident.

The light-resistant film 400 is displayed as a black strip at the center portion of the screen image shown in FIG. 4. This will prevent the erroneous recognition of the boundary between the front status displayed at the upper part and the rear status displayed at the lower part. Moreover, when processing this screen image, as a result of image-recognizing the black strip of the light-resistant film 400, the upper part and the lower part of the screen image can be automatically and easily differentiated.

The configuration of supporting the mirror 300 and the camera module 101 with the transparent bracket 500 is suitable for miniaturizing the overall vehicle-mounted camera 11. In addition, this is advantageous for installing the vehicle-mounted camera 11 at the front overhead position of the driver which will not interfere, for example, with the confirmation of the room mirror.

FIG. 5 shows a modified example of the vehicle-mounted camera according to the first embodiment of the present invention. The vehicle-mounted camera 11 of this modified example differs from the vehicle-mounted camera 11 described above in that it comprises a case 510 in substitute for the foregoing transparent bracket 500.

The case 510 is made of resin or the like, and has a box shape in which its cross-section surface is of a polyangular shape. As the material of the case 510, opaque resin may be used, or transparent resin may be used. The case 510 also supports the camera module 101 as with the foregoing transparent bracket 500. The case 510 is formed with a front window 504 and a rear window 505. The front window 504 is disposed at a position that occupies the upper portion of the visual field of the camera module 101, and enables the camera module 101 to capture the status in front of the vehicle. The rear window 505 is located at the underside of the camera module 101, and is disposed at a position of being reflected on the mirror 300 that occupies the lower portion of the visual field of the camera module 101. The camera module 101 is thereby able to capture the status behind the vehicle through the rear window 505. Even with this configuration, the status in front of the vehicle and the status behind the vehicle can be capture with a single camera module 101.

Figure 6:
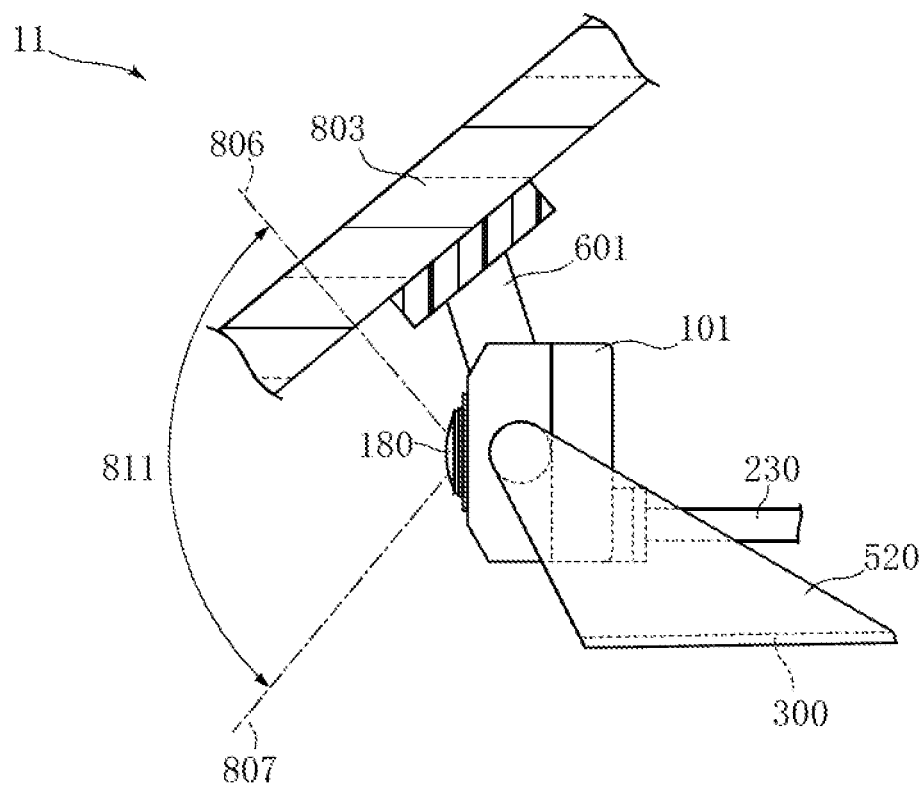
FIG. 6 is a side view showing another modified example of the vehicle-mounted camera according to the first embodiment of the present invention.
Figure 7:
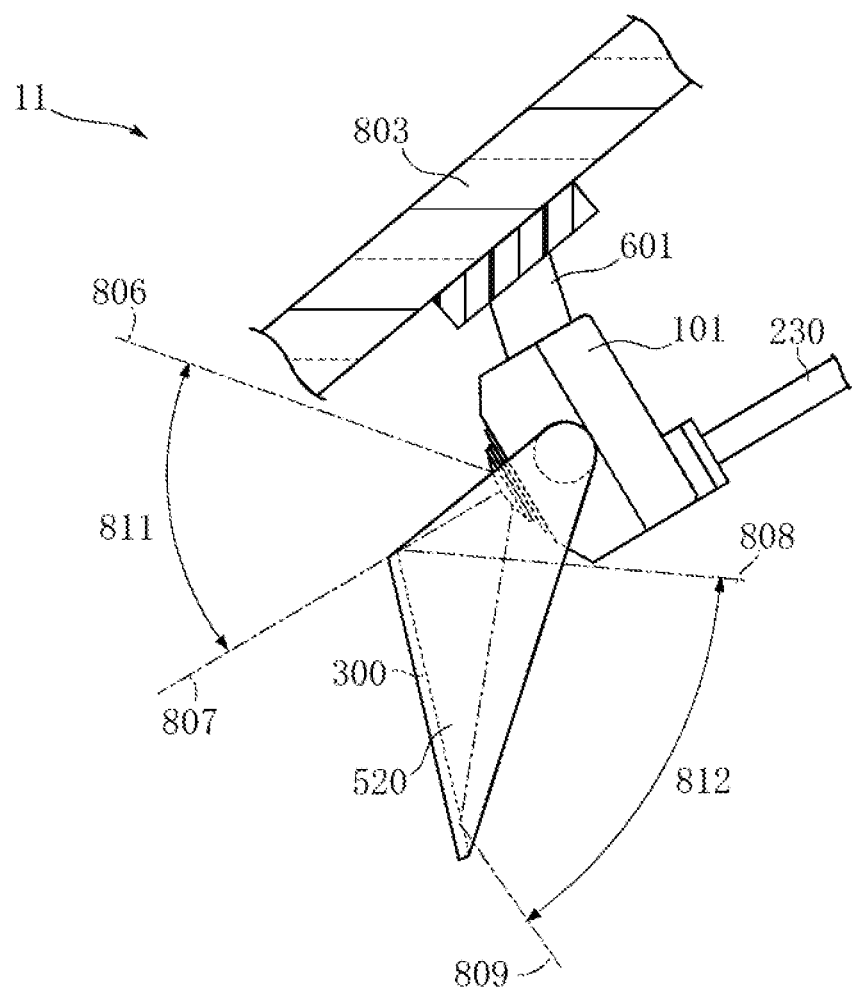
FIG. 7 is a side view showing another modified example of the vehicle-mounted camera according to the first embodiment of the present invention.

FIG. 6 and FIG. 7 show another modified example of the vehicle-mounted camera according to the first embodiment of the present invention. With the vehicle-mounted camera 11 of this modified example, the supporting structure of the camera module 101 and the mirror 300 differs from the foregoing configuration. In this modified example, the camera module 101 is supported rotatably relative to the bracket 601 that is mounted to the front window 803. Moreover, the mirror 300 is supported rotatably relative to both the bracket 601 and the camera module 101 via the bracket 520. The rotating axis of the camera module 101 and the rotating axis of the mirror 300 are both perpendicular to the plane of paper. A cable 230 is extending from the camera module 101.

If the camera module 101 and the mirror 300 are retained in the position shown in FIG. 6, the mirror 300 will not be reflected on the visual field of the camera module 101. Thus, the camera module 101 will capture only the front of the traveling direction. Here, the viewing angle 811 is, for example, approximately 100 degrees.

Meanwhile, if the camera module 101 and the mirror 300 are retained in the position shown in FIG. 7, the mirror 300 will be reflected on the visual field of the camera module 101. Thus, the camera module 101 will simultaneously capture the front of the traveling direction and the rear of the traveling direction. Here, the viewing angle 811 of the front of the traveling direction is, for example, approximately 50 degrees, and the viewing angle 812 of the rear of the traveling direction is, for example, approximately 50 degrees.

According to this modified example, the user is able to arbitrarily select a mode of using the camera module 101 to capture only the front of the traveling direction in a relatively wide angle, and a mode of using the camera module 101 to simultaneously capture the front of the traveling direction and the rear of the traveling direction. Moreover, as a result of suitably changing the angle of the camera module 101 and the mirror 300, the ratio of the front of the traveling direction and the ratio of the rear of the traveling direction can be arbitrarily set in the screen image that is captured with the camera module 101.

FIG. 8 to FIG. 13 show another embodiment of the present invention. Incidentally, the elements in these drawings that are the same as or similar to the foregoing embodiment are given the same reference numeral as the foregoing embodiment.

Figure 8:
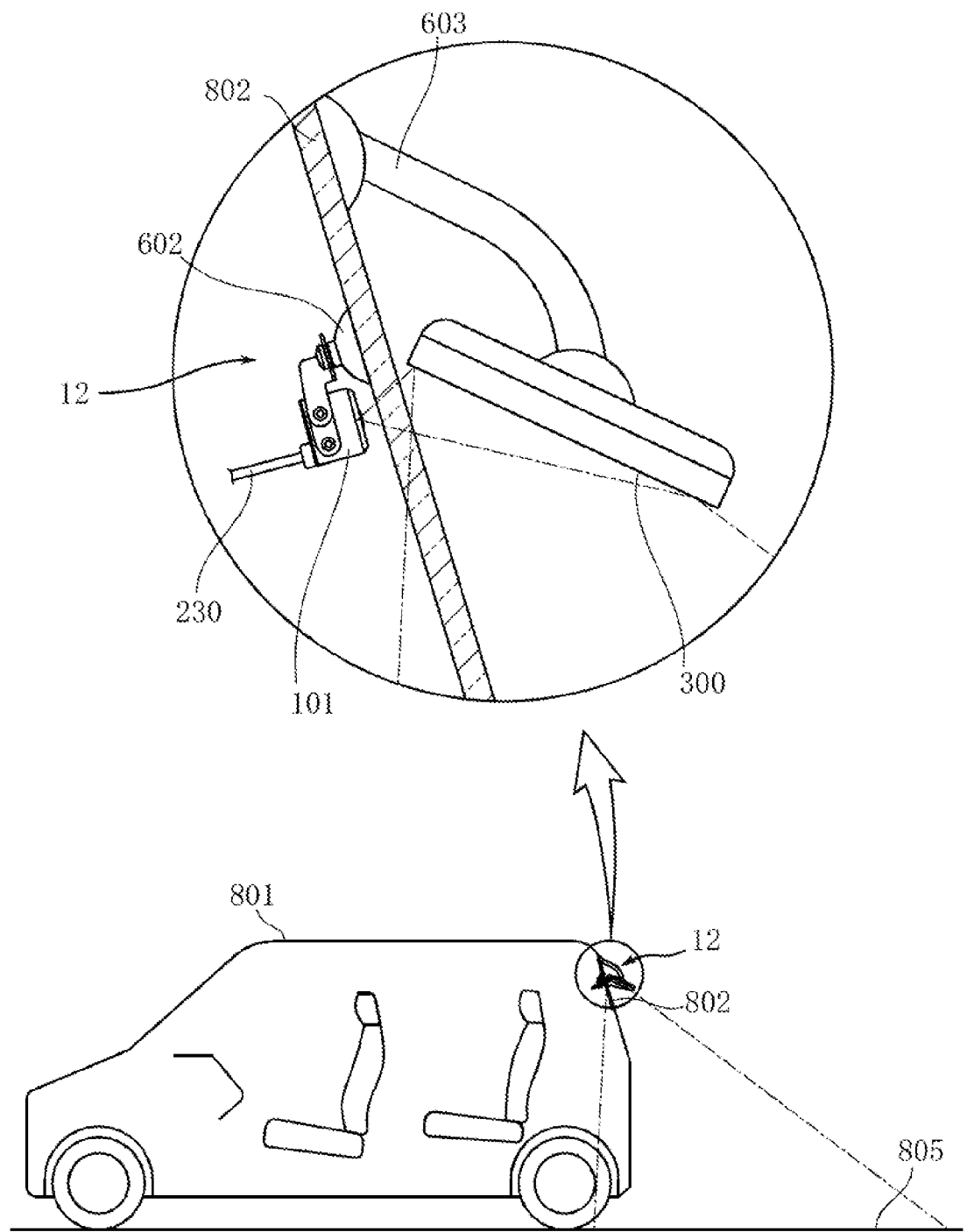
FIG. 8 is an overall configuration diagram and a side view showing the vehicle-mounted camera according to the second embodiment of the present invention.

FIG. 8 shows a vehicle-mounted camera according to the second embodiment of the present invention. The vehicle-mounted camera 12 of this embodiment differs from the foregoing embodiment in that it is used as a so-called rear-view monitor.

In this embodiment, the camera module 101 and the mirror 300 are disposed by sandwiching the rear window 802 of the vehicle 801. The camera module 101 is mounted on the inner surface of the window 802 with a suction disk 602 or the like. The camera module 101 assumes a position of facing the rear of the vehicle through the window 802. A cable 230 is extending from the camera module 101. The cable 230 is laid within the vehicle 801 and connected, for example, to a monitor (not shown) installed in the instrument panel.

The mirror 300 is mounted to the outer surface of the window 802 with a bracket 603 or the like. In this embodiment, the mirror 300 is of a positional relationship that occupies most of the visual field of the camera module 101. The mirror 300 is inclined to face the underside. The rear underside of the vehicle 801 and the road 805 are thereby reflected on the video picture of the camera module 101.

Figure 68:
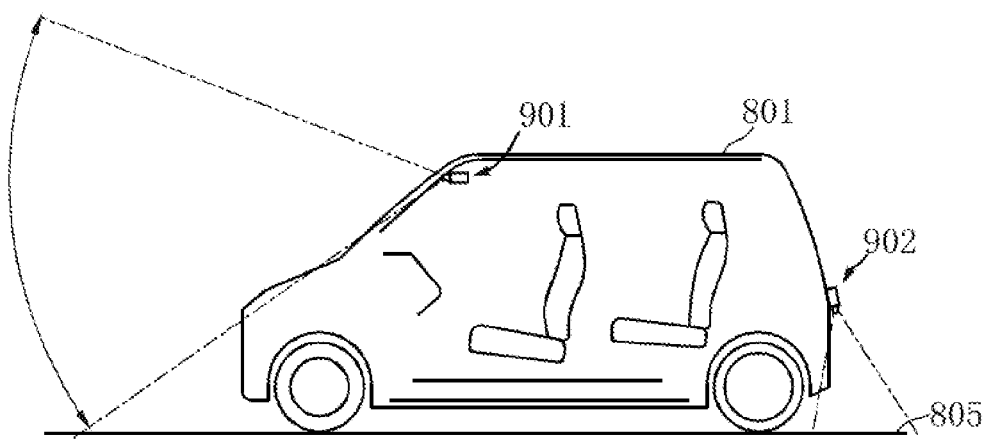
FIG. 68 is an overall configuration diagram showing an example of a vehicle-mounted camera according to conventional technology.

According to this kind of embodiment, the status of the area immediately behind the vehicle 801, which usually becomes a blind spot of the driver, can be adequately confirmed with the video picture of the vehicle-mounted camera 12. Since the camera module 101 is installed inside the vehicle, there is hardly any chance of it being exposed to rain and wind. Accordingly, the camera module 101 can be subject to simpler waterproofing measures, for example, in comparison to the vehicle-mounted camera 902 shown in FIG. 68.

In addition, there is no need to lay the cable 230 from outside the vehicle to inside the vehicle. The time and effort for laying the cable 230 can thereby be alleviated. It is also possible to inhibit the deterioration or damage of the cable 230.

Figure 9:
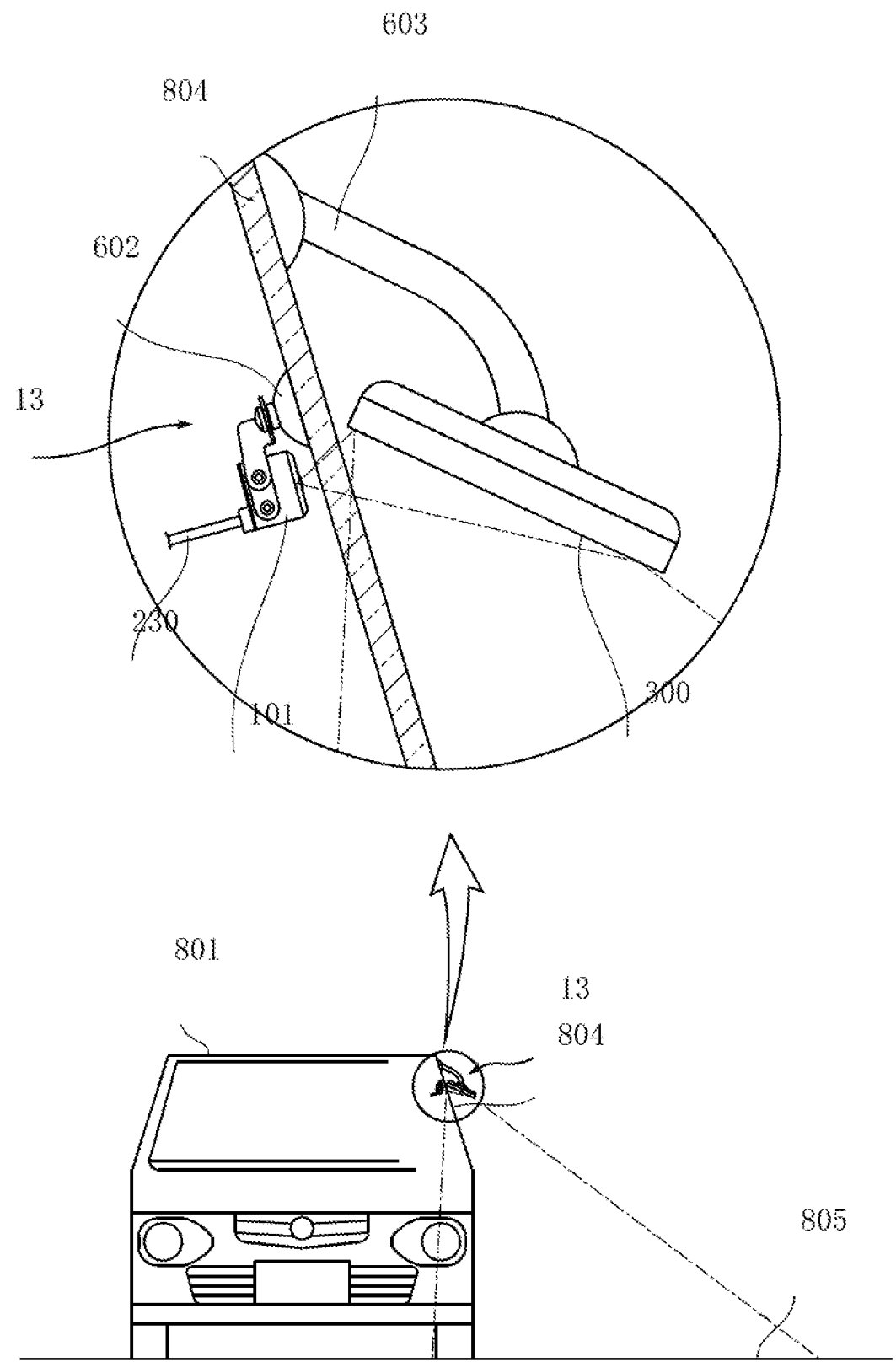
FIG. 9 is an overall configuration diagram and a side view showing the vehicle-mounted camera according to the third embodiment of the present invention.

FIG. 9 shows a vehicle-mounted camera according to the third embodiment of the present invention. The vehicle-mounted camera 13 of this embodiment differs from the foregoing vehicle-mounted camera 12 in that it is mounted on a side window 804 located at the side of the vehicle 801. In this embodiment, the camera module 101 is mounted on the inner surface of the side window 804, and the mirror 300 is mounted on the outer surface of the side window 804. The lateral underside of the vehicle 801 and the road 805 are reflected on the video picture of the camera module 101.

According to this embodiment, for example, the status of the left underside of the vehicle 801, which usually becomes a blind spot of the driver seated on the right side of the vehicle 801, can be adequately confirmed.

Figure 10:
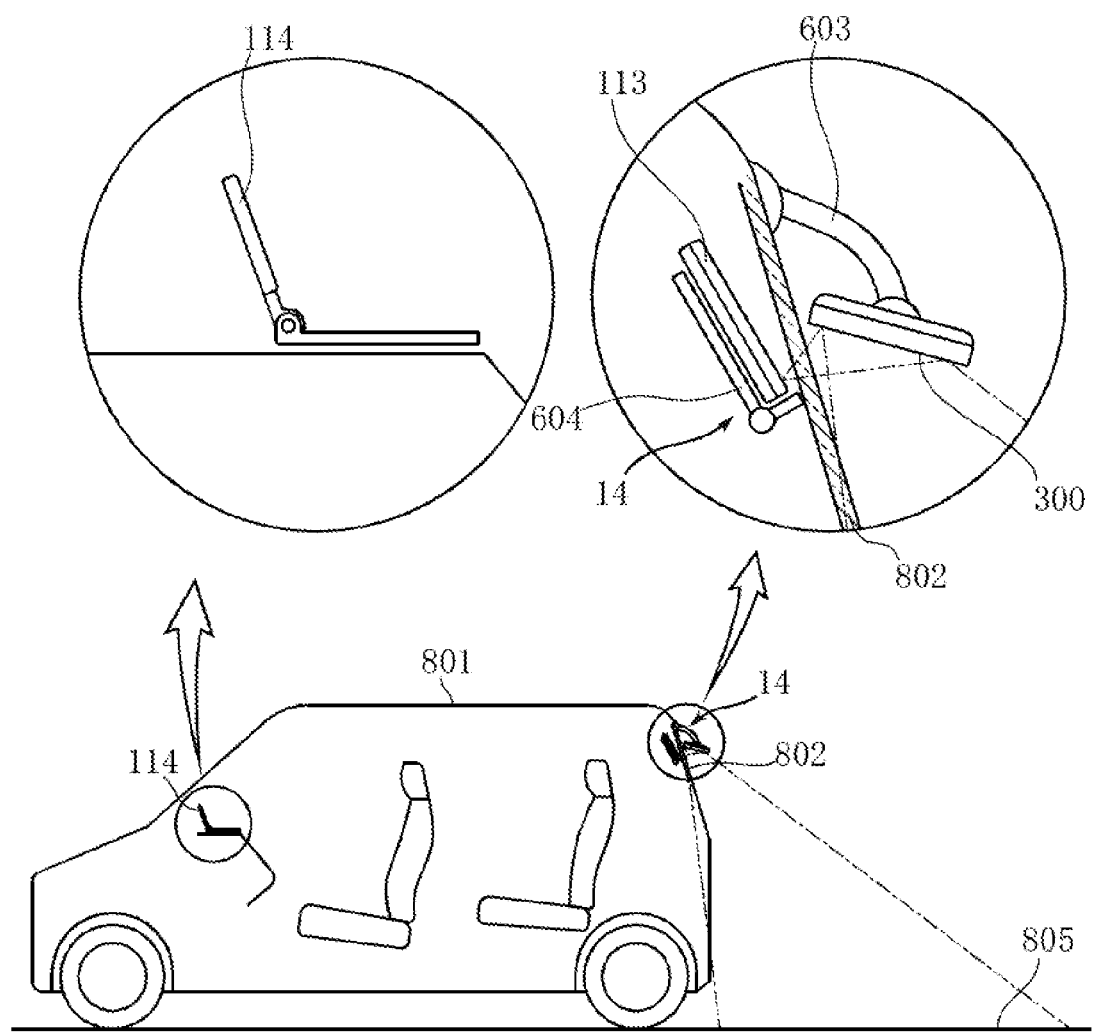
FIG. 10 is an overall configuration diagram and a side view showing the vehicle-mounted camera according to the fourth embodiment of the present invention.
Figure 11:
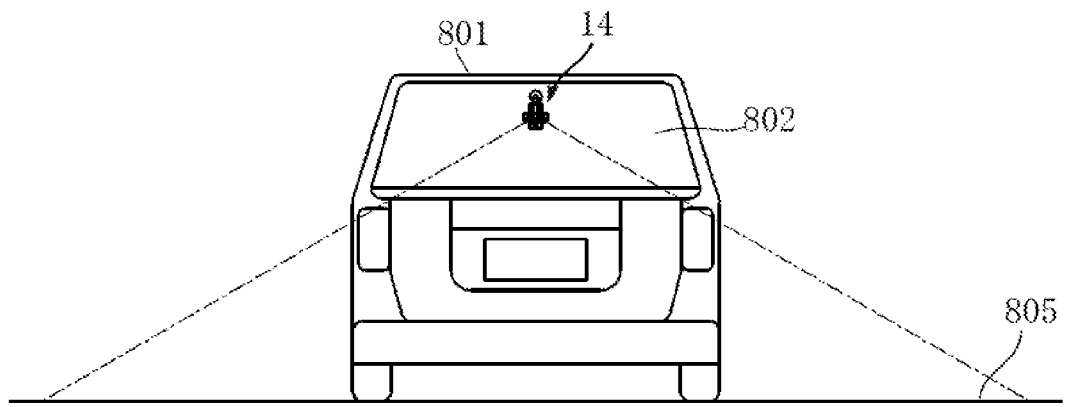
FIG. 11 is an overall configuration diagram showing the vehicle-mounted camera according to the fourth embodiment of the present invention.

FIG. 10 and FIG. 11 show a vehicle-mounted camera according to the fourth embodiment of the present invention. The vehicle-mounted camera 14 of this embodiment differs from all of the foregoing embodiments in that a portable phone 113 is used as a camera module as referred to in this invention. The relationship of the portable phone 113 and the mirror 300 is similar to the foregoing vehicle-mounted camera 12.

The portable phone 113 is equipped with an imaging function, and is retained, for example, a bracket 604 that is mounted on the inner surface of the window 802. In this position, the visual field of the portable phone 113 is mostly occupied by the mirror 300. The screen image that is captured with the portable phone 113 can be displayed on a separate portable phone 114 that is placed on the instrument panel by using a TV phone function or the like. According to this kind of embodiment, a rear-view monitor can be created without having to use a special camera module.

Figure 12:
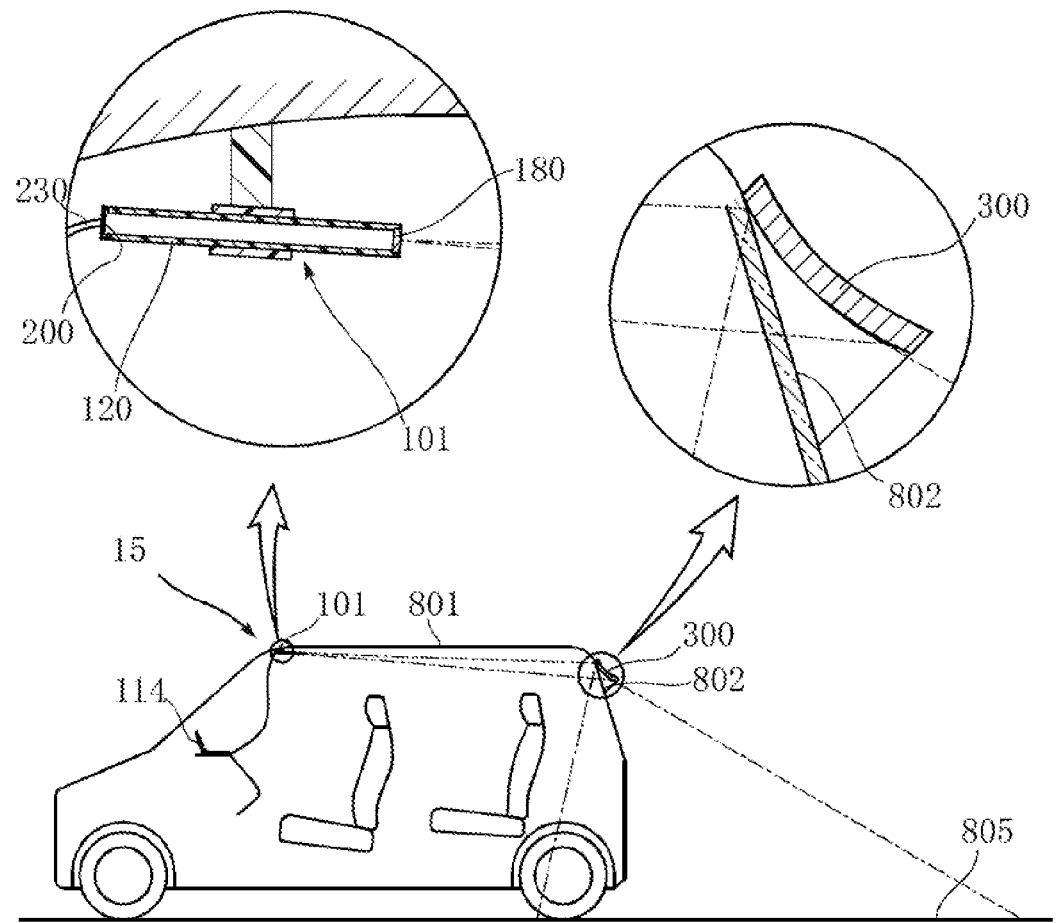
FIG. 12 is an overall configuration diagram and a side view showing the vehicle-mounted camera according to the fifth embodiment of the present invention.
Figure 13:
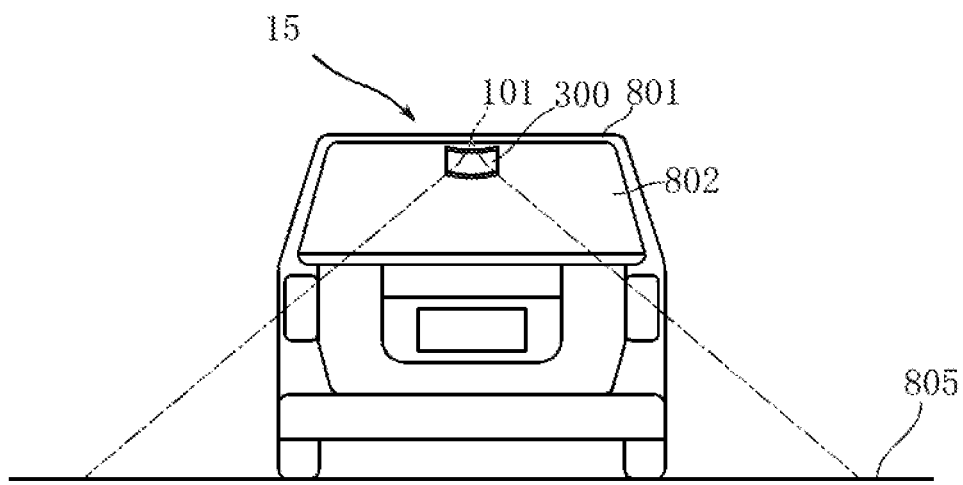
FIG. 13 is an overall configuration diagram showing the vehicle-mounted camera according to the fifth embodiment of the present invention.

FIG. 12 and FIG. 13 show a vehicle-mounted camera according to the fifth embodiment of the present invention. The vehicle-mounted camera 15 of this embodiment is configured from a camera module 101 that is disposed toward the front within the vehicle 801 and a mirror 300 that is mounted on the outer surface of the window 802. The camera module 101 comprises an elongated cylindrical case 120, and the lens unit 180 and the imaging element 200 are relatively separated. This kind of camera module 101 has a significantly narrow viewing angle, and most of the visual field is occupied by the mirror 300. The mirror 300 is inclined to face the underside, and its reflecting surface is a convex surface in both the vertical direction and the horizontal direction.

According to this kind of embodiment, even though it is possible to display the status of the area immediately behind the vehicle 801, it is not necessary to lay the cable 230 from the camera module 101 across the interior front-back direction of the vehicle 801. In addition, the cable 230 may also be connected to the portable phone 114 as shown in FIG. 12.

Since the mirror 300 has a convex surface, the camera module 101 has a relatively narrow viewing angle while the status of a wide area is reflected on the mirror 300. Accordingly, the vehicle-mounted camera 15 can also be used to adequately confirm the status of the area immediately behind the vehicle 801.

The vehicle-mounted camera of the present invention is not limited to the foregoing embodiments. The specific configuration of the respective components of the vehicle-mounted camera according to the present invention can be freely subject to various design changes.

FIG. 14 to FIG. 17 show the first embodiment of the camera module according to the present invention. The camera module 102 of this embodiment comprises a case 120, a substrate 210, an imaging element 200, a lens unit 180, a plurality of LED modules 221, and a cable 230. The camera module 102 is used, for example, to film relatively dark places such as the in-vehicle status of a passenger vehicle or the status outside the vehicle at night. Incidentally, the cable 230 is omitted in FIG. 14. Each of the camera modules 102 to 105 explained below can be used in substitute for the camera module 101 of the foregoing vehicle-mounted cameras 11 to 15.

The case 120 is made of black resin or the like, and retains the substrate 210, the imaging element 200, the lens unit 180, and the plurality of LED modules 221. In this embodiment, the case 120 has a relatively elongated rectangular parallelopiped shape. A cover 128 is mounted at the back side of the case 120.

Figure 14:
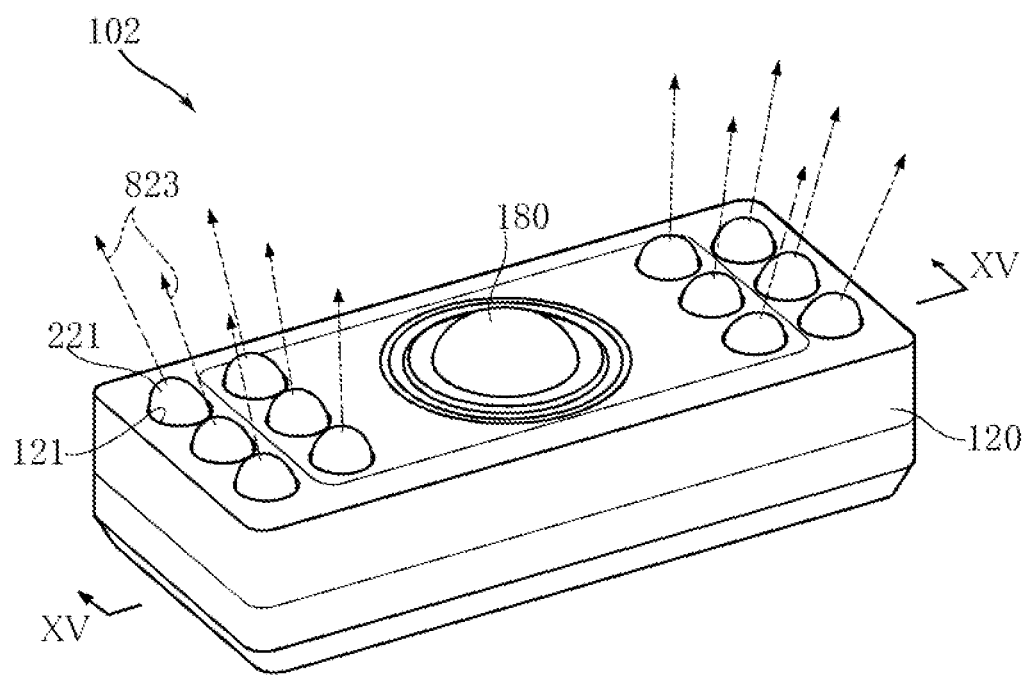
FIG. 14 is a perspective view showing the first embodiment of the camera module according to the present invention.
Figure 15:
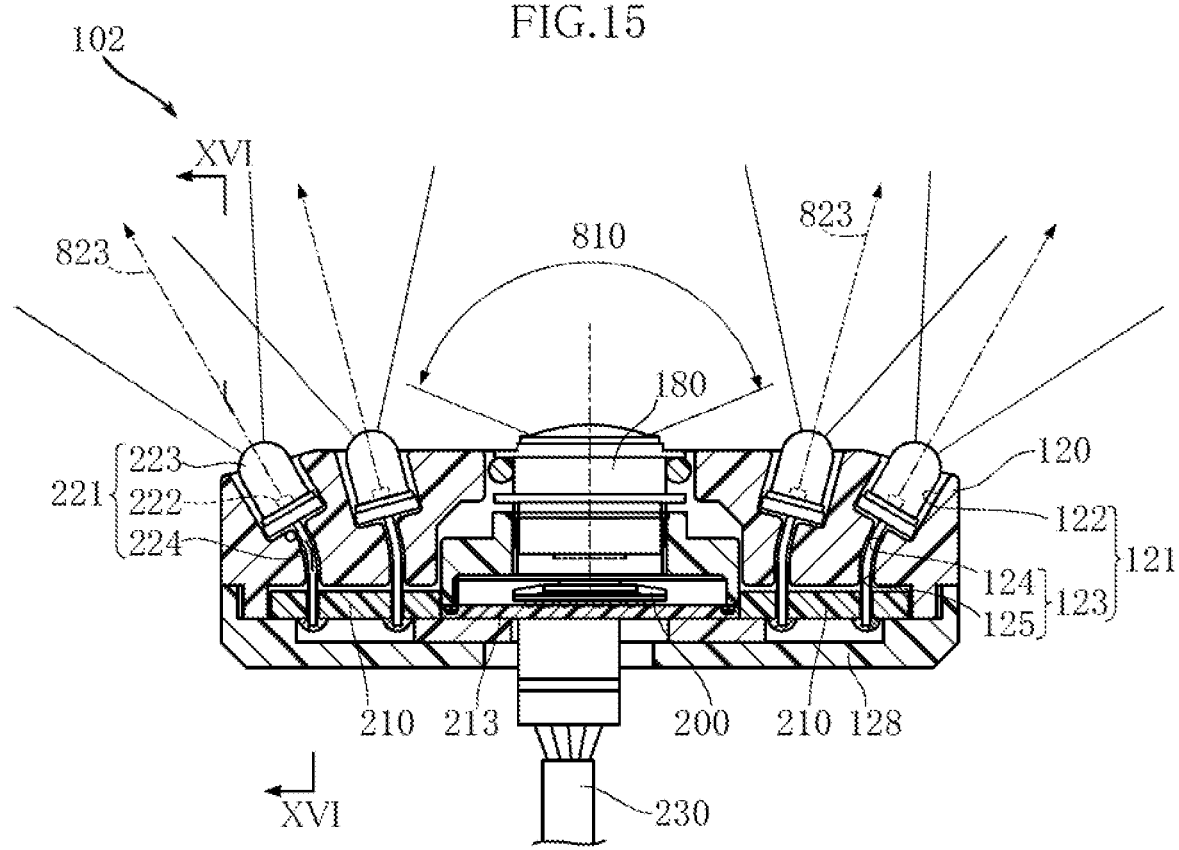
FIG. 15 is a cross section of the essential part along line XV-XV of FIG. 14.
Figure 16:
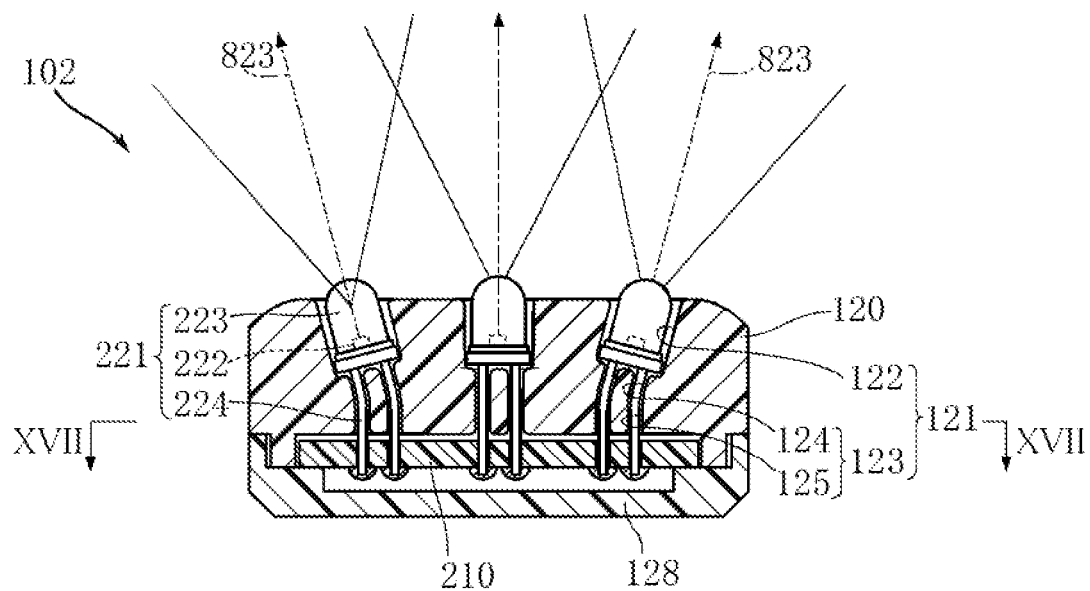
FIG. 16 is a cross section along line XVI-XVI of FIG. 15.

The case 120 is formed with a plurality of retention holes 121. As shown in FIG. 15 and FIG. 16, the retention holes 121 have a head housing part 122 and a lead housing part 123. In this embodiment, as shown in FIG. 14, twelve retention holes 121 are disposed in a matrix of 3 rows and 4 columns and sandwich the lens unit 180.

As shown in FIG. 15 and FIG. 16, the head housing part 122 is a closed-bottom concave part with a circular cross-section surface that is hollowed out inward of the case 120. Each head housing part 122, of the plurality of retention holes 121 has a different depth direction, and the axes extending in the depth direction are inclined so that their mutual distance will increase as they head upward in FIG. 15 and FIG. 16.

Figure 17:
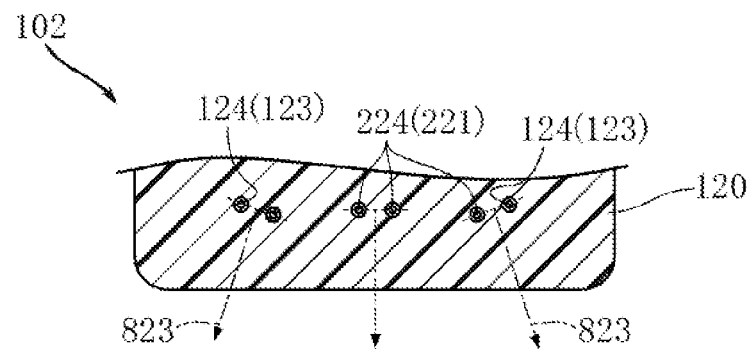
FIG. 17 is a cross section of the essential part along line XVII-XVII of FIG. 16.

Two lead housing part 123 are formed in each retention hole 121 in this embodiment, and its section size is smaller than the head housing part 122. Each lead housing part 123 includes a root part 124 and a tip part 125. The root part 124 is connected to the head housing part 122, and its depth direction basically coincides with the depth direction of the head housing part 122. The tip part 125 is connected to a side opposite to the head housing part 122 relative to the root part 124, and its section size is approximately the same as the root part 124. The depth direction of the tip part 125 is different from the depth direction of the root part 124, and, in this embodiment, is along the vertical direction (direction that is perpendicular to the substrate 210 described later) in FIG. 15 and FIG. 16. Moreover, in this embodiment, as shown in FIG. 17, the pair of root parts 124 that are used for supporting the same LED module 221 is aligned along a direction that is perpendicular to the main emitting direction 823 of that LED module 221 in its planar view. Moreover, the pair of lead housing parts 123 that are used for supporting the same LED module 221 may be aligned along a direction that is perpendicular to the main emitting direction 823 of that LED module 221 in its planar view.

The substrate 210 is a printed circuit board made of glass epoxy resin or the like, and is mounted with a plurality of LED modules 221. The substrate 210 is housed in the case 120.

The imaging element 200 is equipped with a photoelectric conversion function of outputting the received light as screen image data, and is a CCD element, a CMOS element or the like. The imaging element 200 is mounted on the substrate 213. The substrate 213 is also a printed circuit board made of glass epoxy resin or the like as with the substrate 210.

The lens unit 180 is an optical component for forming an image of external light in the imaging element 200, and comprises a plurality of lenses, a diaphragm, a lens holder, and the like. The lens and the diaphragm configure a lens group by being mutually laminated, its lens aberration is relatively small, and its viewing angle 810 is, for example, approximately 135 degrees. As a result of forming an image with the lens unit 180 in the imaging element 200, the camera module 102 is able to capture a viewing angle 810 of 135 degrees.

The plurality of LED modules 221 are illuminating light sources of the camera module 102, and, as shown in FIG. 15 and FIG. 16, respectively include an LED chip 222, a translucent head 223, and a lead 224. The LED module 221 of this embodiment is configured so that it can emit infrared rays. The camera module 102 is thereby able to capture images in a relatively dark place without causing the nearby people to feel any brightness.

The LED chip 222 includes an n-type semiconductor layer and a p-type semiconductor layer made of GaAs or the like, and an active layer sandwiched therebetween, and is able to emit light of a wavelength in the infrared region. The translucent head 223 is made of resin material capable of permeating the infrared rays, and has a so-called shell shape in this embodiment. The translucent head 223 is used for improving the directionality and emitting the infrared rays that were emitted from the LED chip 222. The translucent head 223 is housed in the head housing part 122 of the retention hole 121. The section size of the translucent head 223 is slightly smaller than the section size of the head housing part 122, but of a size of being able to fit each other, and of a size that is considerably larger than the section size of the lead housing part 123. The central axis of each translucent head 223 (main emitting direction 823 of the LED module 221) will thereby basically coincide with the depth direction of the head housing part 122, and the main emitting directions 823 of the plurality of LED modules 221 will be mutually different directions.

Incidentally, the term "main emitting direction 823" refers to the direction that is intended to be illuminated the brightest or the direction facing the center of the irradiating area in the LED modules including the LED module 221, and coincides with the central axis of the shall-shaped translucent head 223 in this embodiment.

The lead 224 is used for supplying power to the LED chip 222 and for mounting the LED module 221, and is made of Fe alloy, Cu alloy or the like. Each LED module 221 has two leads 224. The two leads 224 are respectively housed in the two lead housing parts 123 provided to each retention hole 121. The portion housed in the root part 124 of the lead 224 is extending along the main emitting direction 823. Meanwhile, the portion housed in the tip part 125 of the lead 224 is extending in a direction that is different from the main emitting direction 823, and is perpendicular to the substrate 210 in this embodiment. The portion protruding from the lead housing part 123 of the lead 224 is bonded to the substrate 210 by way of soldering or other methods.

The cable 230 is used for supplying power to the camera module 102, receiving a filming command signal, sending a captured data signal and so on, and is connected to the substrate 213 via a connector or the like.

Figure 19:
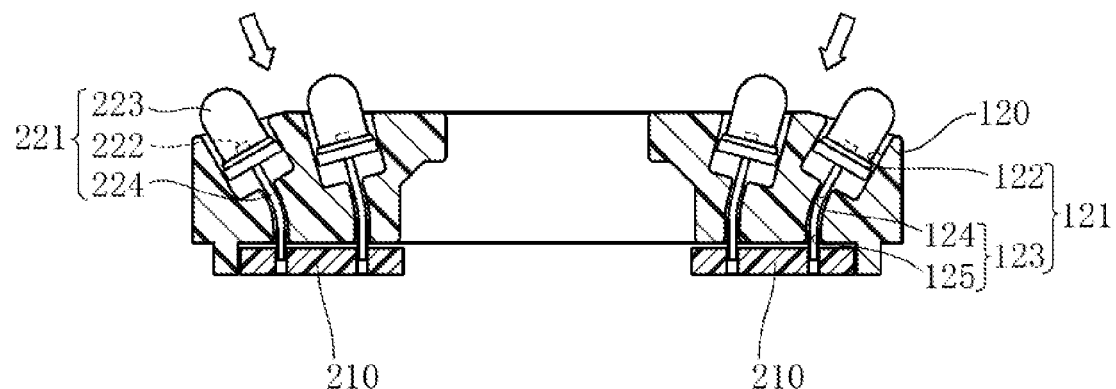
FIG. 19 is a cross section showing the process of inserting LED modules into the case in an example of a method of manufacturing the camera module shown in FIG. 14.
Figure 20:
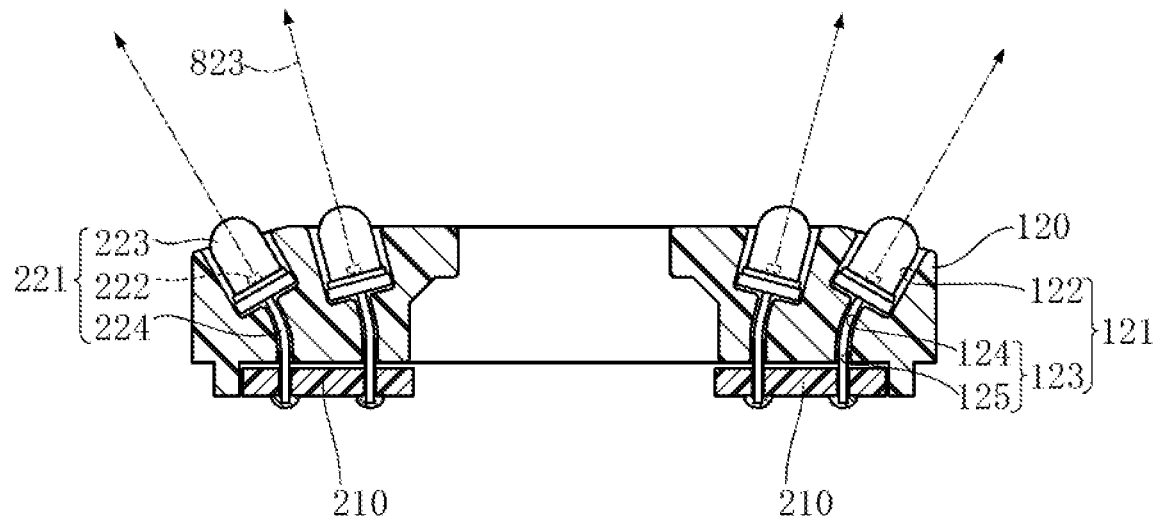
FIG. 20 is a cross section showing a state where the insertion of the LED modules into the case is complete in an example of a method of manufacturing the camera module shown in FIG. 14.

An example of a method of manufacturing the camera module 102 is now explained with reference to FIG. 18 to FIG. 20.

Figure 18:
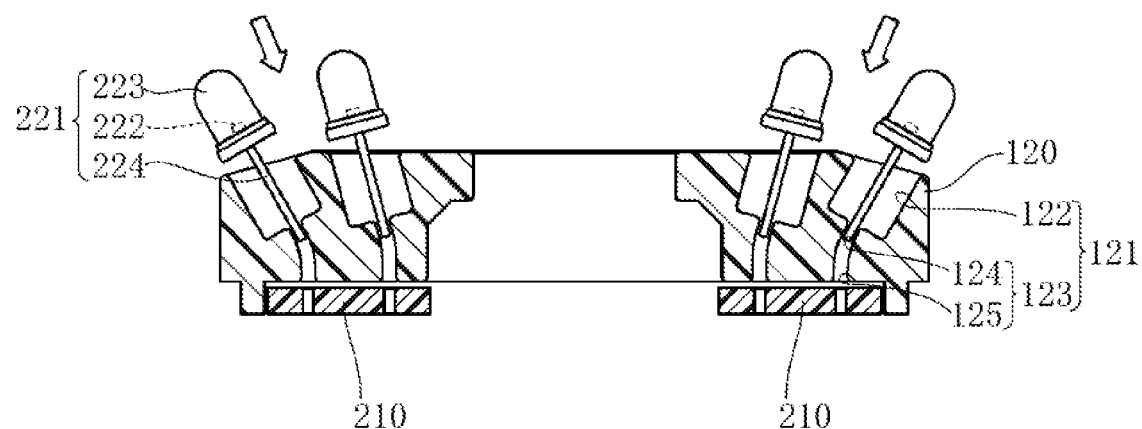
FIG. 18 is a cross section showing the process of inserting LED modules into the case in an example of a method of manufacturing the camera module shown in FIG. 14.

Foremost, as shown in FIG. 18, the substrate 210 is fixed to the case 120 in advance. Then a plurality of LED modules 221 are prepared and each LED module 221 is inserted into each retention hole 121 from the lead 224.

If the insertion of the LED module 221 is continued, the tip of the lead 224 reaches the tip part 125 after passing through the head housing part 122 and the root part 124. If the LED module 221 is inserted further, the lead 224 is bent along the tip part 125 as shown in FIG. 19.

If the LED module 221 is inserted further, the lower end of the translucent head 223 of the LED module 221 reaches the bottom surface of the head housing part 122 as shown in FIG.

20. The insertion of the LED module 221 is thereby complete. When this process is complete, the main emitting direction 823 of the plurality of LED modules 221 will coincide with the depth direction of the head housing part 122 of the plurality of retention holes 121, and mutually face different directions as described above. Soldering is performed in a state where the tip of the lead 224 is exposed from the bottom surface of the substrate 210. Subsequently, the lens unit 180, the substrate 213, the imaging element 200, the cable 230, and the cover 128 are mounted in order to obtain the camera module 102 shown in FIG. 14 to FIG. 16.

The operation of the camera module 102 is now explained.

Figure 21:
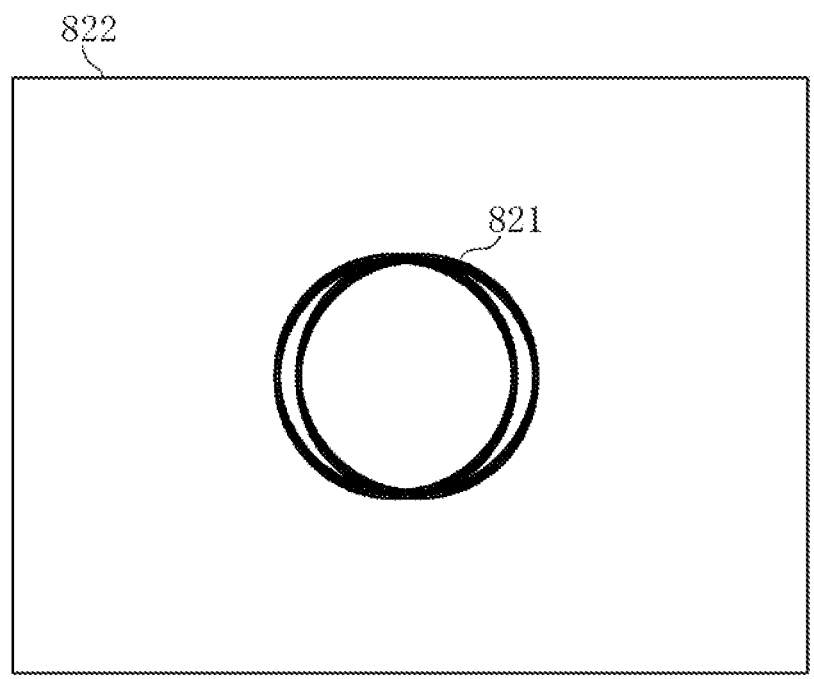
FIG. 21 is a front view showing the imaging area and the illuminating area of the camera module according to conventional technology.
Figure 69:
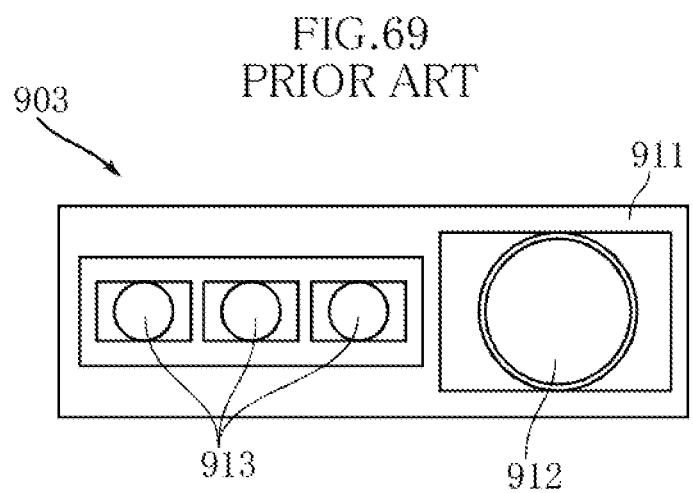
FIG. 69 is a plan view showing an example of a conventional camera module.
Figure 70:
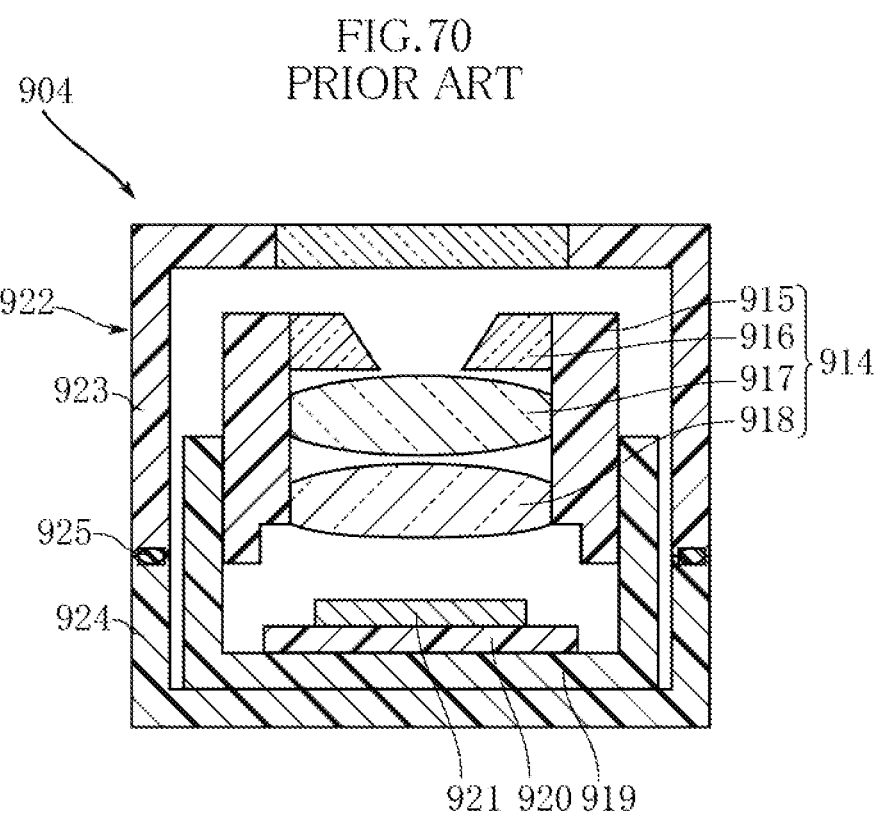
FIG. 70 is a cross section showing another example of a conventional camera module.

FIG. 21 shows the illumination state by the camera module based on conventional technology as with the camera module 903 shown in FIG. 69 as a reference example. Although this camera module is also equipped with twelve LED modules 221 as with the camera module 102, the respective main emitting directions 823 coincide as with the camera module 903. As evident from FIG. 21, the illuminating area 821 of the plurality of LED modules 221 is considerably focused at the center relative to the imaging area 822 of this camera module. Thus, with the screen image captured with this camera module, the center portion of the imaging area 822 is extremely bright and subject to whiteout, and the peripheral portion is dark.

Figure 22:
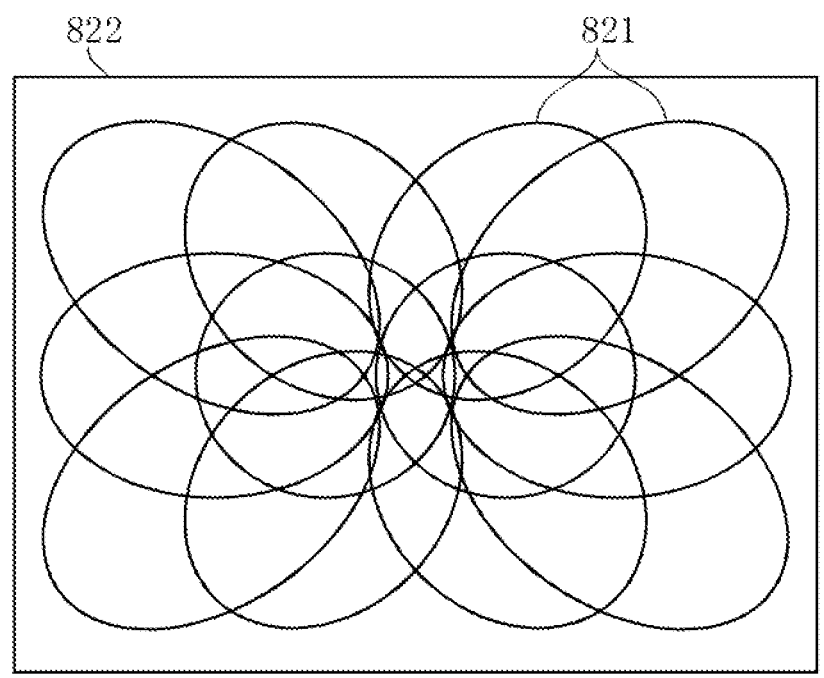
FIG. 22 is a front view showing the imaging area and the illuminating area of the camera module shown in FIG. 14.

Meanwhile, FIG. 22 shows the illumination state by the camera module 102. In the camera module 102, each main emitting direction 823 of the plurality of LED modules 221 is different. Thus, the mutual overlapping portions of the plurality of illuminating areas 821 are small in comparison to FIG. 21, and the illumination is uniformly distributed across the entire imaging area 822. Consequently, in the screen image captured with the camera module 102, the center portion will not be extremely bright and the peripheral portions will also be adequately bright. Thus, according to the camera module 102, images can be captured with a more uniform brightness.

Figure 23A:
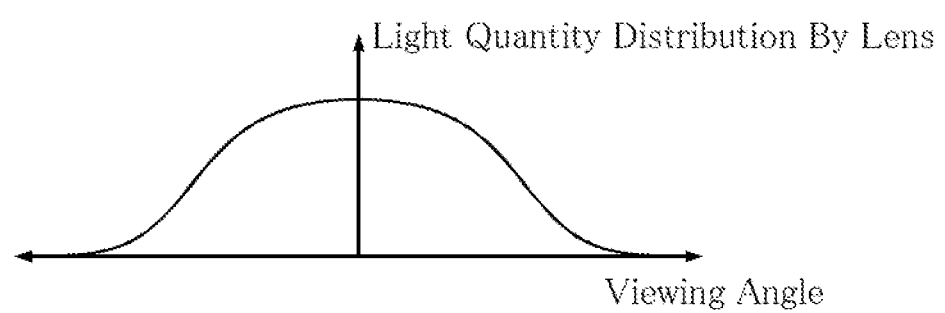
FIG. 23A shows the light quantity distribution by the lens in the camera module shown in FIG. 14.
Figure 23B:
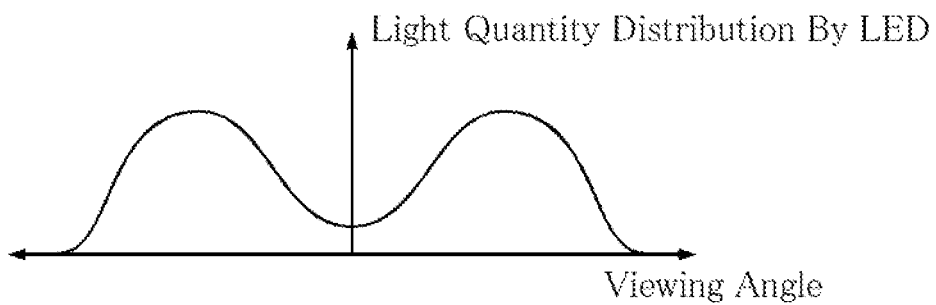
FIG. 23B shows the light quantity distribution by the LED illumination in the camera module shown in FIG. 14.
Figure 23C:
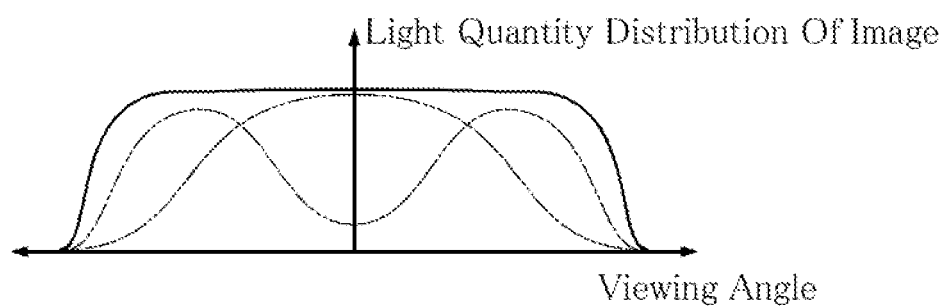
FIG. 23C shows the light quantity distribution of the screen image in the camera module shown in FIG. 14.

In addition, the main emitting direction 823 of the plurality of LED modules 221 may be disposed to match the characteristics of the lens of the lens unit 180. For example, as shown in FIG. 23A, if the characteristics of the lens of the lens unit 180 are such that the light quantity is large toward the center of the viewing angle and the light quantity is small toward the periphery of the viewing angle, the main emitting direction 823 of the plurality of LED modules 221 is arranged so that the light quantity distribution by the plurality of LED modules 221 will become the distribution shown in FIG. 23B. Specifically, the light quantity distribution based on the LED illumination is relatively small at the center of the viewing angle and becomes maximum at an area that is separated from the center of the viewing angle to a certain degree. According to this kind of configuration, as shown in FIG. 23C, the light quantity distribution in the screen image captured with the camera module 102 will become relatively uniform across the area from the center to the periphery of the viewing angle.

As a result of providing retention holes 121 to the case 120, the main emitting direction 823 of each LED module 221 can be set to the intended direction. In particular, by housing the translucent head 223 in the head housing part 122, the direction of the main emitting direction 823 can be set with higher accuracy.

When manufacturing the camera module 102, by inserting the lead 224 from the root part 124 into the tip part 125, the tip portion can be made perpendicular to the substrate 210 while facing the base portion toward the main emitting direction 823. This is convenient since the tip of the lead 224 can be arranged to face a direction of being bonded with the substrate 210 easily even through the main emitting direction 823 is facing various directions.

Figure 24:
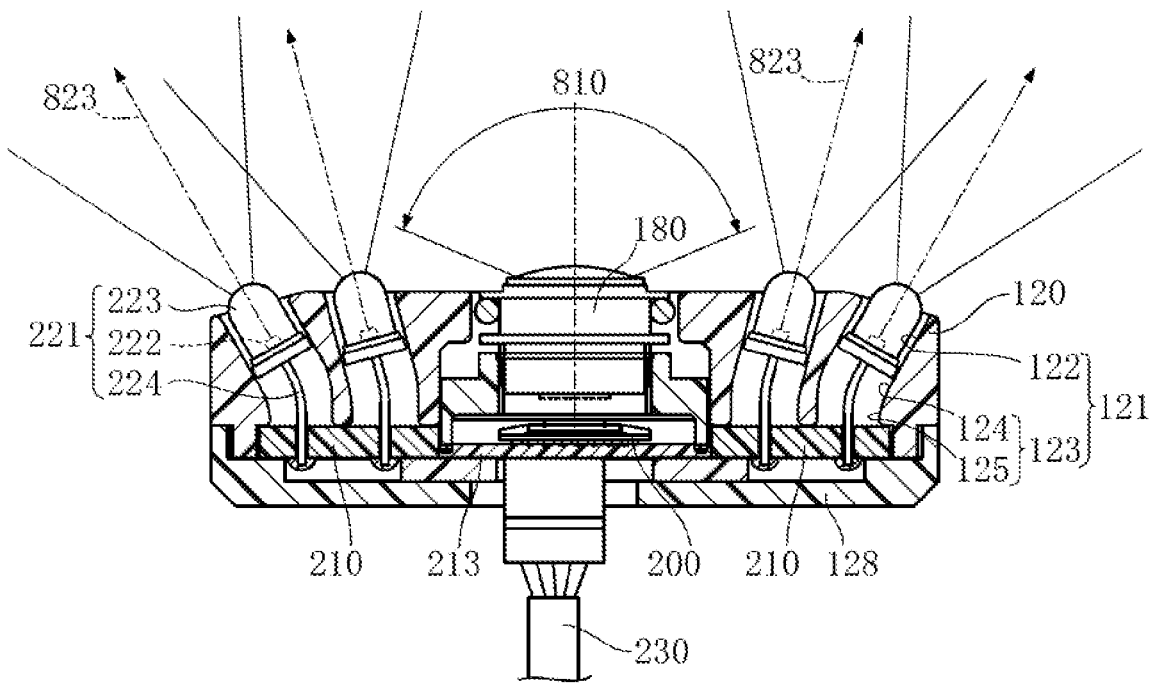
FIG. 24 is a cross section of the essential part showing the second embodiment of the camera module according to the present invention.

FIG. 24 shows the second embodiment of the camera module according to the present invention. With the camera module 103 of this embodiment, the configuration of the retention hole 121 of the case 120 is different from the foregoing camera module 102. The camera module 103 comprises a case 120, a substrate 210, an imaging element 200, a lens unit 180, a plurality of LED modules 221, and a cable 230. The camera module 103 is used, for example, to film relatively dark places such as the in-vehicle status of a passenger vehicle or the status outside the vehicle at night.

The case 120 is made of black resin or the like, and retains the substrate 210, the imaging element 200, the lens unit 180, and the plurality of LED modules 221. In this embodiment, the case 120 has a relatively elongated rectangular parallelepiped shape. A cover 128 is mounted at the back side of the case 120.

The case 120 is formed with a plurality of retention holes 121. The retention holes 121 have a head housing part 122 and a lead housing part 123. In this embodiment, twelve retention holes 121 are disposed in a matrix of 3 rows and 4 columns and sandwich the lens unit 180.

The head housing part 122 is a closed-bottom concave part with a circular cross-section surface that is hollowed out inward of the case 120. Each head housing part 122 of the plurality of retention holes 121 has a different depth direction, and the axes extending in the depth direction are inclined so that their mutual distance will increase as they head upward in FIG. 24.

The lead housing part 123 has a section size that is basically the same as the section size of the head housing part 122. The lead housing part 123 includes a root part 124 and a tip part 125. The root part 124 is connected to the head housing part 122, and its depth direction basically coincides with the depth direction of the head housing part 122. The tip part 125 is connected to a side opposite to the head housing part 122 relative to the root part 124, and its section size is approximately the same as the root part 124. The depth direction of the tip part 125 is different from the depth direction of the root part 124, and, in this embodiment, is along the vertical direction (direction that is perpendicular to the substrate 210 described later) in FIG. 24.

The substrate 210 is a printed circuit board made of glass epoxy resin or the like, and is mounted with a plurality of LED modules 221. The substrate 210 is housed in the case 120.

The imaging element 200 is equipped with a photoelectric conversion function of outputting the received light as screen image data, and is a CCD element, a CMOS element or the like. The imaging element 200 is mounted on the substrate 213. The substrate 213 is also a printed circuit board made of glass epoxy resin or the like as with the substrate 210.

The lens unit 180 is an optical component for forming an image of external light in the imaging element 200, and comprises a plurality of lenses, a diaphragm, a lens holder, and the like. The lens and the diaphragm configure a lens group by being mutually laminated, its lens aberration is relatively small, and its viewing angle 810 is, for example, approximately 135 degrees. As a result of forming an image with the lens unit 180 in the imaging element 200, the camera module 103 is able to capture a viewing angle 810 of 135 degrees.

The plurality of LED modules 221 are illuminating light sources of the camera module 103, and respectively include an LED chip 222, a translucent head 223, and a lead 224. The LED module 221 of this embodiment is configured so that it can emit infrared rays. The camera module 103 is thereby able to capture images in a relatively dark place without causing the nearby people to feel any brightness.

The LED chip 222 includes an n-type semiconductor layer and a p-type semiconductor layer made of GaAs or the like, and an active layer sandwiched therebetween, and is able to emit light of a wavelength in the infrared region. The translucent head 223 is made of resin material capable of permeating the infrared rays, and has a so-called shell shape in this embodiment. The translucent head 223 is used for improving the directionality and emitting the infrared rays that were emitted from the LED chip 222. The translucent head 223 is housed in the head housing part 122 of the retention hole 121. The section size of the translucent head 223 is slightly smaller than the section size of the head housing part 122, or a size of being able to fit each other. The central axis of each translucent head 223 (main emitting direction 823 of the LED module 221) will thereby basically coincide with the depth direction of the head housing part 122, and the main emitting directions 823 of the plurality of LED modules 221 will be mutually different directions.

Incidentally, the term "main emitting direction 823" refers to the direction that is intended to be illuminated the brightest or the direction facing the center of the irradiating area in the LED modules including the LED module 221, and coincides with the central axis of the shall-shaped translucent head 223 in this embodiment.

The lead 224 is used for supplying power to the LED chip 222 and for mounting the LED module 221, and is made of Fe alloy, Cu alloy or the like. Each LED module 221 has two leads 224. The two leads 224 are respectively housed in the two lead housing parts 123 provided to each retention hole 121. The portion housed in the root part 124 of the lead 224 is extending along the main emitting direction 823. Meanwhile, the portion housed in the tip part 125 of the lead 224 is extending in a direction that is different from the main emitting direction 823, and is perpendicular to the substrate 210 in this embodiment. The portion protruding from the lead housing part 123 of the lead 224 is bonded to the substrate 210 by way of soldering or other methods.

The cable 230 is used for supplying power to the camera module 103, receiving a filming command signal, sending a captured data signal and so on, and is connected to the substrate 213 via a connector or the like.

An example of a method of manufacturing the camera module 103 is now explained with reference to FIG. 25 and FIG. 26.

Figure 25:
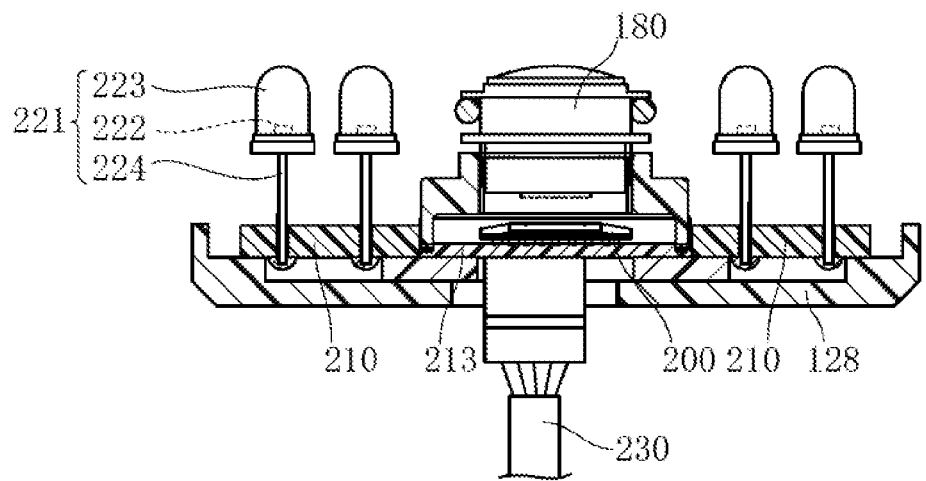
FIG. 25 is a cross section of the essential part showing a state where the LED module is mounted on the substrate in an example of a method of manufacturing the camera module shown in FIG. 24.

Foremost, as shown in FIG. 25, the substrate 213 mounted with the imaging element 200 and the lens unit 180 and, the substrate 210 mounting the plurality of LED modules 221 are fixed to the cover 128 in advance. Here, all LED modules 221 assume a position that is upright relative to the substrate 210, and the lead 224 is straight and not bent.

Figure 26:
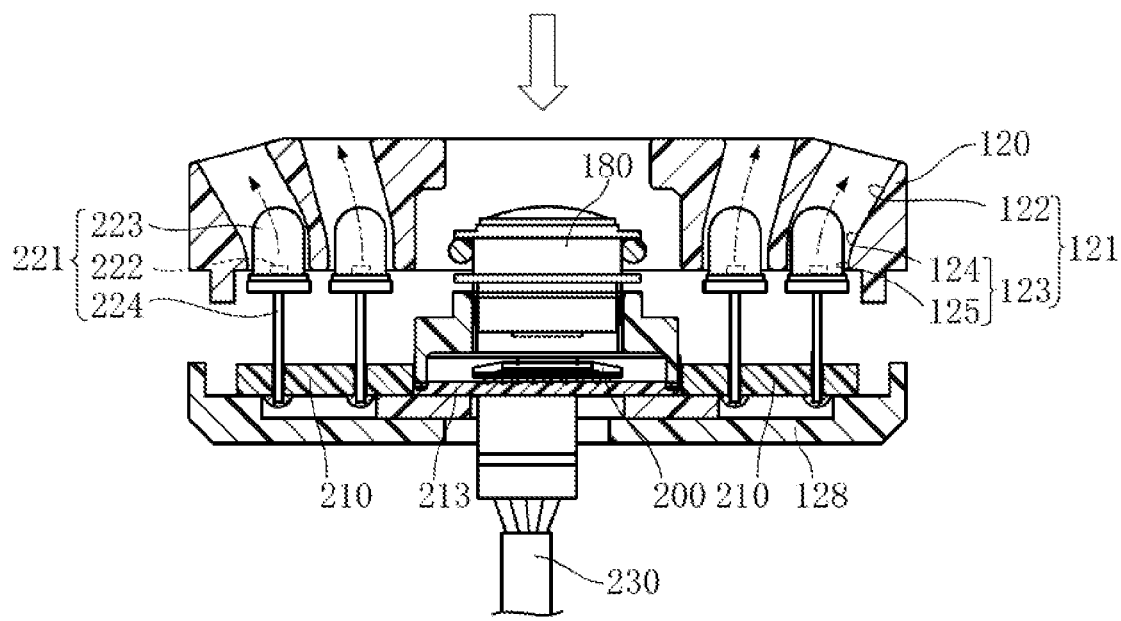
FIG. 26 is a cross section of the essential part showing the process of mounting the case in an example of a method of manufacturing the camera module shown in FIG. 24.

Subsequently, as shown in FIG. 26, the case 120 is approached from above the plurality of LED modules 221. Here, the case 120 and the cover 128 are aligned so that the translucent head 223 of the respective LED modules 221 is inserted into the tip part 125 of the respective retention holes 121. When the case 120 and the cover 128 are further approached, the translucent head 223 enters the root part 124 from the tip part 125. Here, the translucent head 223 is inclined to a direction which the root part 124 is facing. When the case 120 and the cover 128 are further approached, the translucent head 223 is housed in the head housing part 122 through the root part 124. Consequently, with the lead 224, as shown in FIG. 24, the base portion near the translucent head 223 faces the main emitting direction 823, and the tip portion faces a direction that is vertical to the substrate 210. The camera module 103 is thereby complete.

The operation of the camera module 103 is now explained.

FIG. 21 shows the illumination state by the camera module based on conventional technology as with the camera module 903 shown in FIG. 69 as a reference example. Although this camera module is also equipped with twelve LED modules 221 as with the camera module 103, the respective main emitting directions 823 coincide as with the camera module 903. As evident from FIG. 21, the illuminating area 821 of the plurality of LED modules 221 is considerably focused at the center relative to the imaging area 822 of this camera module. Thus, with the screen image captured with this camera module, the center portion of the imaging area 822 is extremely bright and subject to whiteout, and the peripheral portion is dark.

Meanwhile, FIG. 22 shows the illumination state by the camera module 103. In the camera module 103, each main emitting direction 823 of the plurality of LED modules 221 is different. Thus, the mutual overlapping portions of the plurality of illuminating areas 821 are small in comparison to FIG. 21, and the illumination is uniformly distributed across the entire imaging area 822. Consequently, in the screen image captured with the camera module 103, the center portion will not be extremely bright and the peripheral portions will also be adequately bright. Thus, according to the camera module 103, images can be captured with a more uniform brightness.

As a result of providing retention holes 121 to the case 120, the main emitting direction 823 of each LED module 221 can be set to the intended direction. In particular, by housing the translucent head 223 in the head housing part 122, the direction of the main emitting direction 823 can be set with higher accuracy.

When manufacturing the camera module 103, by inserting the translucent head 223 from the tip part 125 into the root part 124, the tip portion can be made perpendicular to the substrate 210 while facing the base portion of the lead 224 toward the main emitting direction 823. This is convenient for facing the main emitting direction 823 in various directions while arranging the tip of the lead 224 to face a direction of being bonded with the substrate 210 easily.

Figure 27:
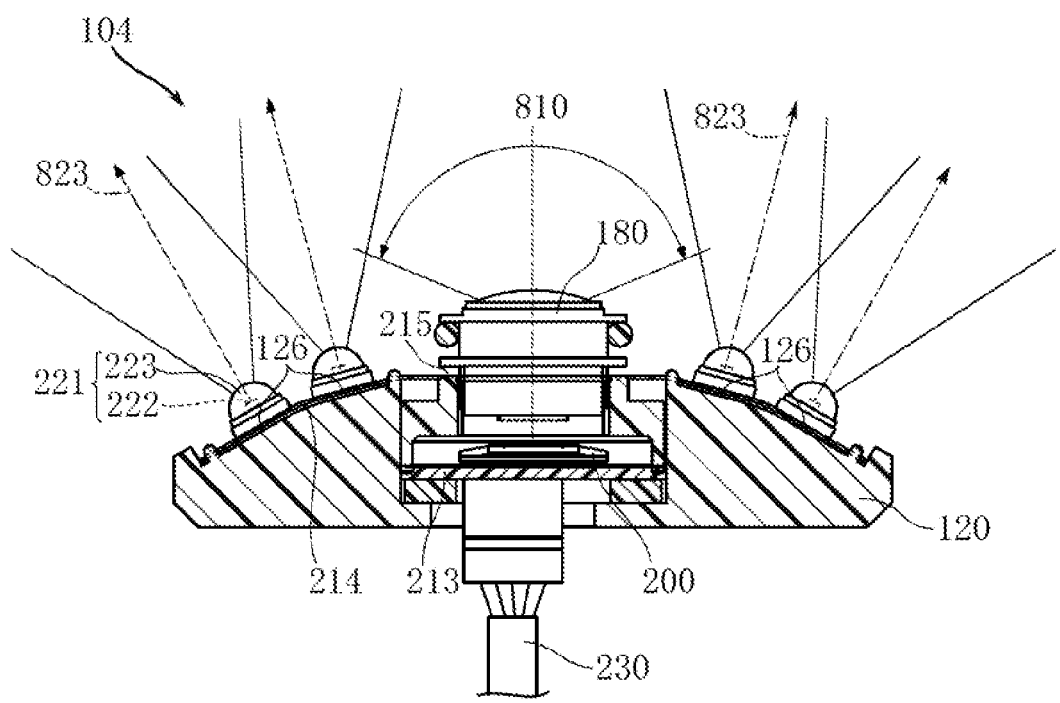
FIG. 27 is a cross section of the essential part showing the third embodiment of the camera module according to the present invention.

FIG. 27 shows the third embodiment of the camera module according to the present invention. With the camera module 104 of this embodiment, the configuration of the case 120 and the LED modules 221 is different from the foregoing camera modules 102, 103. The camera module 104 comprises a case 120, a flexible wiring substrate 214, an imaging element 200, a lens unit 180, a plurality of LED modules 221, and a cable 230. The camera module 104 is used, for example, to film relatively dark places such as the in-vehicle status of a passenger vehicle or the status outside the vehicle at night.

The case 120 is made of black resin or the like, and retains the flexible wiring substrate 214, the imaging element 200, the lens unit 180, and the plurality of LED modules 221. In this embodiment, the case 120 has a relatively elongated rectangular parallelopiped shape.

The case 120 is formed with a plurality of mounting surfaces 126. In this embodiment, twelve mounting surfaces 126 are disposed in a matrix of 3 rows and 4 columns and sandwich the lens unit 180. The plurality of mounting surfaces 126 are respectively facing mutually different directions.

The flexible wiring substrate 214 is formed by wiring made of Cu or the like being printed on a film member made of polyimide resin or the like, and, for instance, possesses considerable flexibility in comparison to a substrate made of glass epoxy resin or the like. The flexible wiring substrate 214 is attached to a portion of the case 120 where the plurality of mounting surfaces 126 are formed. The flexible wiring substrate 214 is mounted with a plurality of LED modules 221. Moreover, the flexible wiring substrate 214 is formed with an opening 215 for passing the lens unit 180 therethrough.

The imaging element 200 is equipped with a photoelectric conversion function of outputting the received light as screen image data, and is a CCD element, a CMOS element or the like. The imaging element 200 is mounted on the substrate 213. The substrate 213 is also a printed circuit board made of glass epoxy resin or the like.

The lens unit 180 is an optical component for forming an image of external light in the imaging element 200, and comprises a plurality of lenses, a diaphragm, a lens holder, and the like. The lens and the diaphragm configure a lens group by being mutually laminated, its lens aberration is relatively small, and its viewing angle 810 is, for example, approximately 135 degrees. As a result of forming an image with the lens unit 180 in the imaging element 200, the camera module 104 is able to capture a viewing angle 810 of 135 degrees.

The plurality of LED modules 221 are illuminating light sources of the camera module 104, and respectively include an LED chip 222 and a translucent head 223. The LED module 221 of this embodiment is configured so that it can emit infrared rays. The camera module 104 is thereby able to capture images in a relatively dark place without causing the nearby people to feel any brightness.

The LED chip 222 includes an n-type semiconductor layer and a p-type semiconductor layer made of GaAs or the like, and an active layer sandwiched therebetween, and is able to emit light of a wavelength in the infrared region. The translucent head 223 is made of resin material capable of permeating the infrared rays, and has a so-called shell shape in this embodiment. The translucent head 223 is used for improving the directionality and emitting the infrared rays that were emitted from the LED chip 222.

The LED module 221 is mounted on the portion covering the mounting surface 126 of the flexible wiring substrate 214 by using a mounting terminal (not shown) provided to the bottom surface of the translucent head 223. In other words, the flexible wiring substrate 214 is sandwiched between the respective LED modules 221 and the respective mounting surfaces 126. The central axis of each translucent head 223 (main emitting direction 823 of the LED module 221) will thereby basically coincide with the direction to which the mounting surface 126 is facing, and the main emitting directions 823 of the plurality of LED modules 221 will be mutually different directions.

Incidentally, the term "main emitting direction 823" refers to the direction that is intended to be illuminated the brightest or the direction facing the center of the irradiating area in the LED modules including the LED module 221, and coincides with the central axis of the shall-shaped translucent head 223 in this embodiment.

The cable 230 is used for supplying power to the camera module 104, receiving a filming command signal, sending a captured data signal and so on, and is connected to the substrate 213 via a connector or the like.

An example of a method of manufacturing the camera module 104 is now explained with reference to FIG. 28.

Figure 28:
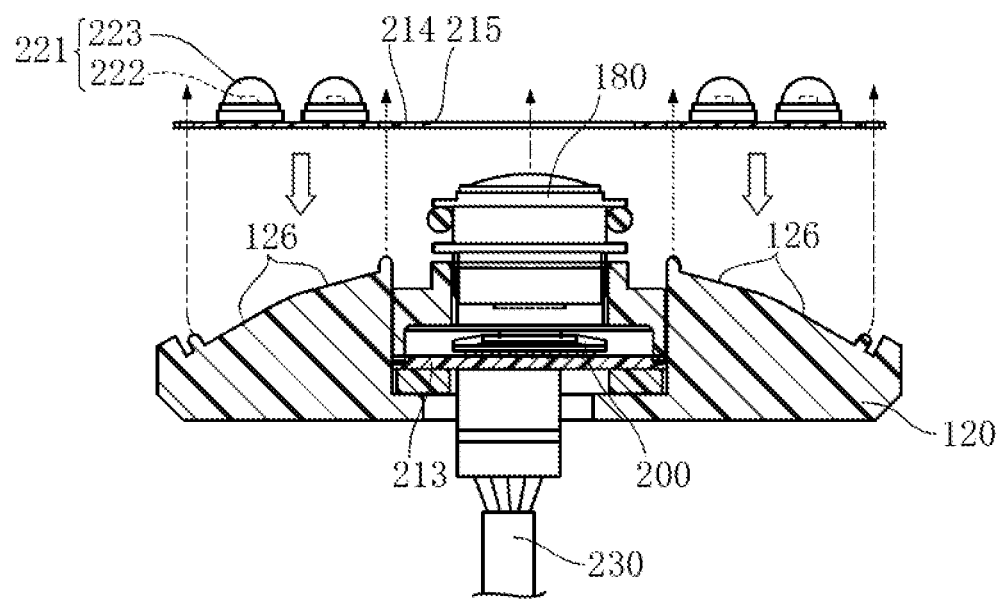
FIG. 28 is a cross section of the essential part showing the process of mounting the flexible wiring substrate on the case in an example of a method of manufacturing the camera module shown in FIG. 27.

As shown in FIG. 28, foremost, the substrate 213 mounted with the imaging element 200 and the lens unit 180 is fixed to the case 120 in advance. Moreover, the plurality of LED modules 221 are mounted to the flexible wiring substrate 214 in advance. Subsequently, the flexible wiring substrate 214 is caused to approach the case 120 so as to pass the lens unit 180 through the opening 215 of the flexible wiring substrate 214.

Here, the respective LED modules 221 are positioned immediately above the respective mounting surfaces 126. The flexible wiring substrate 214 is bonded to the portion of the case 120 where the plurality of mounting surfaces 126 are formed using an adhesive or the like. The camera module 104 shown in FIG. 27 is thereby obtained.

The operation of the camera module 104 is now explained.

FIG. 21 shows the illumination state by the camera module based on conventional technology as with the camera module 903 shown in FIG. 69 as a reference example. Although this camera module is also equipped with twelve LED modules 221 as with the camera module 104, the respective main emitting directions 823 coincide as with the camera module 903. As evident from FIG. 21, the illuminating area 821 of the plurality of LED modules 221 is considerably focused at the center relative to the imaging area 822 of this camera module. Thus, with the screen image captured with this camera module, the center portion of the imaging area 822 is extremely bright and subject to whiteout, and the peripheral portion is dark.

Meanwhile, FIG. 22 shows the illumination state by the camera module 104. In the camera module 104, each main emitting direction 823 of the plurality of LED modules 221 is different. Thus, the mutual overlapping portions of the plurality of illuminating areas 821 are small in comparison to FIG. 21, and the illumination is uniformly distributed across the entire imaging area 822. Consequently, in the screen image captured with the camera module 104, the center portion will not be extremely bright and the peripheral portions will also be adequately bright. Thus, according to the camera module 104, images can be captured with a more uniform brightness.

As a result of providing the mounting surfaces 126 to the case 120, the main emitting direction 823 of each LED module 221 can be set to the intended direction. In particular, by using a surface mounting type with an electrode on the bottom surface side as the LED module 221, the direction of the main emitting direction 823 can be set with higher accuracy.

When manufacturing the camera module 104, by affixing the flexible wiring substrate 214 mounted with a plurality of LED modules 221 in advance to the case 120, the main emitting direction 823 of the respective LED modules 221 can be easily made to face the intended direction.

Figure 29:
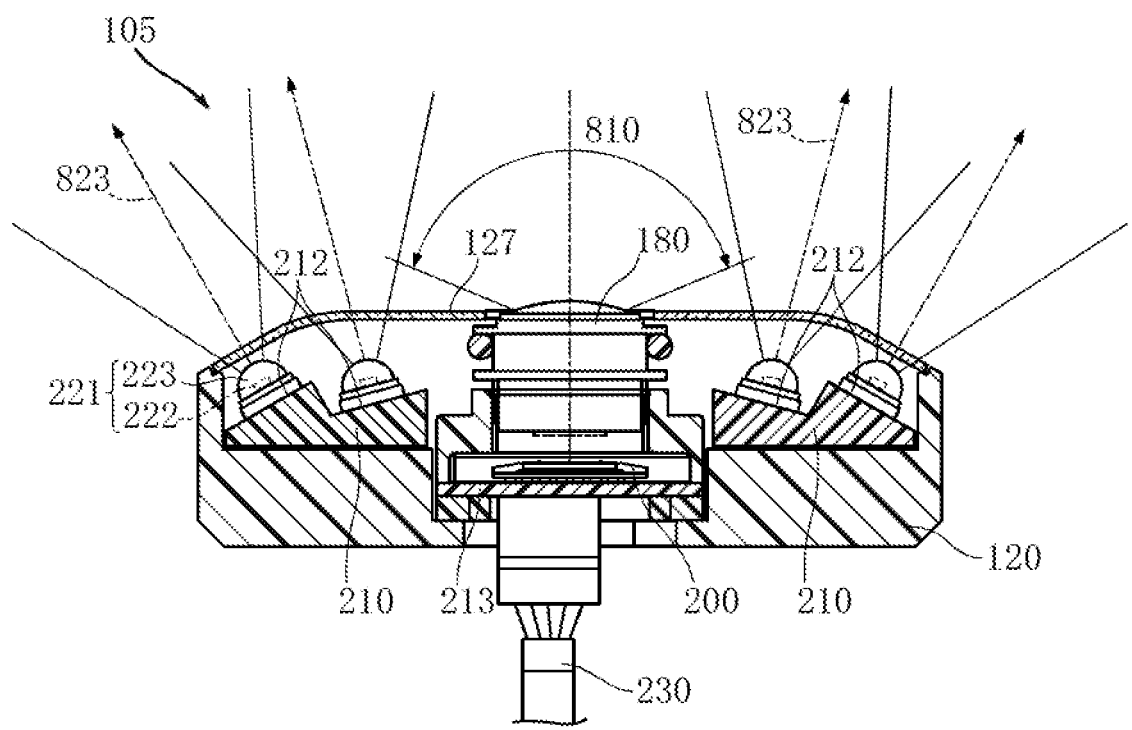
FIG. 29 is a cross section of the essential part showing the fourth embodiment of the camera module according to the present invention.

FIG. 29 shows the fourth embodiment of the camera module according to the present invention. With the camera module 105 of this embodiment, the configuration of the case 120 and the substrate 210 is different from the foregoing camera module 104. The camera module 105 comprises a case 120, a substrate 210, an imaging element 200, a lens unit 180, a plurality of LED modules 221, and a cable 230. The camera module 105 is used, for example, to film relatively dark places such as the in-vehicle status of a passenger vehicle or the status outside the vehicle at night.

The case 120 is made of black resin or the like, and retains the substrate 210, the imaging element 200, the lens unit 180, and the plurality of LED modules 221. In this embodiment, the case 120 has a relatively elongated rectangular parallelopiped shape. Moreover, a translucent cover 127 for covering the plurality of LED modules 221 is mounted on the case 120.

The substrate 210 is used for retaining the plurality of LED modules 221 and supplying power thereto, and is made of glass epoxy resin or the like. The substrate 210 is formed with a plurality of mounting surfaces 212. In this embodiment, twelve mounting surface 212 are disposed in a matrix of 3 rows and 4 columns and sandwich the lens unit 180. The plurality of mounting surfaces 212 are respectively facing mutually different directions.

The imaging element 200 is equipped with a photoelectric conversion function of outputting the received light as screen image data, and is a CCD element, a CMOS element or the like. The imaging element 200 is mounted on the substrate 213. The substrate 213 is also a printed circuit board made of glass epoxy resin or the like as with the substrate 210.

The lens unit 180 is an optical component for forming an image of external light in the imaging element 200, and comprises a plurality of lenses, a diaphragm, a lens holder, and the like. The lens and the diaphragm configure a lens group by being mutually laminated, its lens aberration is relatively small, and its viewing angle 810 is, for example, approximately 135 degrees. As a result of forming an image with the lens unit 180 in the imaging element 200, the camera module 105 is able to capture a viewing angle 810 of 135 degrees.

The plurality of LED modules 221 are illuminating light sources of the camera module 105, and respectively include an LED chip 222 and a translucent head 223. The LED module 221 of this embodiment is configured so that it can emit infrared rays. The camera module 105 is thereby able to capture images in a relatively dark place without causing the nearby people to feel any brightness.

The LED chip 222 includes an n-type semiconductor layer and a p-type semiconductor layer made of GaAs or the like, and an active layer sandwiched therebetween, and is able to emit light of a wavelength in the infrared region. The translucent head 223 is made of resin material capable of permeating the infrared rays, and has a so-called shell shape in this embodiment. The translucent head 223 is used for improving the directionality and emitting the infrared rays that were emitted from the LED chip 222.

The LED module 221 is mounted on the mounting surface 212 of the substrate 210 by using a mounting terminal (not shown) provided to the bottom surface of the translucent head 223. The central axis of each translucent head 223 (main emitting direction 823 of the LED module 221) will thereby basically coincide with the direction to which the mounting surface 212 is facing, and the main emitting directions 823 of the plurality of LED modules 221 will be mutually different directions.

Incidentally, the term "main emitting direction 823" refers to the direction that is intended to be illuminated the brightest or the direction facing the center of the irradiating area in the LED modules including the LED module 221, and coincides with the central axis of the shall-shaped translucent head 223 in this embodiment.

The cable 230 is used for supplying power to the camera module 105, receiving a filming command signal, sending a captured data signal and so on, and is connected to the substrate 213 via a connector or the like.

The operation of the camera module 105 is now explained.

FIG. 21 shows the illumination state by the camera module based on conventional technology as with the camera module 903 shown in FIG. 69 as a reference example. Although this camera module is also equipped with twelve LED modules 221 as with the camera module 105, the respective main emitting directions 823 coincide as with the camera module 903. As evident from FIG. 21, the illuminating area 821 of the plurality of LED modules 221 is considerably focused at the center relative to the imaging area 822 of this camera module. Thus, with the screen image captured with this camera module, the center portion of the imaging area 822 is extremely bright and subject to whiteout, and the peripheral portion is dark.

Meanwhile, FIG. 22 shows the illumination state by the camera module 105. In the camera module 105, each main emitting direction 823 of the plurality of LED modules 221 is different. Thus, the mutual overlapping portions of the plurality of illuminating areas 821 are small in comparison to FIG. 21, and the illumination is uniformly distributed across the entire imaging area 822. Consequently, in the screen image captured with the camera module 105, the center portion will not be extremely bright and the peripheral portions will also be adequately bright. Thus, according to the camera module 105, images can be captured with a more uniform brightness.

As a result of providing the mounting surfaces 212 to the substrate 210, the main emitting direction 823 of each LED module 221 can be set to the intended direction. In particular, by using a surface mounting type with an electrode on the bottom surface side as the LED module 221, the direction of the main emitting direction 823 can be set with higher accuracy.

The camera module according to the present invention is not limited to the foregoing embodiments. The specific configuration of the respective components of the camera module according to the present invention can be freely subject to various design changes.

The LED module referred to in the present invention is not limited to emitting infrared rays, and may also emit visible light such as white light.

Figure 30:
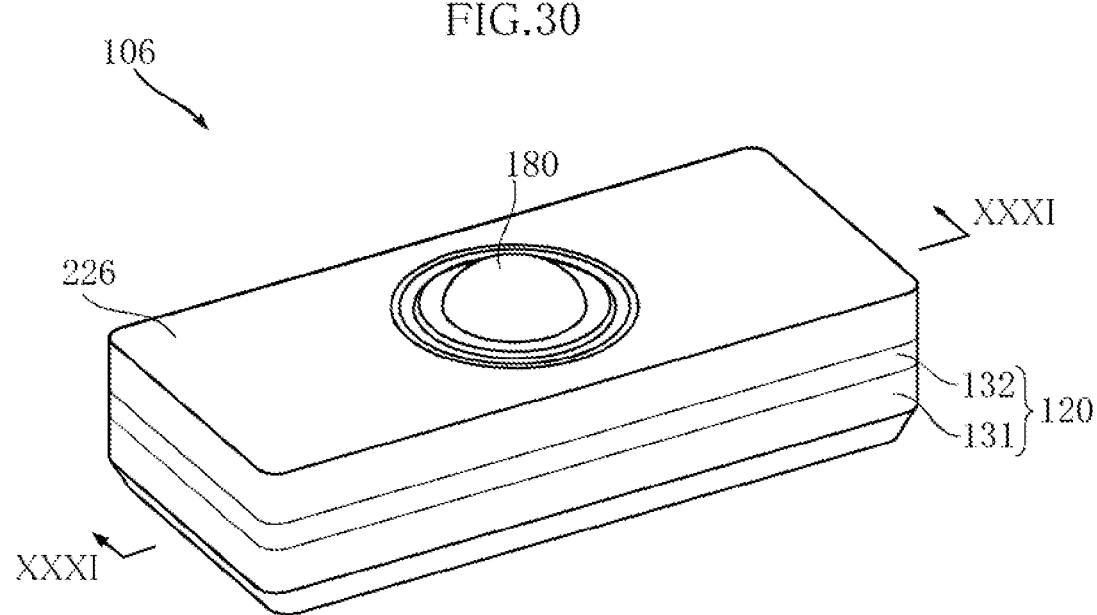
FIG. 30 is a perspective view showing the fifth embodiment of the camera module according to the present invention.
Figure 31:
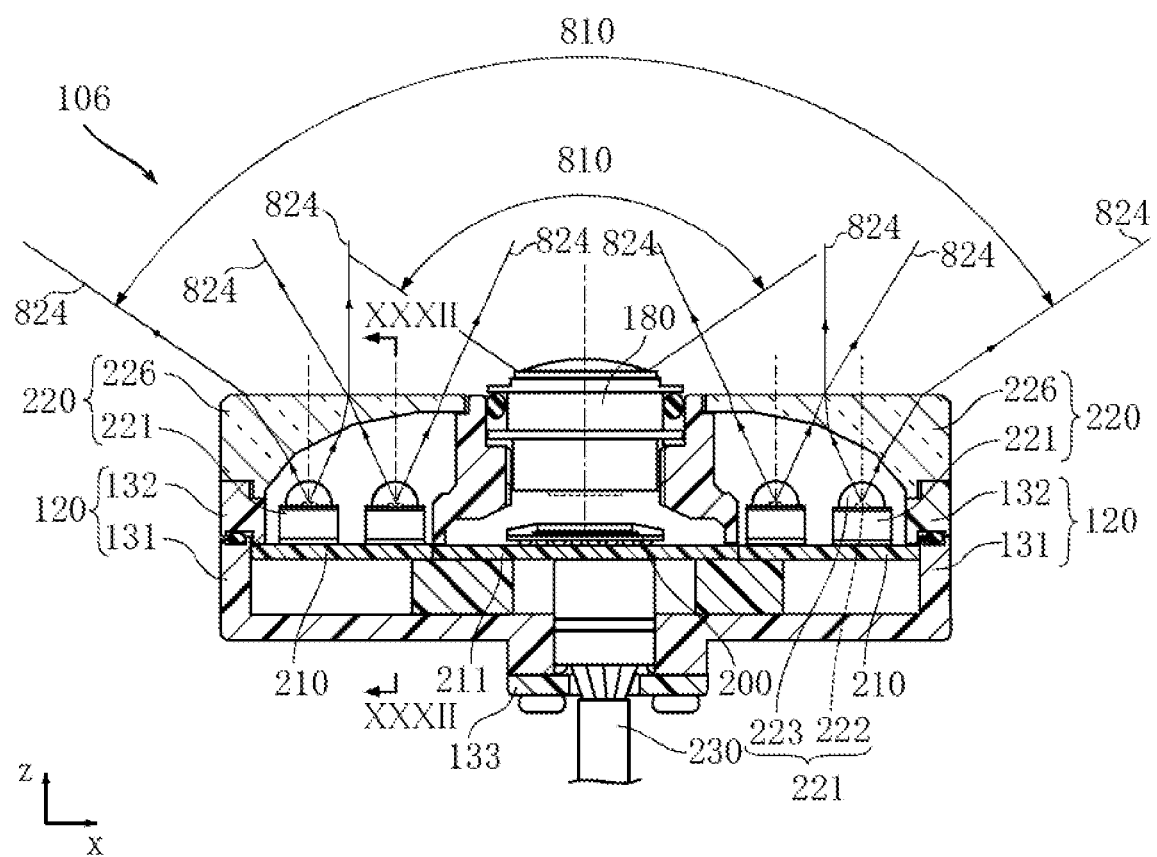
FIG. 31 is a cross section of the essential part along line XXXI-XXXI of FIG. 30.
Figure 32:
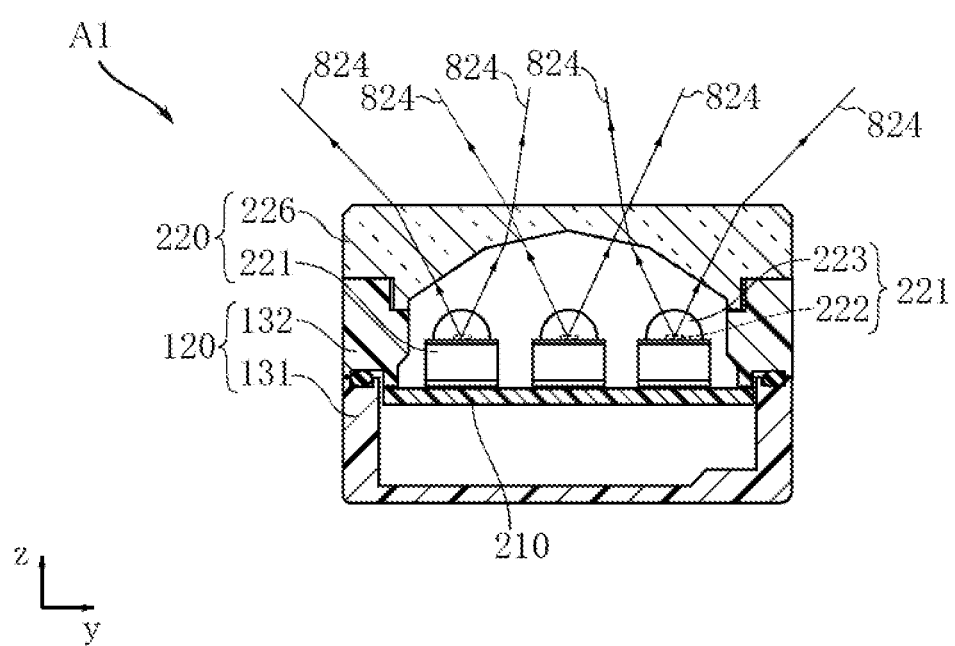
FIG. 32 is a cross section along line XXXII-XXXII of FIG. 31.

FIG. 30 to FIG. 32 show the fifth embodiment of the camera module according to the present invention. The camera module 106 of this embodiment comprises a case 120, an illuminator 220, substrates 210, 211, an imaging element 200, a lens unit 180, and a cable 230. The camera module 106 is used, for example, to film relatively dark places such as the in-vehicle status of a passenger vehicle or the status outside the vehicle at night. Incidentally, the cable 230 is omitted in FIG. 30. Moreover, in the ensuing explanation, the optical axis direction of the lens unit 180 is referred to as the z direction, and the directions that are orthogonal to the z direction are referred to as the x and y directions. Incidentally, each of the camera modules 106, 107 explained below can be used in substitute for the camera module 101 of the foregoing vehicle-mounted cameras 11 to 15.

The case 120 is made of black resin or the like, and includes a base part 131 and a supporting part 132. The base part 131 is formed so that the peripheral part is protruding in the z direction, and the substrates 210, 211 are housed at the inside of the peripheral part. The supporting part 132 is formed in a frame shape that is penetrated in the z direction, and is mounted on the peripheral part of the base part 131. The lower end of FIG. 31 in the z direction of the supporting part 132 fixes the peripheral part of the substrate 31 in the z direction. A waterproofing O-ring is provided between the base part 131 and the supporting part 132. In this embodiment, the case 120 has a relatively elongated rectangular parallelopiped shape. The case 120 is mounted with a cover 133 that opens only on one side in the z direction and which has a hole part for passing the cable 230 therethrough on the other side.

The substrate 210 is a printed circuit board made of glass epoxy resin or the like, and is mounted with a plurality of LED modules 221. The substrate 210 is housed in the case 120.

The imaging element 200 is equipped with a photoelectric conversion function of outputting the received light as screen image data, and is a CCD element, a CMOS element or the like. The imaging element 200 is mounted on the substrate 211. The substrate 211 is also a printed circuit board made of glass epoxy resin or the like as with the substrate 210. Incidentally, the substrate 211 is formed integrally with the substrate 210.

The lens unit 180 is an optical component for forming an image of external light in the imaging element 200, and comprises a plurality of lenses, a diaphragm, a lens holder, and the like. The lens and the diaphragm configure a lens group by being mutually laminated, its lens aberration is relatively small, and as a whole functions as a wide-angle lens having a viewing angle 810. In this embodiment, the viewing angle 810 is, for example, approximately 110 degrees. As a result of forming an image with the lens unit 180 in the imaging element 200, the camera module 106 is able to capture a viewing angle 810. The lens unit 180 is disposed at the center of the case 120 in the z directional vision.

The illuminator 220 is configured from twelve LED modules 221 mounted on the substrate 210, and an optical component 226. Each LED module 221 includes an LED chip 222 and a translucent head 223. LED chip 222 includes an n-type semiconductor layer and a p-type semiconductor layer made of GaAs or the like, and an active layer sandwiched therebetween, and is able to emit light of a wavelength in the infrared region. The translucent head 223 is made of resin material capable of permeating the infrared rays, and has a so-called shell shape in this embodiment. The translucent head 223 is used for improving the directionality and emitting the infrared rays that were emitted from the LED chip 222. The central axis of the shell-shaped translucent head 223 is along the z direction, and the infrared rays that are emitted through the translucent head 223 are the brightest in the z direction, and the brightness decreases as they are inclined relative to the z direction. FIG. 31 and FIG. 32 illustrate the traveling path of the infrared rays 824 having half the brightness of the maximum brightness which are emitted from the respective LED modules 221. The infrared rays 824 travel along a direction that is 25° deflected from the z direction until entering the optical component 226. Each LED module 221 emits the infrared rays 824 to the horizontal x direction in FIG. 31. The infrared rays that are within a range of 50° sandwiched between the infrared rays 824 among the infrared rays that are emitted from the respective LED modules 221 are relatively bright, and can be illuminated favorable. In order to favorably illuminate the object to the filmed, it is important to cause the light within the foregoing range to be efficiently emitted to the object to be filmed.

The twelve LED modules 221 are arranged, for example, such that three LED modules 211 each are arranged along the y direction on either side of the lens unit 180 in the x direction, and such that two LED modules 221 each are arranged along the x direction. The LED modules 221 disposed at a position that is closer to the lens unit 180 in the x direction are disposed so that the infrared rays 824 having half the brightness of the foregoing maximum brightness are not blocked by the lens unit 180.

The optical component 226 is installed in the supporting part 132 so as to expose the lens unit 180 and to cover the opening portion in the z direction of the case 120. The optical component 226 is a wide angle prism formed of resin or glass that permeates infrared rays. The term "wide angle prism" as used herein is not limited to a prism, and shall include lenses that yield similar effects. The optical component 226 is symmetric in the x direction by sandwiching the lens unit 180 as shown in FIG. 31, and formed to be thicker in the z direction as it draws apart from the lens unit 180 in the x direction. Moreover, as shown in FIG. 32, the optical component 226 is symmetric in the y direction, and formed to be thicker in the z direction toward both ends in the y direction. In addition, at the portion in which the thickness is relatively thin in the z direction, the inner surface of the optical component 226 is approximately vertical relative to the z direction, but at the relatively thick portion, the inclination relative to the z direction decreases. This kind of optical component 226 bends the incoming infrared rays so that they are drawn farther apart from the lens unit 180 in the x and y directions at the portions which are farther from the lens unit 180 in the x and y directions.

In this embodiment, the optical component 226 emits the infrared rays from the LED modules 221 directly without any bending in the portion that is closest to the lens unit 180. Meanwhile, the optical component 226 is formed to bend the infrared rays 824 to travel in a direction that is inclined 55° relative to the z direction at the end portion that is farthest from the lens unit 180.

The LED module 221 of this embodiment is configured so that it can emit infrared rays. The camera module 106 is thereby able to capture images in a relatively dark place without causing the nearby people to feel any brightness.

The cable 230 is used for supplying power to the camera module 106, receiving a filming command signal, sending a captured data signal and so on, and is connected to the substrate 211 via a connector or the like.

The operation of the camera module 106 is now explained.

With this kind of camera module 106, the infrared rays emitted from the LED module 221 disposed at a position that is relatively close to the lens unit 180 will continue to travel without being bent considerably by the optical component 226. Meanwhile, the infrared rays emitted from the LED module 221 disposed at a position that is relatively far from the lens unit 180 are bent by the optical component 226 so as to draw apart from the lens unit 180. Thus, as shown in FIG. 31, it is difficult for the areas sandwiched between the infrared rays 824 of the respective LED modules 221 capable of being illuminated favorably to mutually overlap. According to FIG. 31, overlapping areas among the areas sandwiched between the infrared rays 824 of the respective LED modules 221 are the areas to which infrared rays from the respective LED modules 221 of a relatively low brightness will reach, and the brightness will not overly increase. In case of FIG. 32 also, it could be said that it is difficult for the infrared rays emitted from the respective LED modules 221 to overlap. Accordingly, with the illuminator 220 in the camera module 106, since the infrared rays emitted from the respective LED modules 221 are not easily biased in a specific direction, it is possible to illuminate an even broader area with infrared rays having a uniform brightness.

Moreover, with this embodiment, the optical component 226 emits, from its edge, infrared rays 824 in a direction that is inclined 55° relative to the z direction. Thus, as shown in FIG. 31, the angle of the range that can be favorably illuminated with the infrared rays emitted from the optical component 226 will be, together with the horizontal x direction, 110° which is the same as the viewing angle 810 of the lens unit 180. Thus, the camera module 106 is able to emit infrared rays and illuminate the overall range that can be read with the lens unit 180. Accordingly, the camera module 106 is able to film the imaging area by illuminating the imaging area with a more favorable illumination.

Moreover, in this embodiment, the LED modules 221 are disposed so that the infrared rays from the LED modules 221 disposed at a position that is relatively close to the lens unit 180 will not be blocked by the lens unit 180. In addition, since the optical component 226 hardly bends the infrared rays at a portion that is close to the lens unit 180, the infrared rays from the LED modules 221 are not blocked easily by the lens unit 180 even after passing through the optical component 226. Furthermore, since the infrared rays are not bent easily near the lens unit 180, it is possible to prevent the infrared rays emitted from the illuminator 220 from incorrectly entering into the lens unit 180. Thus, the camera module 106 is able to efficiently illuminate a wide range without wasting the infrared rays emitted from the LED modules 221.

Moreover, in this embodiment, the substrate 210 and the substrate 211 are configured integrally, and this configuration is suitable for mass production.

Incidentally, in the foregoing embodiment, the viewing angle 810 is set to 110° and the optical component 226 is formed so that it is able to illuminate the range of the same angle as the viewing angle 810. In the present invention, the viewing angle 810 of the wide-angle lens can be changed, for example, within the range of 60° to 180°, and the optical component 226 can be configured to illuminate the range of the same angle as the viewing angle 810, for example, by adjusting its thickness. Further, in the foregoing embodiment, the LED modules 221 are able to illuminate a range of 50° with favorable infrared rays. However, this angle can be changed within the range of 30° to 60°.

Figure 33:
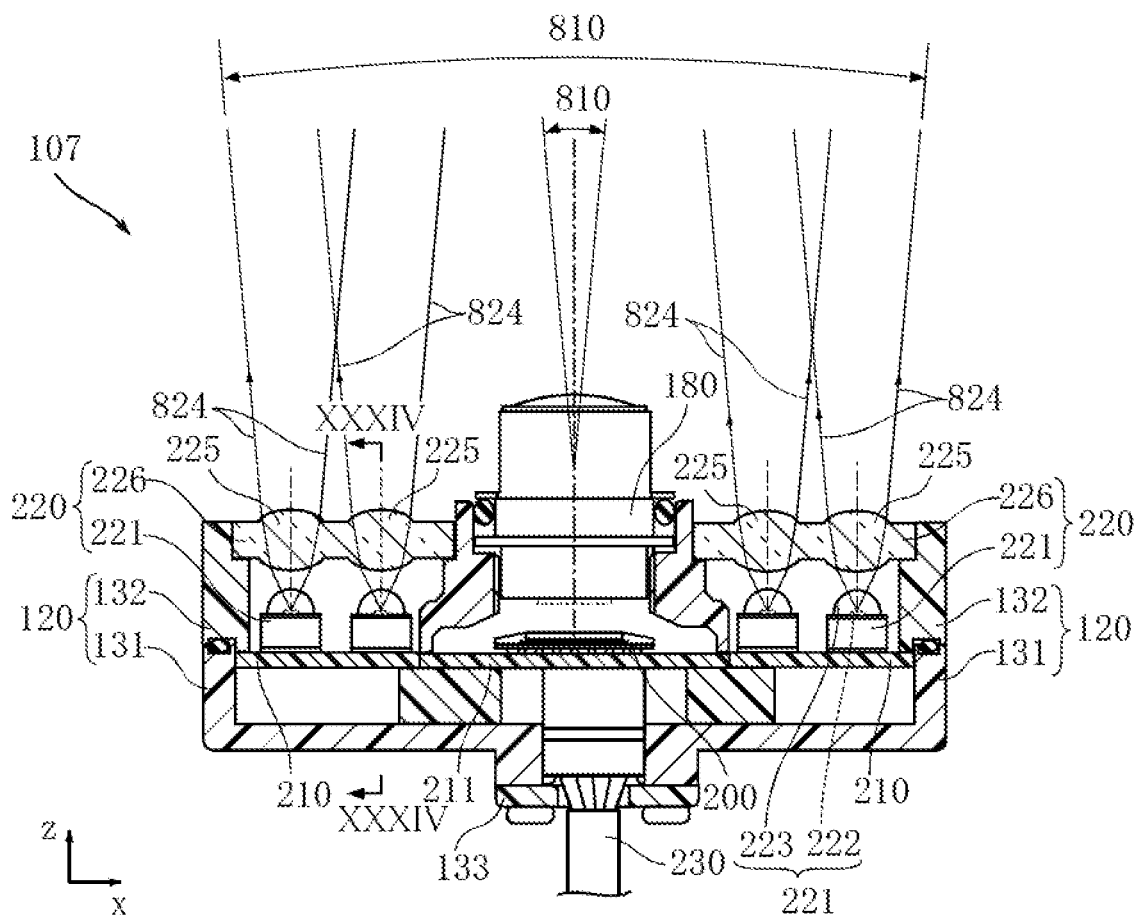
FIG. 33 is a cross section showing the sixth embodiment of the camera module according to the present invention.
Figure 34:
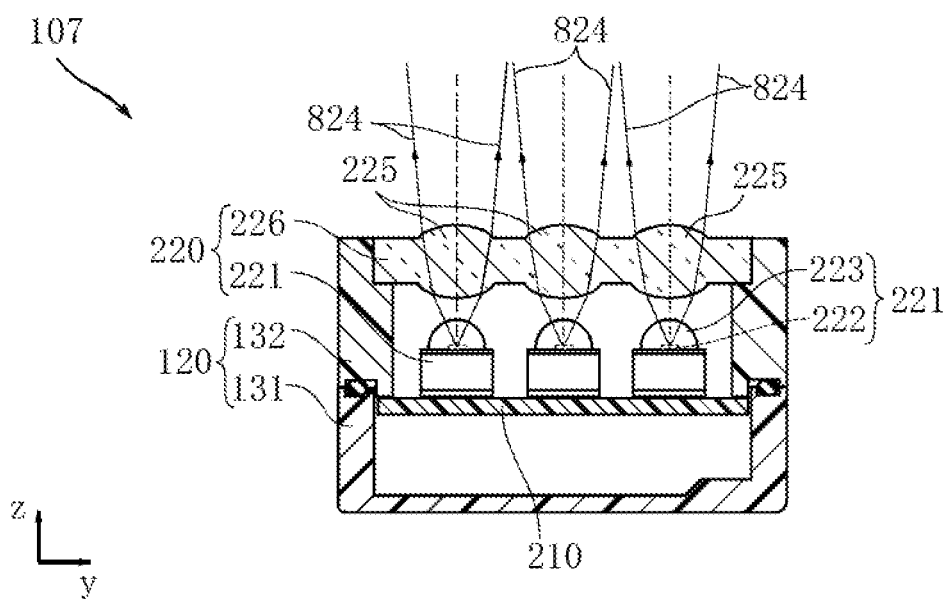
FIG. 34 is a cross section along line XXXIV-XXXIV of FIG. 33.

FIG. 33 and FIG. 34 show the sixth embodiment of the camera module according to the present invention. With the camera module 107 of this embodiment, the configuration of the lens unit 180 and the optical component 226 differs from the foregoing camera module 106. Moreover, the shape of the supporting part 132 is made to match the shape of the optical component 226. The remaining configuration of the camera module 107 is the same as the camera module 106, and the explanation thereof is omitted as appropriate. The camera module 107 is used, for example, as a monitor camera capable of monitoring afar at night.

The lens unit 180 in the camera module 107 is an optical component for forming an image of external light in the imaging element 200, and comprises a plurality of lenses, a diaphragm, a lens holder, and the like. The lens and the diaphragm configure a lens group by being mutually laminated, its lens aberration is relatively small, and as a whole functions as a narrow-angle lens having a viewing angle 810. In this embodiment, the viewing angle 810 is, for example, approximately 10 degrees. As a result of forming an image with the lens unit 180 in the imaging element 200, the camera module 107 is able to capture a viewing angle 810. The lens unit 180 is disposed at the center of the case 120 in the z directional vision.

The optical component 226 in the camera module 107 is a convex lens array having twelve convex lens parts 225. The twelve convex lens parts 225 are respectively formed at a position that overlaps with the twelve LED modules 221 in the z directional vision. As shown in FIG. 33 and FIG. 34, each convex lens part 225 narrows the angle of the infrared rays from the respective LED modules 221. In this embodiment, each convex lens part 225 bends the infrared rays traveling along a direction that is inclined 25° relative to the z direction so that they travel along a direction that is inclined 5° relative to the z direction. According to this kind of configuration, the angle of the range where the illuminator 220 is able to illuminate favorably will be the same as the viewing angle 810 of the lens unit 180.

The operation of the camera module 107 is now explained.

With the camera module 107, filming of objects in the distance is enabled by narrowing the viewing angle 810 of the lens unit 180. Moreover, the camera module 107 inhibits the diffusion of the infrared rays by narrowing the angle of the infrared rays from the respective LED modules 221 based on the optical component 226, and thereby enables the illumination of objects in the distance. Accordingly, the camera module 107 is able to film an imaging area in the distance by illuminating the imaging area favorably.

The camera module 107 is configured the same as the camera module 106 other than the lens unit 180, the optical component 226, and the supporting part 132. Thus, it is possible to seek cost reduction by sharing these common components during the manufacture of both camera modules 106, 107.

The viewing angle 810 of the lens unit 180 in the camera module 107 is 10°. However, the viewing angle 810 of the narrow-angle lens in the present invention can be changed within a range of 60° or less. The optical component 226 is able to realize the narrowing of the angle to match the viewing angle 810 of the foregoing range, for example, by changing the thickness of the respective convex lens parts 225.

The camera module according to the present invention is not limited to the foregoing embodiments. The specific configuration of the respective components of the camera module according to the present invention can be freely subject to various design changes.

The LED module referred to in the present invention is not limited to emitting infrared rays, and may also emit visible light such as white light.

Figure 35:
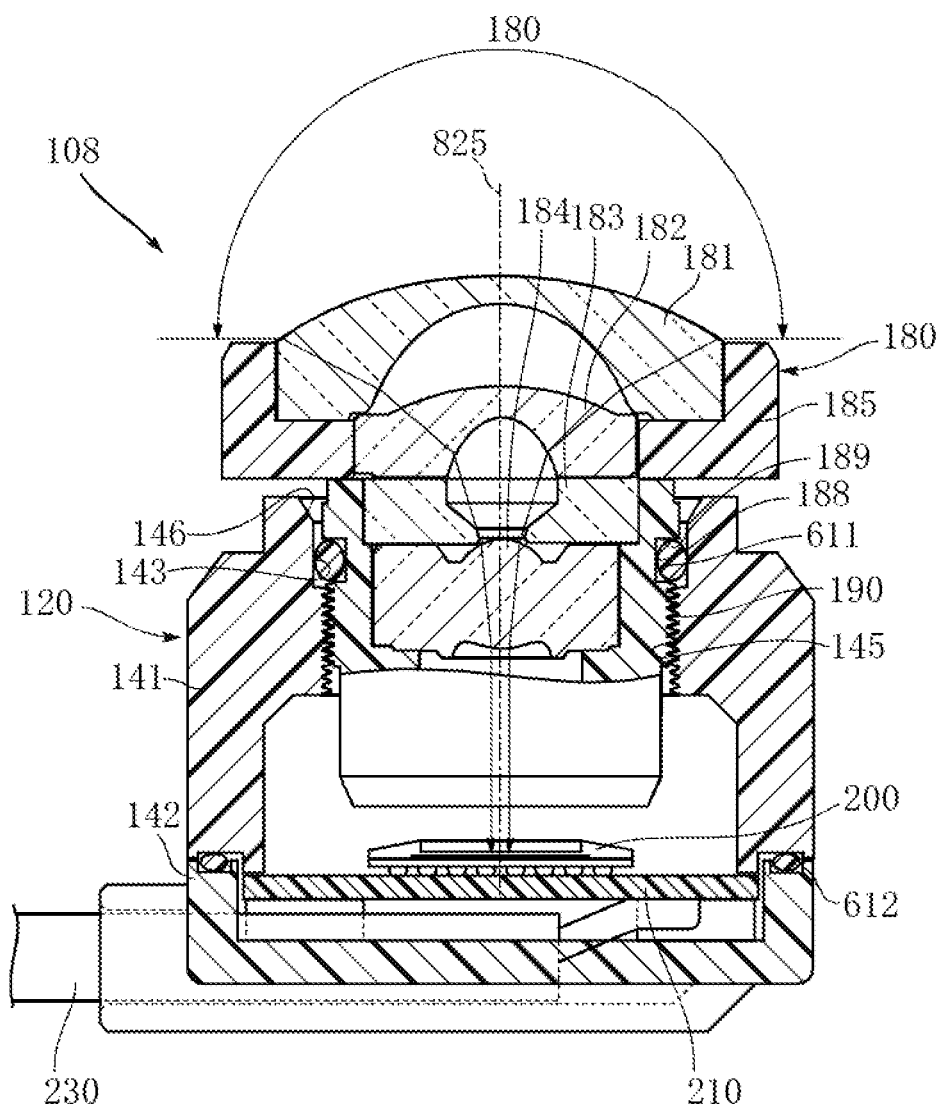
FIG. 35 is a cross section showing the seventh embodiment of the camera module according to the present invention.

FIG. 35 shows the seventh embodiment of the camera module according to the present invention. The camera module 108 of this embodiment comprises a case 120, a substrate 210, an imaging element 200, and a lens unit 180. The camera module 108 is used as an imaging means of a so-called rearview monitor by being mounted outside the vehicle. Incidentally, each of the camera modules 108, 109 explained below can be used in substitute for the camera module 101 of the foregoing vehicle-mounted cameras 11 to 15.

The case 120 is made of black resin or the like, and is of a block construction having an upper part 141 and a lower part 142. The upper part 141 and the lower part 142 are mutually joined so as to sandwich the O-ring 612. The case 120 has a substrate 210 and an imaging element 200 built therein. A female screw 145, an inner peripheral surface 143 and a cone-shaped surface 146 are formed at the upper part 141 of the case 120. The female screw 145 has the rotating axis 825 as its central axis. The inner peripheral surface 143 also has the rotating axis 825 as its central axis, and is parallel to the rotating axis 825. In this embodiment, the inner peripheral surface 143 is adjacent to the upper end of the female screw 145. The cone-shaped surface 146 is adjacent to the upper part of the inner peripheral surface 143, and is of a shape in which its cross section diameter increases as it draws apart from the imaging element 200 in the extending direction of the rotating axis 825.

The substrate 210 is made of glass epoxy resin or the like, and is formed with a wiring pattern not shown. A cable 230 is mounted on the back face of the substrate 210. The cable 230 is extending outward via the lateral through-hole that is formed on the lower part 142 of the case 120. The imaging element 200 is equipped with a photoelectric conversion function of outputting the received light as screen image data, and is a CCD element, a CMOS element or the like. The imaging element 200 is mounted on the wiring pattern (not shown) of the substrate 210 described above, and its center basically coincided with the rotating axis 825.

The lens unit 180 is an optical component for forming an image of external light in the imaging element 200, and comprises a plurality of lenses 181, 182, 184, a diaphragm 183 and a lens holder 185. The lens holder 185 retains the plurality of lenses 181, 182, 184 and the diaphragm 183 so that their respective optical axes all coincide with the rotating axis 825, and is made of black resin or the like. The plurality of lenses 181, 182, 184 and the diaphragm 183 configure a lens group by being mutually laminated, its lens aberration is relatively small, and has a viewing angle 810 of 180 degrees or more. As a result of forming an image with the lens unit 180 in the imaging element 200, the camera module 108 is able to capture a viewing angle 810 of 180 degrees or more.

The lens holder 185 is formed with a male screw 190. The male screw 190 has the rotating axis 825 as its central axis, and is screwed with the female screw 145 of the case 120. An annular groove 189 is formed at the upper part of the male screw 190. The annular groove 189 is centered around the rotating axis 825, and is adjacent to the upper end of the male screw 190 in this embodiment. The bottom surface of the annular groove 189 is used as the outer peripheral surface 188. The outer peripheral surface 188 also has the rotating axis 825 as its central axis, and is parallel to the rotating axis 825.

In this embodiment, the diameter of the male screw 190 and the outer peripheral surface 188 is smaller than the maximum diameter portion of the lens unit 180; that is, the portion encompassing the lens 181 with the maximum diameter. Accordingly, as the overall lens unit 180, the upper portion encompassing the lens 181 is relatively large, and the male screw 190 and the lower portion where the outer peripheral surface 188 is formed have a relatively small shape. It is essential to increase the diameter of the lens 181 in order to achieve an angle of 180 degrees or more as the viewing angle 810.

FIG. 35 shows the completed state of the camera module 108, and the male screw 190 and the female screw 145 are screwed together, and the inner peripheral surface 143 and the outer peripheral surface 188 are facing each other. The O-ring 611 is sandwiched between the inner peripheral surface 143 and the outer peripheral surface 188. The O-ring 611 is used for preventing the infiltration of water from the gap between the case 120 and the lens unit 180, and, in this embodiment, a type having a hardness of approximately 50 degrees is used in a state of being compressed to a compressibility of approximately 30%. Incidentally, preferably used as the O-ring 611 is a type having a hardness of 40 to 70 degrees at a compressibility of 20 to 50%.

The assembly of the camera module 108 is now explained with reference to FIG. 36 and FIG. 37.

Figure 36:
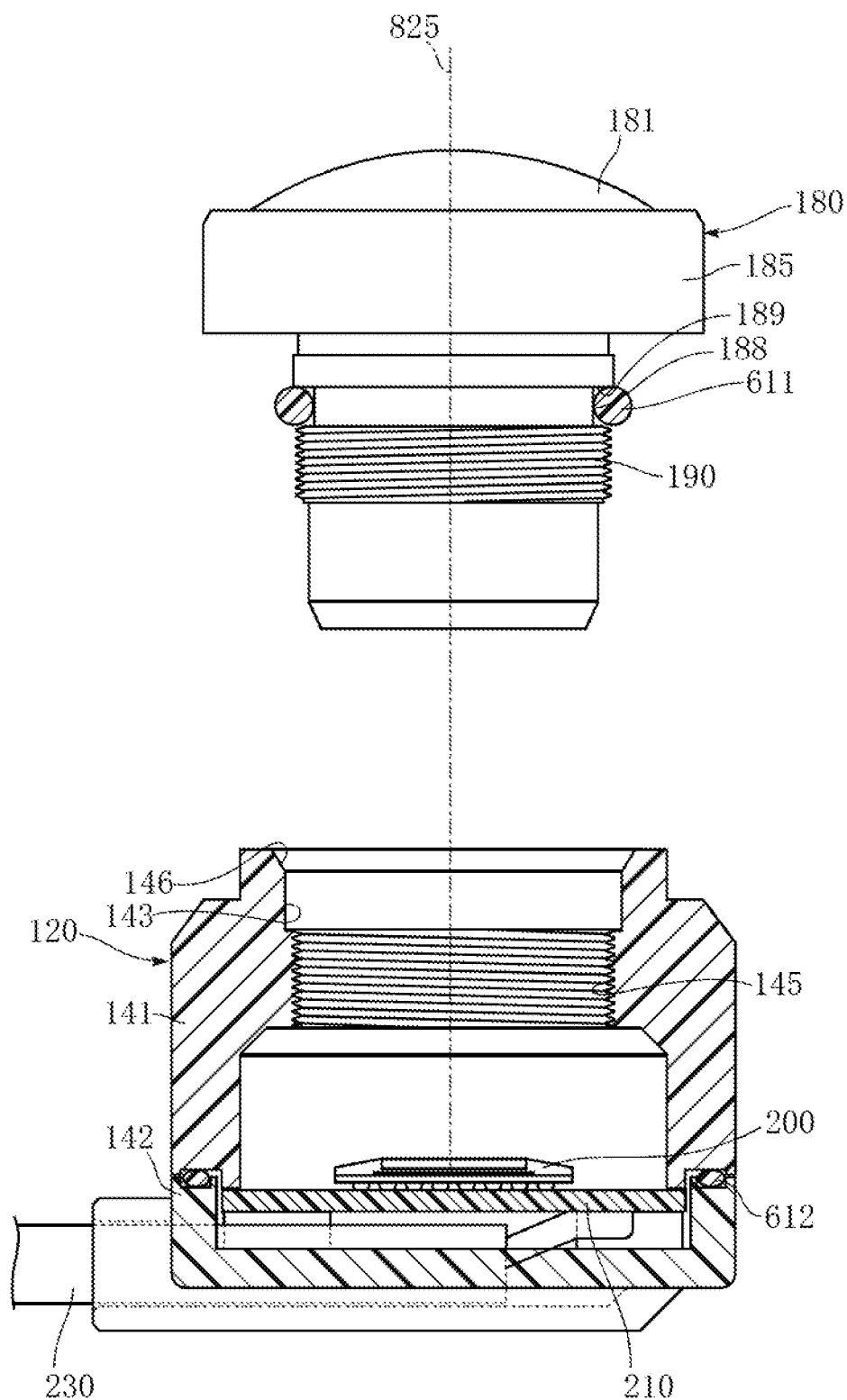
FIG. 36 is a cross section showing the assembly of the camera module shown in FIG. 35.

Foremost, as shown in FIG. 36, the substrate 210, the imaging element 200, and the cable 230 are mounted on the lower part 142 and the upper part 141 and the lower part 142 are joined to complete the case 120. Moreover, the lens unit 180 is prepared, and the O-ring 611 is loaded in the annular groove 189. In this state, the cross-section surface of the O-ring 611 is approximately a true circle.

Figure 37:
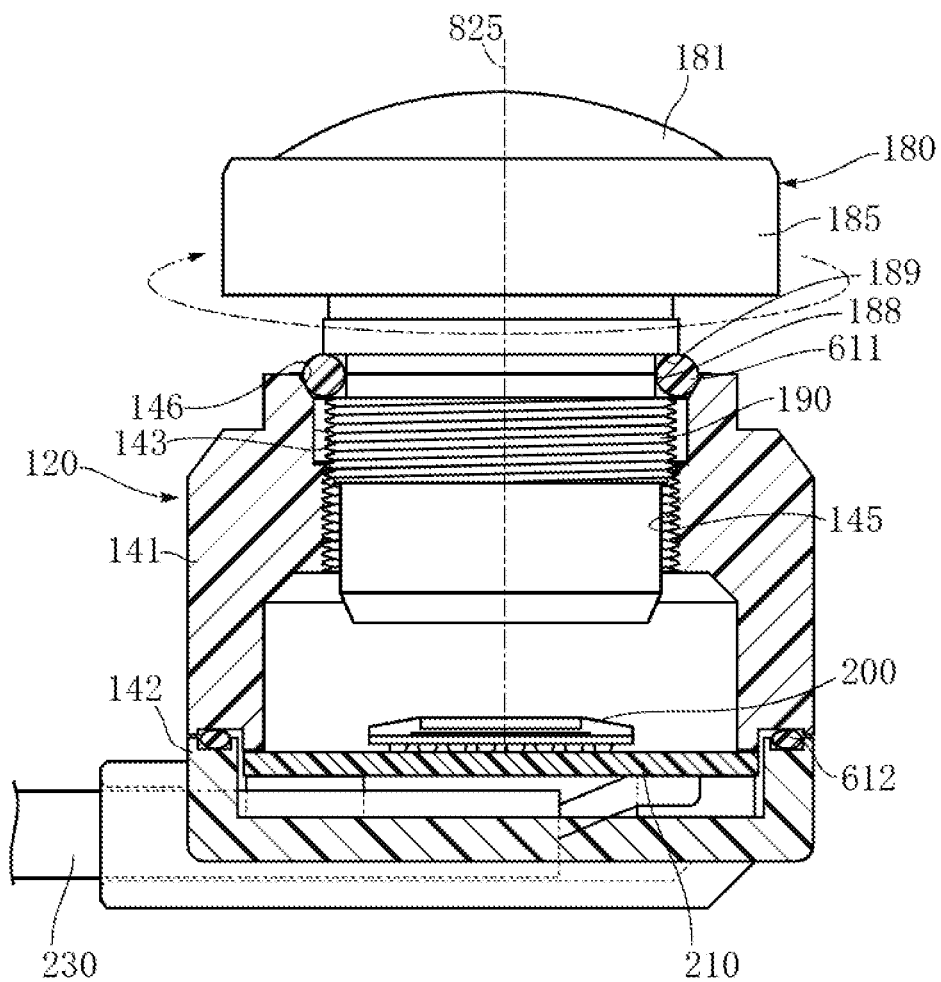
FIG. 37 is a cross section showing the process of inserting the lens unit into the assembly of the camera module shown in FIG. 35.

Subsequently, as shown in FIG. 37, the case 120 is inserted into the lower portion of the lens unit 180. Then, the lens unit 180 is rotated around the rotating axis 825 while screwing the male screw 190 with the female screw 145. More specifically, FIG. 37 shows the state immediately after starting the rotating, and the O-ring 611 is in contact with the cone-shaped surface 146. If the lens unit 180 is further rotated from this state, the lens unit 180 will come down along the rotating axis 825. Then the O-ring 611 bound by the annular groove 189 is drawn into the lower portion while sliding against the cone-shaped surface 146.

When the lens unit 180 is rotated even further, the O-ring 611 is sandwiched between the outer peripheral surface 188 and the inner peripheral surface 143. Here, the O-ring 611 is compressed at a compressibility of approximately 30%, and its cross-section surface is an oval shape as shown in FIG. 35. For example, the rotation of the lens unit 180 is stopped at a well-focused position while confirming the display of the screen image captured with the imaging element 200 of the test pattern disposed at the upper part of the lens unit 180. Consequently, the focusing process of the lens unit 180 and the imaging element 200 and the waterproof treatment between the lens unit 180 and the case 120 are complete, and the assembly of the camera module 108 is complete.

The operation of the camera module 108 is now explained.

According to this embodiment, by rotating the lens unit 180 around the case 120, the focusing of the lens unit 180 and the imaging element 200 can be performed. The degree that the lens unit 180 needs to be raised or lowered for the fine tuning of the focusing process is small. Thus, during the focusing process, the O-ring 611 is in a state of being sandwiched between the outer peripheral surface 188 and the inner peripheral surface 143. Consequently, when the focusing is complete, the O-ring 611 is in a state of being compressed between the outer peripheral surface 188 and the inner peripheral surface 143. The compressed O-ring 611 inhibits the lens unit 180 from rotating incorrectly around the case 120 after the focusing is complete. Accordingly, with the camera module 108, it is possible to simultaneously complete the focusing of the lens unit 180 and the imaging element 200 and the waterproof treatment process of the lens unit 180 and the case 120, and the production efficiency of the camera module 108 can be improved thereby.

As a result of using the bottom surface of the annular groove 189 as the outer peripheral surface 188, the O-ring 611 can be bound relative to the outer peripheral surface 188. This is preferable in preventing the O-ring 611 from becoming incorrectly misaligned when installing the lens unit 180 into the case 120.

As a result of providing the cone-shaped surface 146, the O-ring 611 is lured by cone-shaped surface 146 when the lens unit 180 is entered into the case 120. It is thereby possible to appropriately dispose the O-ring 611 between the outer peripheral surface 188 and the inner peripheral surface 143.

The portion that infiltrates the case 120 of the lens unit 180; that is, the lower portion formed with the male screw 190 and the outer peripheral surface 188 is smaller than the upper portion encompassing the lens 181. Thus, even though a lens 181 with a relatively large diameter is provided, the case 120 for housing the lower portion of the lens unit 180 is formed in to a relatively small shape which is just slightly larger than the upper portion of the lens unit 180. Consequently, the miniaturization of the overall camera module 108 can be sought even upon comprising a relatively large lens 181 capable of achieving a viewing angle 810 of 180 degrees or more.

Figure 38:
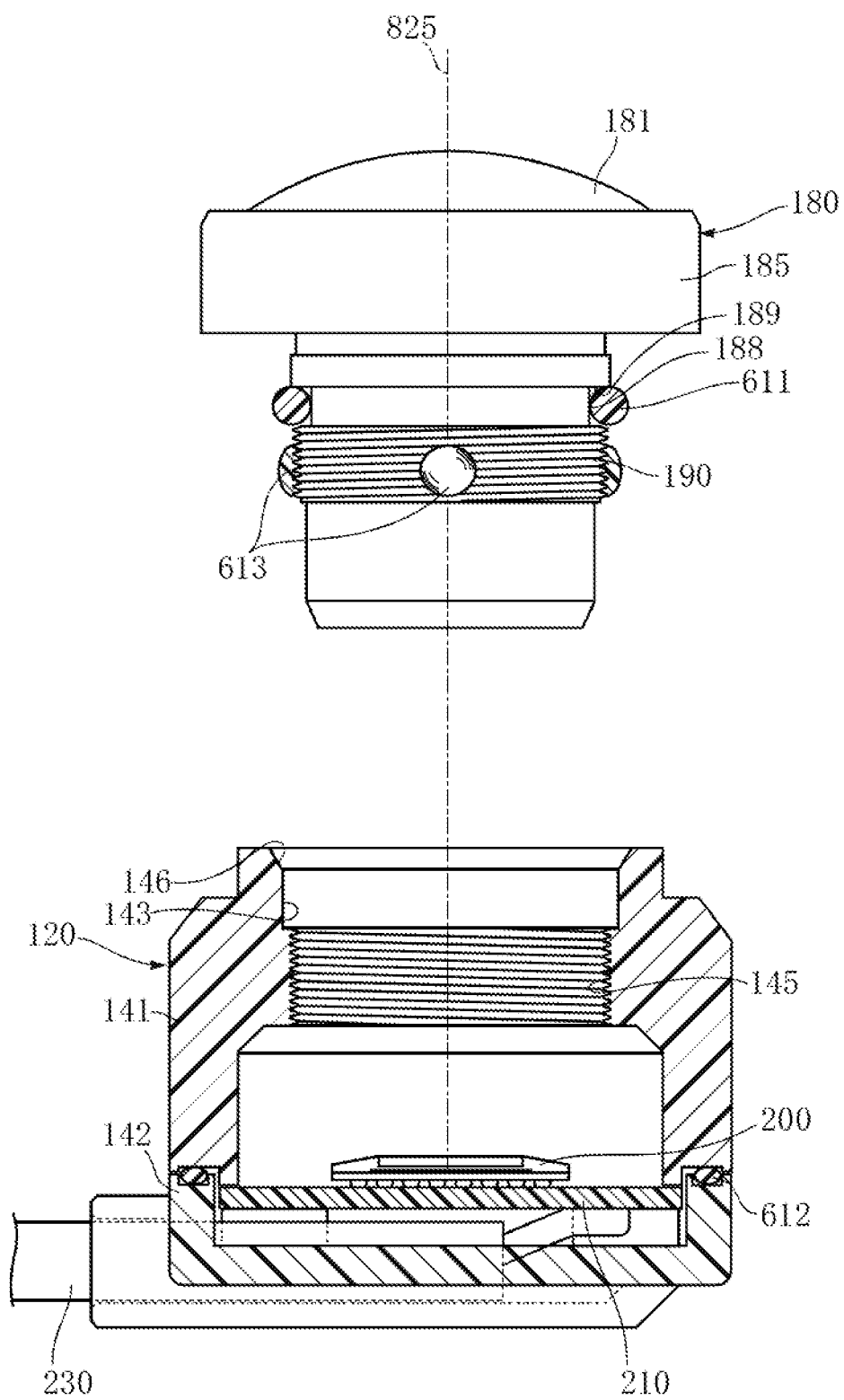
FIG. 38 is a cross section showing the assembly of a modified example of the camera module shown in FIG. 35.
Figure 39:
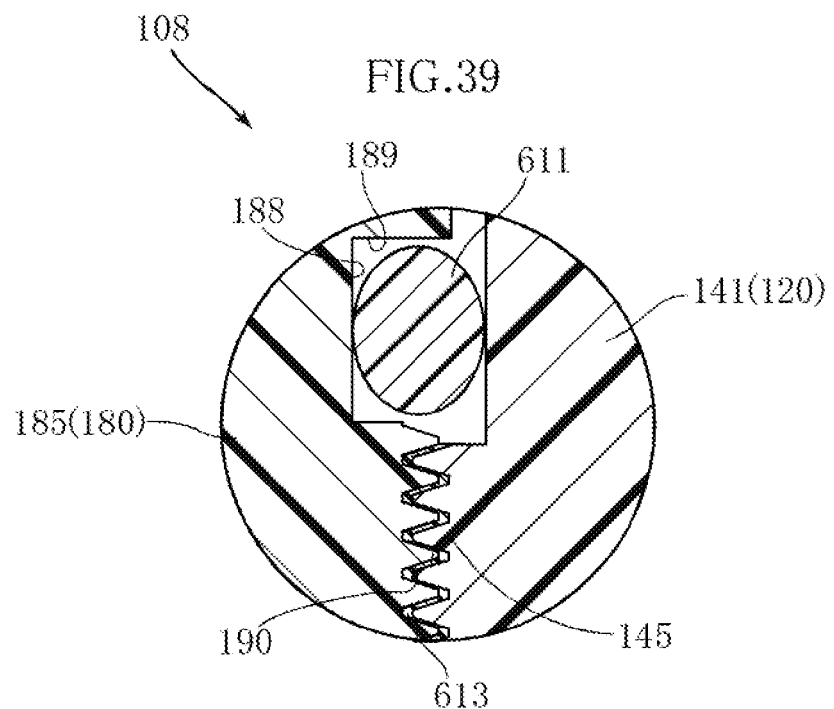
FIG. 39 is a cross section of the essential part showing a modified example of the camera module shown in FIG. 35.

FIG. 38 shows the assembly process of a modified example of the camera module 108. In this modified example, prior to the process of mounting the lens unit 180 on the case 120, an adhesive 613 is applied to the male screw 190 of the lens unit 180. The lens unit 180 is mounted on the case 120 according to the foregoing procedures with reference to FIG. 37. Consequently, when the focusing of the imaging element 200 of the lens unit 180 is complete, the male screw 190 and the female screw 145 are bonded with the adhesive 613 as shown in FIG. 39. According to this kind of modified example, the lens unit 180 can be reliably fixed to the case 120 in a focused state.

In addition to the foregoing modified example, for example, the fixation of the lens unit 180 to the case 120 can be reinforced by applying the adhesive 613 to the wall surface that is adjacent to the lower portion of the male screw 190 of the lens unit 180. Otherwise, after the focusing is complete, the fixation of the lens unit 180 and the case 120 can be reinforced based on so-called ultrasonic welding of applying ultrasonic vibration and pressure to the lens unit 180.

FIG. 40 to FIG. 47 show another embodiment of the present invention. Incidentally, the elements in these drawings that are the same as or similar to the foregoing embodiments are given the same reference numeral as the foregoing embodiments.

Figure 40:
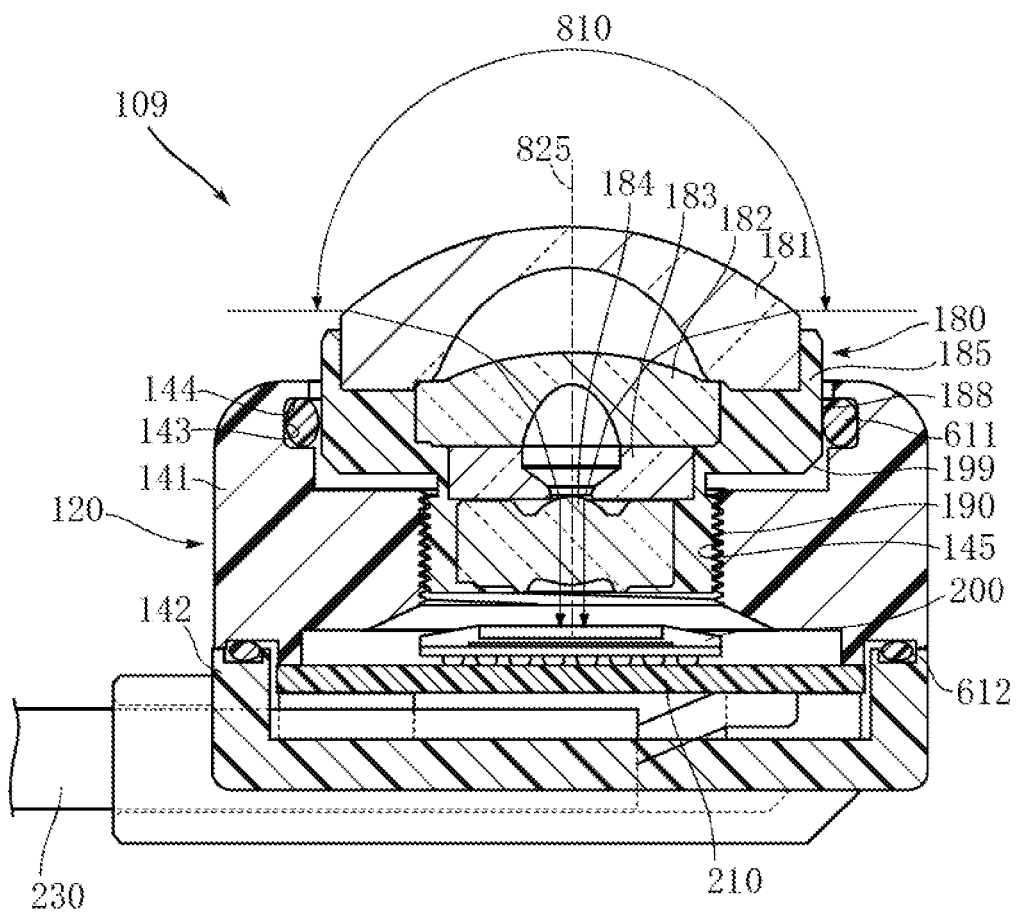
FIG. 40 is a cross section showing the eighth embodiment of the camera module according to the present invention.

FIG. 40 shows the eighth embodiment of the camera module according to the present invention. The camera module 109 of this embodiment differs from the foregoing camera module 108 mainly regarding the shape of the lens unit 180 and the structure of the upper part 141 of the case 120.

In this embodiment, an annular groove 144 is formed at the upper part 141 of the case 120. The annular groove 144 has the rotating axis 825 as its central axis. In addition, the bottom surface of the annular groove 144 is used as the inner peripheral surface 143.

Moreover, the outer surface of the maximum diameter portion of the lens unit 180 is used as the outer peripheral surface 188. The maximum diameter portion is the portion that encompasses the largest lens 181 among the lenses 181, 182, 184. Consequently, in this embodiment, most of the lens unit 180 is housed in the case 120. In addition, a cone-shaped surface 199 is formed on the lens holder 185. The cone-shaped surface 199 is adjacent to the lower end of the outer peripheral surface 188, and has a shape in which its cross section diameter decreases as it heads toward the imaging element 200 in the extending direction of the rotating axis 825.

The assembly of the camera module 109 is now explained with reference to FIG. 41 to FIG. 45.

Figure 41:
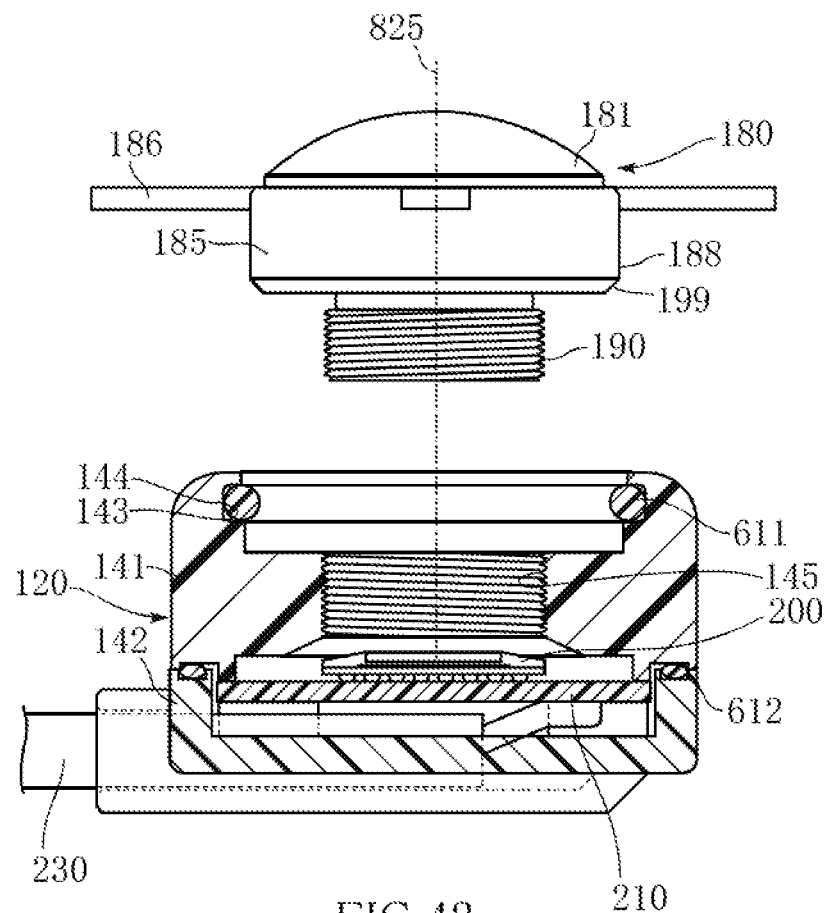
FIG. 41 is a cross section showing the assembly of the camera module shown in FIG. 40.
Figure 42:
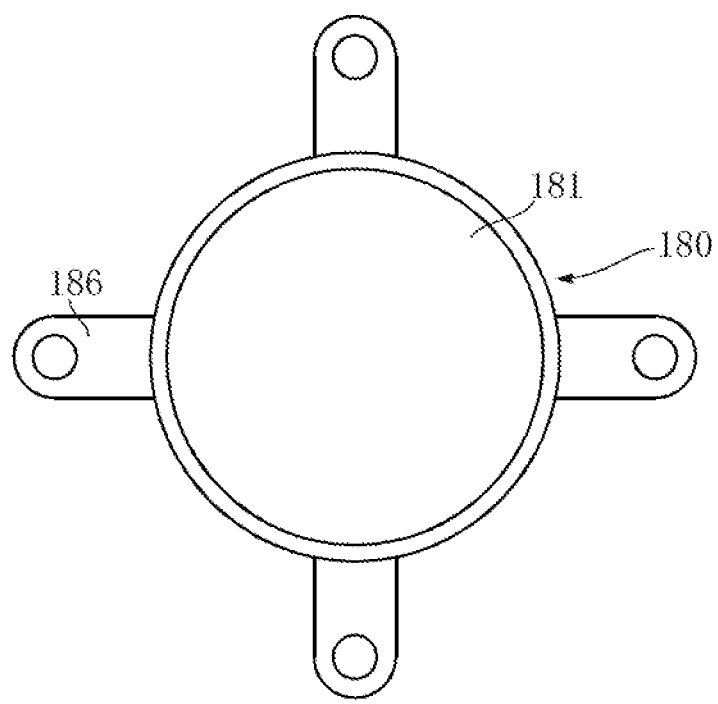
FIG. 42 is a plan view showing the lens unit when the camera module shown in FIG. 40 is assembled.

Foremost, as shown in FIG. 41, in this embodiment, the O-ring 611 is loaded into the annular groove 144 of the case 120. Moreover, a plurality of levers 186 are formed on the lens holder 185 of the lens unit 180. As shown in FIG. 41 and FIG. 42, the plurality of levers 186 are distanced from each other at 90 degree angles, and are respectively extending in the radial direction around the rotating axis 825.

Figure 43:
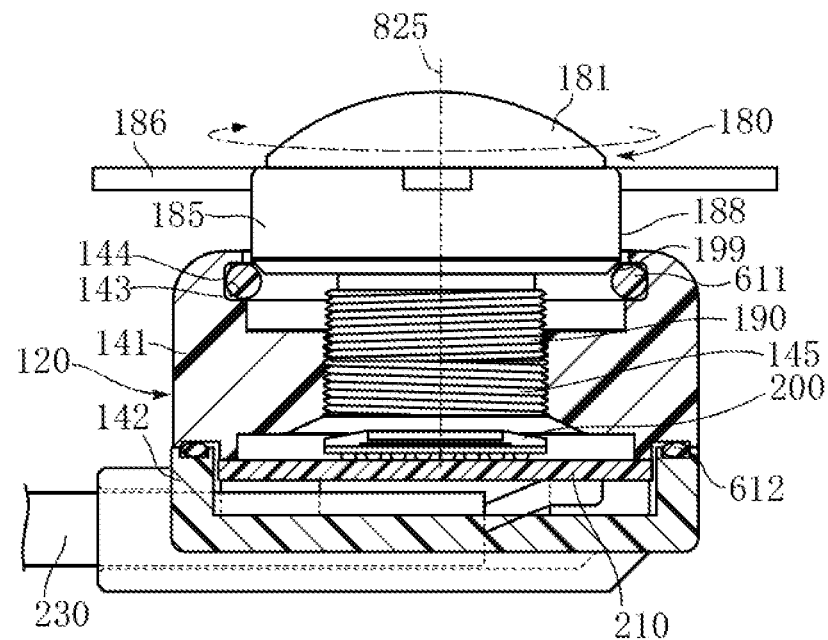
FIG. 43 is a cross section showing the process of inserting the lens unit in the assembly of the camera module shown in FIG. 40.

Subsequently, as shown in FIG. 43, the lens unit 180 is lowered toward the case 120 and the male screw 190 is screwed with the female screw 145. Then the lens unit 180 is rotated while gripping the lever 186. The lens unit 180 is thereby lowered into the case 120. FIG. 43 shows a state immediately before the cone-shaped surface 199 of the lens unit 180 comes in contact with the O-ring 611.

Figure 44:
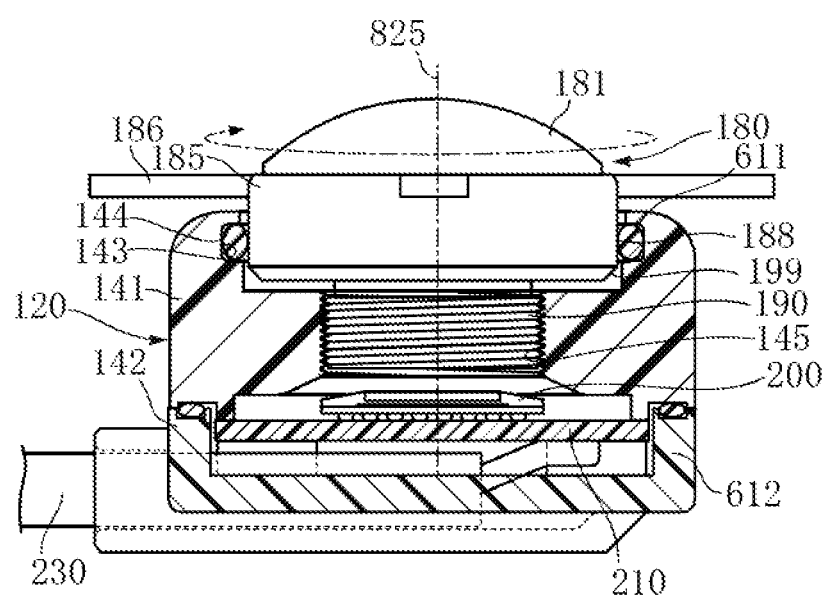
FIG. 44 is a cross section showing the process of inserting the lens unit in the assembly of the camera module shown in FIG. 40.

When the lens unit 180 is rotated further, the lens unit 180 is lowered toward the case 120 as shown in FIG. 44. During this lowering process, the O-ring 611 is caused to deform after the cone-shaped surface 199 comes in contact with the O-ring 611. Here, the O-ring 611 will not come off in the vertical direction since it is bound by the annular groove 144. The O-ring 611 is then sandwiched between the outer peripheral surface 188 and the inner peripheral surface 143 in a state or being compressed at approximately 30%. When the lens unit 180 is lowered to an appropriate position for performing the focusing process, the foregoing focusing process is performed.

Figure 45:
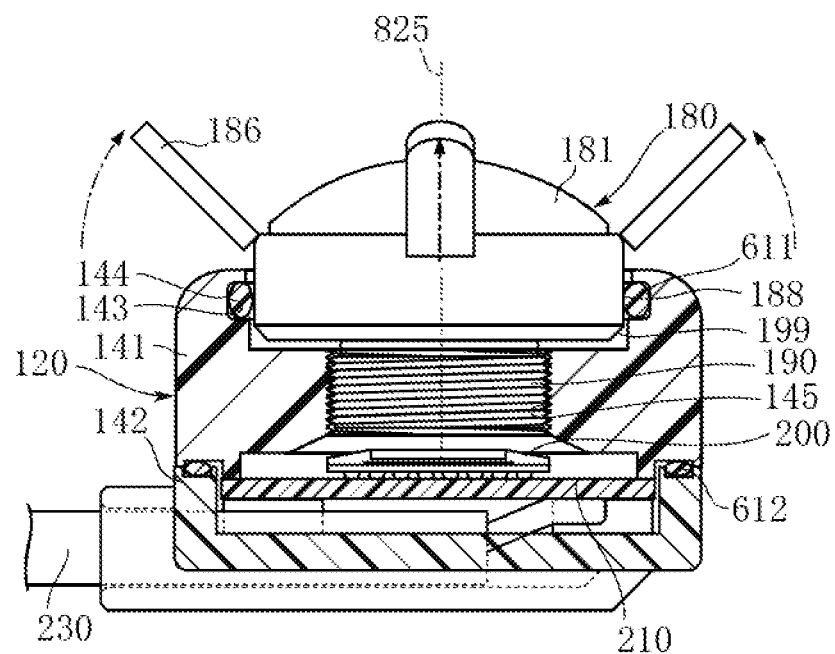
FIG. 45 is a cross section showing the process of removing the levers in the assembly of the camera module shown in FIG. 40.

When the focusing is complete, as shown in FIG. 45, the lever 186 is removed from the lens unit 180 by bending the lever 186 upward. The camera module 109 is thereby complete.

Even with this kind of embodiment, as with the embodiments described above, the focusing of the lens unit 180 and the imaging element 200 and the waterproof treatment process of the lens unit 180 and the case 120 can be simultaneously completed, and the production efficiency of the camera module 109 can be improved thereby. In addition, the prevention of displacement of the O-ring 611 with the annular groove 144 and the smooth change in compression of the O-ring 611 with the cone-shaped surface 199 can be expected.

As a result of housing the maximum diameter portion of the lens unit 180 in the case 120, the outer shape of the camera module 109 will be a smooth shape without many irregularities. Consequently, it is possible to inhibit the camera module 109 from getting hooked to an obstacle when it is mounted outside the vehicle, and lower the possibility of damage. If the lever 186 is used for the assembly, it is possible to overcome the inconvenience of having difficulty in rotating the lens unit 180 even though most of the lens unit 180 is housed in the case 120.

Figure 46:
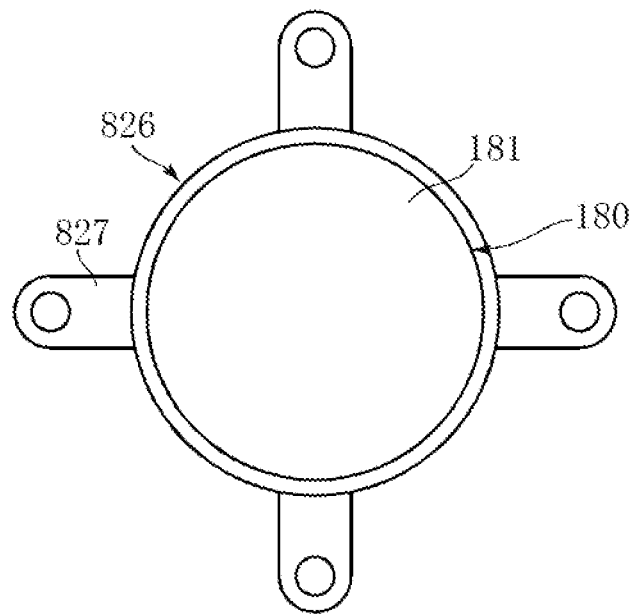
FIG. 46 is a plan view showing the lens unit and the mounting tool when the camera module of a modified example of the eighth embodiment according to the present invention is assembled.
Figure 47:
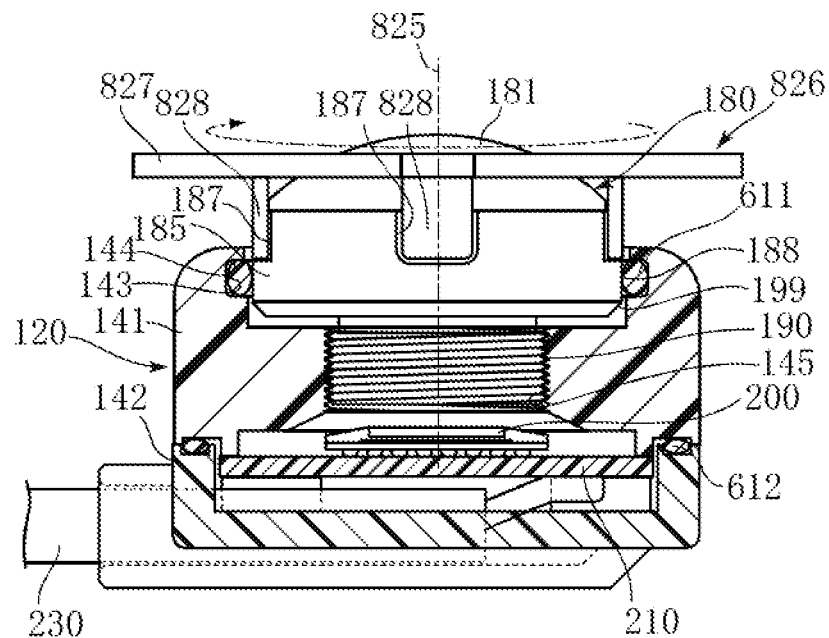
FIG. 47 is a cross section showing the assembly of a modified example of the eighth embodiment of the camera module according to the present invention.
Figure 48:
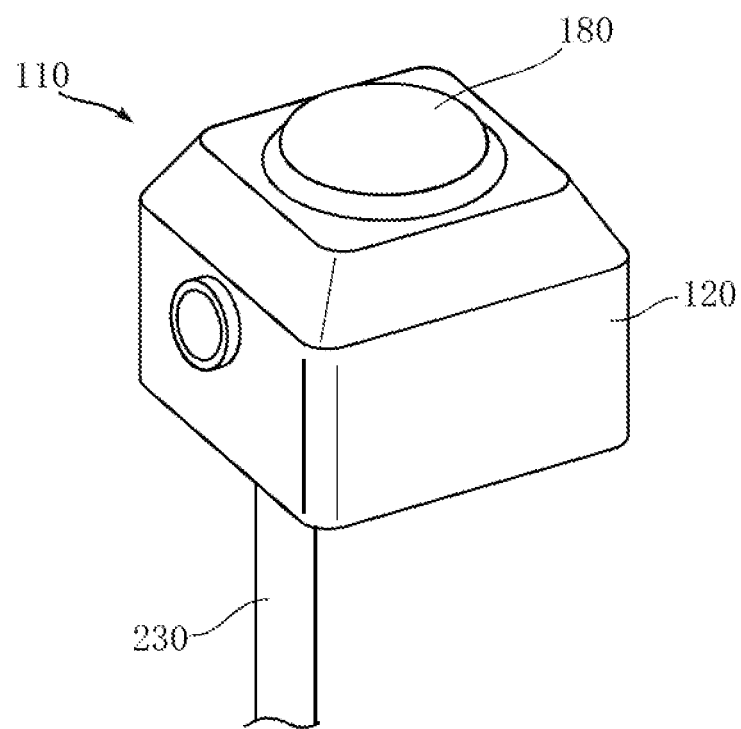
FIG. 48 is a perspective view showing the ninth embodiment of the camera module according to the present invention.
Figure 49:
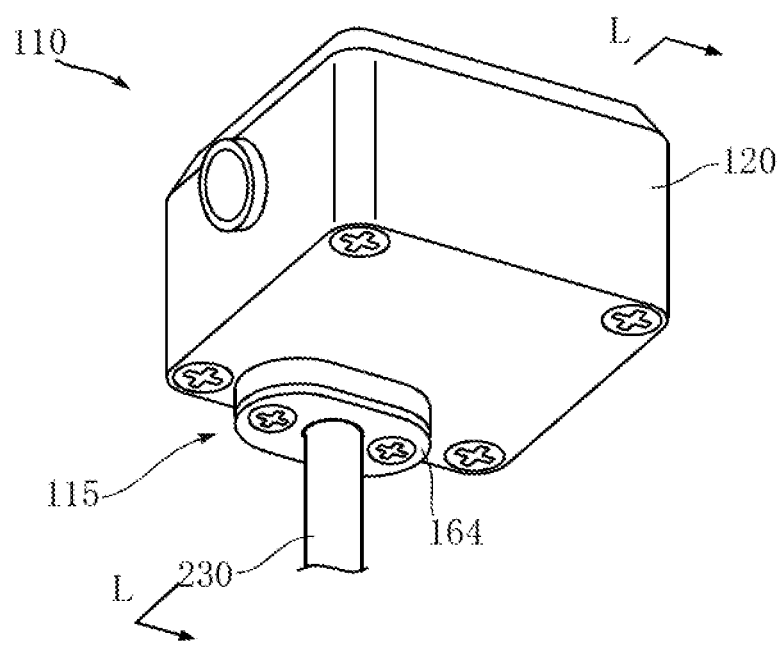
FIG. 49 is a perspective view showing the ninth embodiment of the camera module according to the present invention and its waterproof cable penetration part.

FIG. 46 and FIG. 47 show a modified example of the eighth embodiment of the camera module according to the present invention. With the camera module 109 of this modified example, a mounting tool 826 is used for the assembly. As shown in FIG. 46, the mounting tool 826 is of an approximate ring shape of a size that can be fitted exactly into the lens unit 180, and includes a plurality of levers 827 and a plurality of protrusions 828. The plurality of levers 827 are similar to the lever 186 of the foregoing embodiment, and are extending in a radial direction by being distanced from each other at 90 degree angles. The plurality of protrusions 828 are protruding toward the lower portion by being distanced from each other at 90 degree angles.

As shown in FIG. 47, the lens unit 180 is formed with a plurality of concave parts 187. The plurality of concave parts 187 are distanced from each'other at 90 degree angles, and are respectively fitted into the protrusion 828 of the mounting tool 826.

When assembling the camera module 109, the mounting tool 826 is mounted on the lens unit 180 by fitting the respective protrusions 828 with the respective concave parts 187. The lens unit 180 is thereby rotated while gripping the lever 827 of the mounting tool 826. The other operations are performed similar to the procedures explained with reference to FIG. 43 to FIG. 45. After the mounting of the lens unit 180 on the case 120 is complete, the mounting tool 826 is removed from the lens unit 180. The camera module 109 of this modified example is thereby complete. Even with this kind of modified example, as with the embodiments described above, the focusing of the lens unit 180 and the imaging element 200 and the waterproof treatment process of the lens unit 180 and the case 120 can be simultaneously completed, and the production efficiency of the camera module 109 can be improved thereby.

The camera module according to the present invention is not limited to the foregoing embodiments. The specific configuration of the respective components of the camera module according to the present invention can be freely subject to various design changes.

FIG. 48 to FIG. 51 show the ninth embodiment of the camera module according to the present invention. The camera module 110 of this embodiment comprises a case 120, a substrate 210, an imaging element 200, a lens unit 180, and a cable 230. The camera module 110 is used, for example, as an imaging means of a so-called rear-view monitor by being mounted outside the vehicle. Incidentally, each of the camera modules 110 to 112 explained below can be used in substitute for the camera module 101 of the foregoing vehicle-mounted cameras 11 to 15. Moreover, each of the waterproof cable penetration parts 115 to 119 explained below can be suitably applied to the foregoing camera modules 101 to 109.

Figure 50:
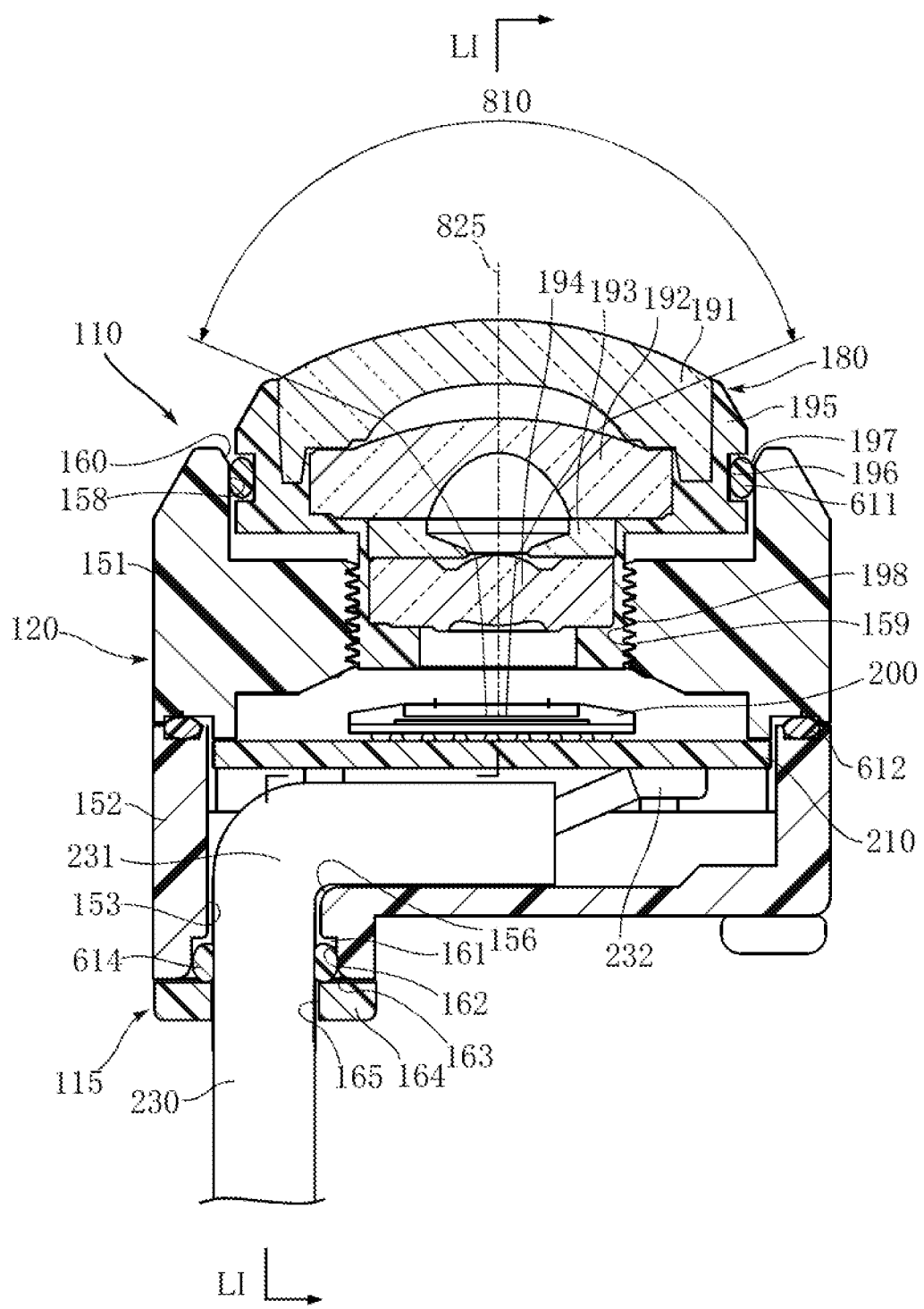
FIG. 50 is a cross section of the essential part along line L-L of FIG. 49.
Figure 51:
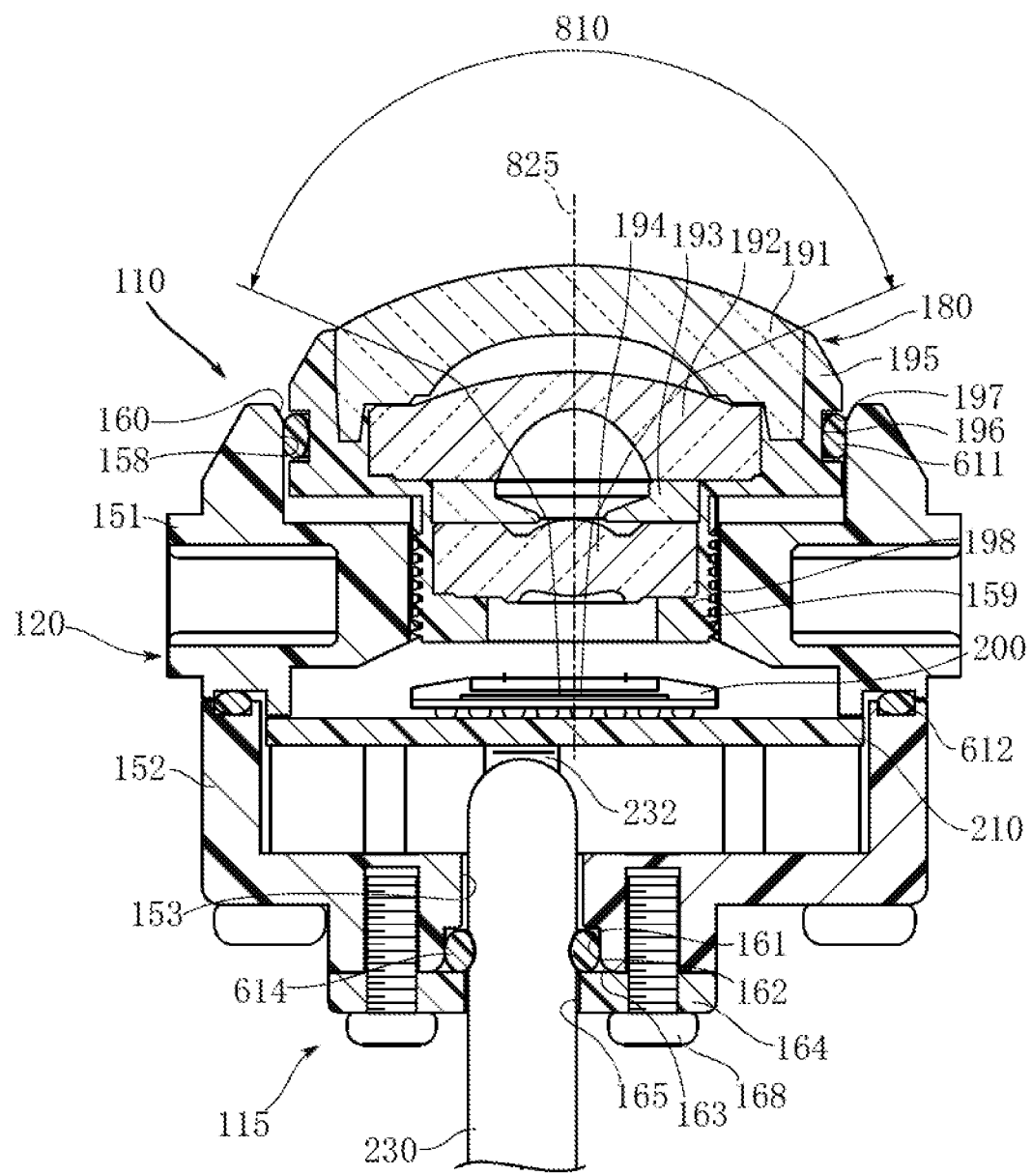
FIG. 51 is a cross section of the essential part along line LI-LI of FIG. 50.

The case 120 is made of black resin or the like, and is of a block construction having an upper part 151 and a lower part 152 as shown in FIG. 50 and FIG. 51. The upper part 151 and the lower part 152 are mutually joined so as to sandwich the O-ring 612. The case 120 has a substrate 210 and an imaging element 200 built therein. A female screw 159, an inner peripheral surface 158 and a cone-shaped surface 160 are formed at the upper part 151 of the case 120. The female screw 159 has the rotating axis 825 as its central axis. The inner peripheral surface 158 also has the rotating axis 825 as its central axis, and is parallel to the rotating axis 825. In this embodiment, the inner peripheral surface 158 is adjacent to the upper end of the female screw 159. The cone-shaped surface 160 is adjacent to the upper part of the inner peripheral surface 158, and is of a shape in which its cross section diameter increases as it draws apart from the imaging element 200 in the extending direction of the rotating axis 825.

The substrate 210 is made of glass epoxy resin or the like, and is formed with a wiring pattern not shown. An imaging element 200 is mounted on the surface of the substrate 210. The imaging element 200 is equipped with a photoelectric conversion function of outputting the received light as screen image data, and is a CCD element, a CMOS element or the like. The imaging element 200 is mounted on the wiring pattern (not shown) of the substrate 210 described above, and its center basically coincided with the rotating axis 825.

The cable 230 is used for supplying power to the imaging element 200 and sending the image signal received from the imaging element 200. The tip part 232 of the cable 230 is bonded to the back face of the substrate 210 by way of soldering or other methods. An O-ring 614 is fitted into the cable 230. The O-ring 614 has a hardness of approximately 50 degrees, and its inner diameter is slightly smaller than the outer shape of the cable 230. As the O-ring 614, preferably used is a type having a hardness of 40 to 70 degrees.

A cable hole 153 is formed at the lower part 152 of the case 120. The cable hole 153 allows the cable 230 to pass therethrough in a position of extending in the vertical direction in the drawing. An O-ring housing part 161 is formed on the cable hole 153. The O-ring housing part 161 houses the O-ring 614 in a state of being fitted into the cable 230. The side surface 162 of the O-ring housing part 161 is pressure welded to the outer peripheral surface of the O-ring 614. Specifically, the O-ring 614 is sandwiched between the cable 230 and the side surface 162. In this embodiment, the O-ring 614 is compressed at a compressibility of 30%. The compressibility of the O-ring 614 is preferably 20 to 50%. A cone-shaped surface 163 is formed at the lower part of the O-ring housing part 161. The cone-shaped surface 163 has a round cross-section surface in which its diameter increases as it heads toward the outward longitudinal direction (lower direction in the drawing) of the portion of the cable 230 that penetrates the cable hole 153.

The O-ring housing part 161 is covered with a cover 164. The cover 164 has a cable hole 165 for passing the cable 230 therethrough, and is mounted to the lower part 152 of the case 120 with two bolts 168. In this embodiment, the O-ring 614 is pushed between the cable 230 and the O-ring housing part 161 via the cover 164 with the fastening force of the bolt 168.

In this embodiment, the portion along the back surface of the substrate 210 of the cable 230 and the portion penetrating the cable hole 153 have mutual directions that are approximately perpendicular. Thus, the cable 230 is bent approximately at a right angle in the bending part 231. Meanwhile, a corner part 156 is provided to the lower part 152 of the case 120. The bending part 231 is bent along the corner part 156.

The cable hole 153, the O-ring housing part 161, the cable 230, the O-ring 614, and the cover 164 provided to the lower part 152 of the case 120 configure the waterproof cable penetration part 115 of the ninth embodiment of the camera module according to the present invention.

The lens unit 180 is an optical component for forming an image of external light in the imaging element 200, and comprises a plurality of lenses 191, 192, 194, a diaphragm 193, and a lens holder 195. The lens holder 195 retains the plurality of lenses 191, 192, 194 and the diaphragm 193 so that their respective optical axes all coincide with the rotating axis 825, and is made of black resin or the like. The plurality of lenses 191, 192, 194 and the diaphragm 193 configure a lens group by being mutually laminated, its lens aberration is relatively small, and has a viewing angle 810 of approximately 135 degrees. As a result of forming an image with the lens unit 180 in the imaging element 200, the camera module 110 is able to capture a viewing angle 810 of 135 degrees.

The lens holder 195 is formed with a male screw 198. The male screw 198 has the rotating axis 825 as its central axis, and is screwed with the female screw 159 of the case 120. An annular groove 197 is formed at the upper part of the male screw 198. The annular groove 197 is centered around the rotating axis 825, and is adjacent to the upper end of the male screw 198 in this embodiment. The bottom surface of the annular groove 197 is used as the outer peripheral surface 196. The outer peripheral surface 196 also has the rotating axis 825 as its central axis, and is parallel to the rotating axis 825.

In this, embodiment, the diameter of the male screw 198 and the outer peripheral surface 196 is smaller than the maximum diameter portion of the lens unit 180; that is, the portion encompassing the lens 191 with the maximum diameter. Accordingly, as the overall lens unit 180, the upper portion encompassing the lens 191 is relatively large, and the male screw 198 and the lower portion where the outer peripheral surface 196 is formed have a relatively small shape. It is essential to increase the diameter of the lens 191 in order to achieve a relatively large angle of approximately 135 degrees as the viewing angle 810.

FIG. 50 and FIG. 51 show the completed state of the camera module 110, and the male screw 198 and the female screw 159 are screwed together, and the inner peripheral surface 158 and the outer peripheral surface 196 are facing each other. The O-ring 611 is sandwiched between the inner peripheral surface 158 and the outer peripheral surface 196. The O-ring 611 is used for preventing the infiltration of water from the gap between the case 120 and the lens unit 180, and, in this embodiment, a type having a hardness of approximately 50 degrees is used in a state of being compressed to a compressibility of approximately 30%. Incidentally, preferably used as the O-ring 611 is a type having a hardness of 40 to 70 degrees at a compressibility of 20 to 50%.

The assembly of the waterproof cable penetration part 115 is now explained with reference to FIG. 52 and FIG. 53.

Figure 52:
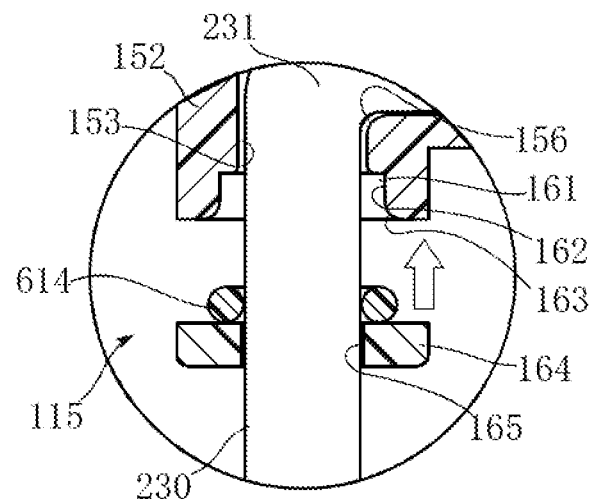
FIG. 52 is a cross section of the essential part shows the assembly of the waterproof cable penetration part shown in FIG. 50.

Foremost, as shown in FIG. 52, the cable 230 is inserted through the cable hole 153 in advance. Here, the tip part 232 of the cable 230 is bonded to the substrate 210 in advance via soldering. The O-ring 614 and the cover 164 are also fitted into the cable 230 in advance. Moreover, the cover 164 is pushed toward the lower part 152 of the case 120. The O-ring 614 is thereby moved toward the lower part 152.

Figure 53:
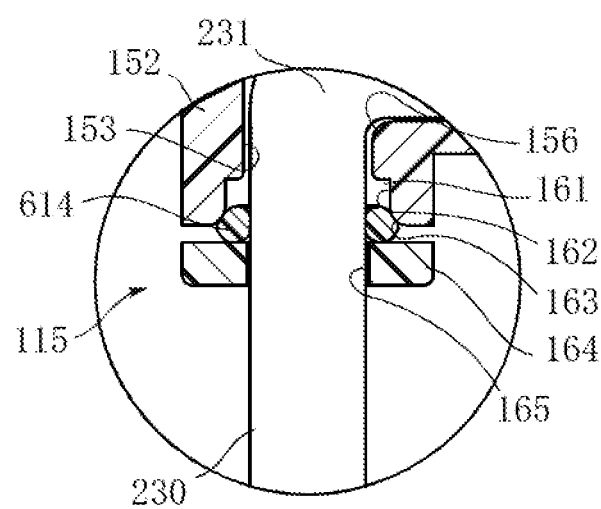
FIG. 53 is a cross section of the essential part showing the assembly of the waterproof cable penetration part shown in FIG. 50.

When the cover 164 is pushed further, the O-ring 614 comes in contact with the cone-shaped surface 163 of the lower part 152 as shown in FIG. 53. If the cover 164 is pushed even further from this state, the O-ring 614 is drawn into the O-ring housing part 161 while sliding against the cone-shaped surface 163. Subsequently, by mounting the cover 164 to the lower part 152 of the case 120 with the bolt 168, the waterproof cable penetration part 115 is completed.

The mounting of the lens unit 180 onto the case 120 is now explained. Foremost, the substrate 210, the imaging element 200, and the cable 230 are mounted on the lower part 152 and the upper part 151 and the lower part 152 are joined to complete the case 120. Moreover, the lens unit 180 is prepared, and the O-ring 611 is loaded in the annular groove 197. In this state, the cross-section surface of the O-ring 611 is approximately a true circle.

Subsequently, the case 120 is inserted into the lower portion of the lens unit 180. Then, the lens unit 180 is rotated around the rotating axis 825 while screwing the male screw 198 with the female screw 159. The O-ring 611 will thereby come in contact with the cone-shaped surface 160. If the lens unit 180 is further rotated from this state, the lens unit 180 will come down along the rotating axis 825. Then the O-ring 611 bound by the annular groove 197 is drawn into the lower portion while sliding against the cone-shaped surface 160.

When the lens unit 180 is rotated even further, the O-ring 611 is sandwiched between the outer peripheral surface 196 and the inner peripheral surface 158. Here, the O-ring 611 is compressed at a compressibility of approximately 30%, and its cross-section surface is an oval shape. For example, the rotation of the lens unit 180 is stopped at a well-focused position while confirming the display of the screen image captured with the imaging element 200 of the test pattern disposed at the upper part of the lens unit 180. Consequently, the focusing process of the lens unit 180 and the imaging element 200 and the waterproof treatment between the lens unit 180 and the case 120 are complete, and the mounting of the lens unit 180 on the case 120 is also complete.

Incidentally, prior to the process of mounting the lens unit 180 on the case 120, an adhesive may be applied to the male screw 198 of the lens unit 180. In the foregoing case, when the focusing of the imaging element 200 of the lens unit 180 is complete, the male screw 198 and the female screw 159 are bonded with the adhesive. According to this kind of configuration, the lens unit 180 can be reliably fixed to the case 120 in a focused state.

In addition to the foregoing configuration, for example, the fixation of the lens unit 180 to the case 120 can be reinforced by applying the adhesive to the wall surface that is adjacent to the lower portion of the male screw 198 of the lens unit 180. Otherwise, after the focusing is complete, the fixation of the lens unit 180 and the case 120 can be reinforced based on so-called ultrasonic welding of applying ultrasonic vibration and pressure to the lens unit 180.

The operation of the waterproof cable penetration part 115 and the camera module 110 is now explained.

The waterproof cable penetration part 115 has an airtight structure based on the O-ring 614 that is sandwiched by the cable 230 and the side surface 162. It is thereby possible to prevent the infiltration of water into the case 120 from the cable hole 153, and the possibility of exposure to water is low, for example, when the camera module 110 is mounted outside the vehicle. By pushing the cover 164 toward the inside of the case 120, the contact pressure between the O-ring 614 and the cable 230 and side surface 162 can be increased. Fastening using the bolt 168 is suitable for increasing the contact pressure. When pushing the cover 164, the cone-shaped surface 163 fulfills the function of luring the O-ring 614 into the O-ring housing part 161. Consequently, the O-ring 614 can be moved smoothly so as to achieve, for example, a relatively high compressibility of approximately 30%.

The increase of contact pressure using the cover 164 is preferable for preventing the infiltration of water. However, according to the present invention, the O-ring 614 itself is configured to be strongly compressed in the radial direction of the cable 230 by the cable 230 and the side surface 162. Thus, for example, even if the cover 164 is suddenly loosened or removed, it is still possible to yield the effect of preventing the infiltration of water. Moreover, since the size of the side surface 162 in the longitudinal direction of the cable 230 is relatively large, even if the O-ring 614 is slightly misaligned in the longitudinal direction of the cable 230, the possibility that the waterproof effect will be impaired is low. As shown in FIG. 52 and FIG. 53, the size of the side surface 162 in the longitudinal direction of the cable 230 is at least greater than the radius of the O-ring 614, and it is preferably equal to or larger than the diameter of the O-ring 614 in order to improve the waterproof effect.

If force is applied for pulling the cable 230 to the outside, the bending part 231 gets hooked on the corner part 156. The resistance generated thereby prevents the cable 230 from being pulled out from the case 120. Moreover, it is also possible to avoid this kind of force working directly on the tip part 232 that is bonded to the substrate 210.

Moreover, by rotating the lens unit 180 around the case 120, the focusing of the lens unit 180 and the imaging element 200 can be performed. The degree that the lens unit 180 needs to be raised or lowered for the fine tuning of the focusing process is small. Thus, during the focusing process, the O-ring 611 is in a state of being sandwiched between the outer peripheral surface 196 and the inner peripheral surface 158. Consequently, when the focusing is complete, the O-ring 611 is in a state of being compressed between the outer peripheral surface 196 and the inner peripheral surface 158. The compressed O-ring 611 inhibits the lens unit 180 from rotating incorrectly around the case 120 after the focusing is complete. Accordingly, with the camera module 110, it is possible to simultaneously complete the focusing of the lens unit 180 and the imaging element 200 and the waterproof treatment process of the lens unit 180 and the case 120, and the production efficiency of the camera module 110 can be improved thereby.

As a result of using the bottom surface of the annular groove 197 as the outer peripheral surface 196, the O-ring 611 can be bound relative to the outer peripheral surface 196. This is preferable in preventing the O-ring 611 from becoming incorrectly misaligned when installing the lens unit 180 into the case 120.

As a result of providing the cone-shaped surface 160, the O-ring 611 is lured by cone-shaped surface 160 when the lens unit 180 is entered into the case 120. It is thereby possible to appropriately dispose the O-ring 611 between the outer peripheral surface 196 and the inner peripheral surface 158.

FIG. 54 to FIG. 66 show another embodiment of the present invention. Incidentally, the elements in these drawings that are the same as or similar to the foregoing embodiments are given the same reference numeral as the foregoing embodiments.

Figure 54:
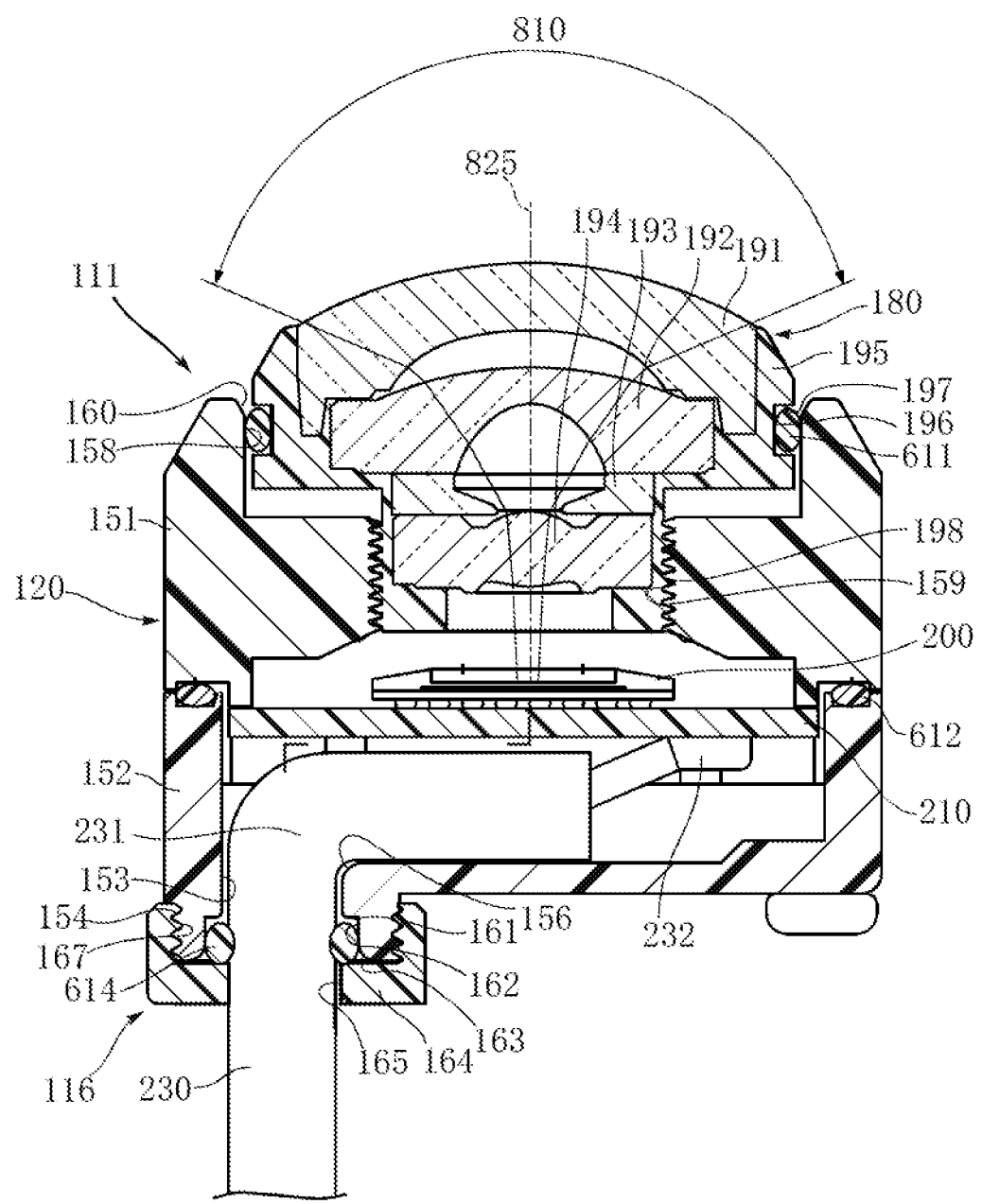
FIG. 54 is a cross section of the essential part showing the tenth embodiment of the camera module according to the present invention and its waterproof cable penetration part.
Figure 55:
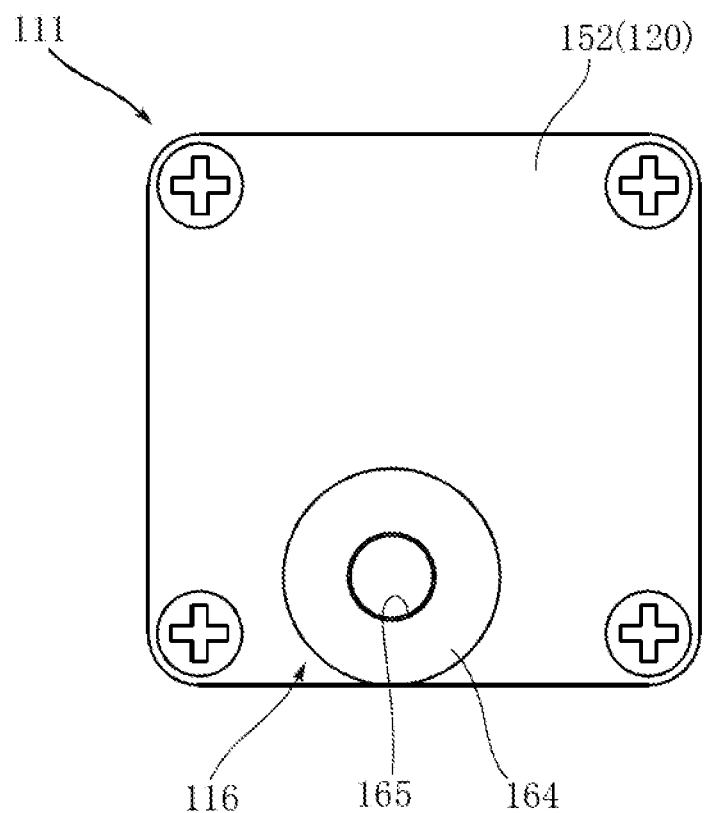
FIG. 55 is a bottom view showing the waterproof cable penetration part and the camera module shown in FIG. 54.

FIG. 54 and FIG. 55 show the tenth embodiment of the camera module according to the present invention. The camera module 111 of this embodiment comprises a waterproof cable penetration part 116 that is configured differently from the foregoing waterproof cable penetration part 115. Incidentally, the cable 230 is omitted in FIG. 55 for the sake of convenience in understanding the present invention.

In this embodiment, as shown in FIG. 54, the male screw 154 is formed at a portion that is positioned on the outer side of the cable hole 153 (O-ring housing part 161) of the lower part 152 of the case 120. Meanwhile, a female screw for screwing with the male screw 154 is formed on the cover 164.

Figure 56:
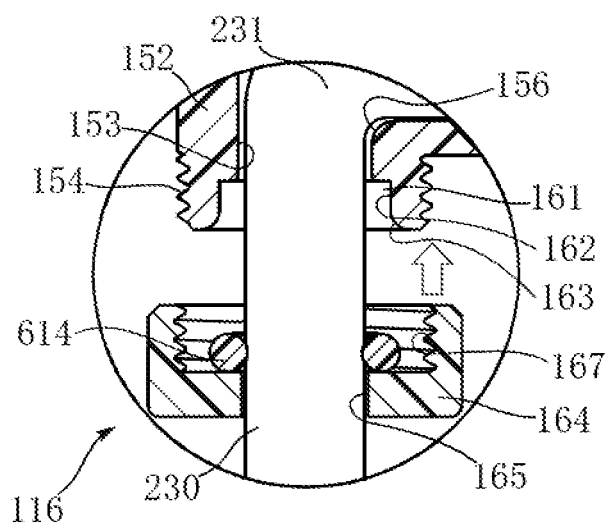
FIG. 56 is a cross section of the essential part showing the assembly of the waterproof cable penetration part shown in FIG. 54.
Figure 57:
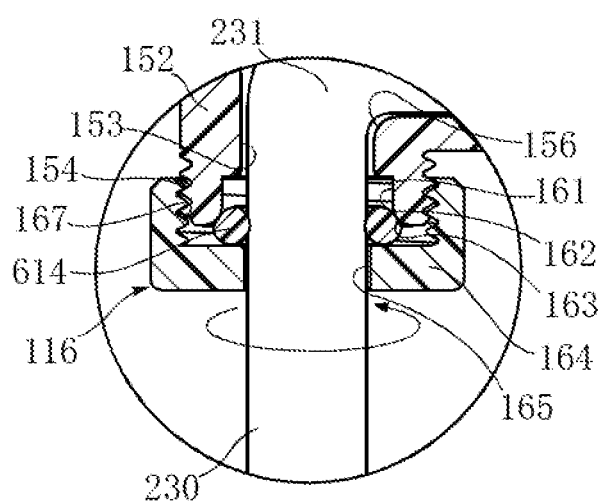
FIG. 57 is a cross section of the essential part showing the assembly of the waterproof cable penetration part shown in FIG. 54.

The waterproof cable penetration part 116 is assembled as follows. Foremost, as shown in FIG. 56, the cable 230 is inserted through the cable hole 153. Then the cover 164 and the O-ring 614 are caused to approach the lower part 152. Subsequently, as shown in FIG. 57, the female screw 167 of the cover 164 is screwed with the male screw 154 of the lower part 152 by rotating the cover 164. Based on this operation, after the O-ring 614 is pressed against the cone-shaped surface 163, it is pushed into the O-ring housing part 161.

Even with this kind of embodiment, it is possible to prevent the infiltration of water from the cable hole 153. The fixation of the cover 164 using the screwing of the male screw 154 and the female screw 167 can be achieved with an easy process, and is suitable for exhibiting sufficient pushing force for pushing the O-ring 614 into the O-ring housing part 161.

Figure 58:
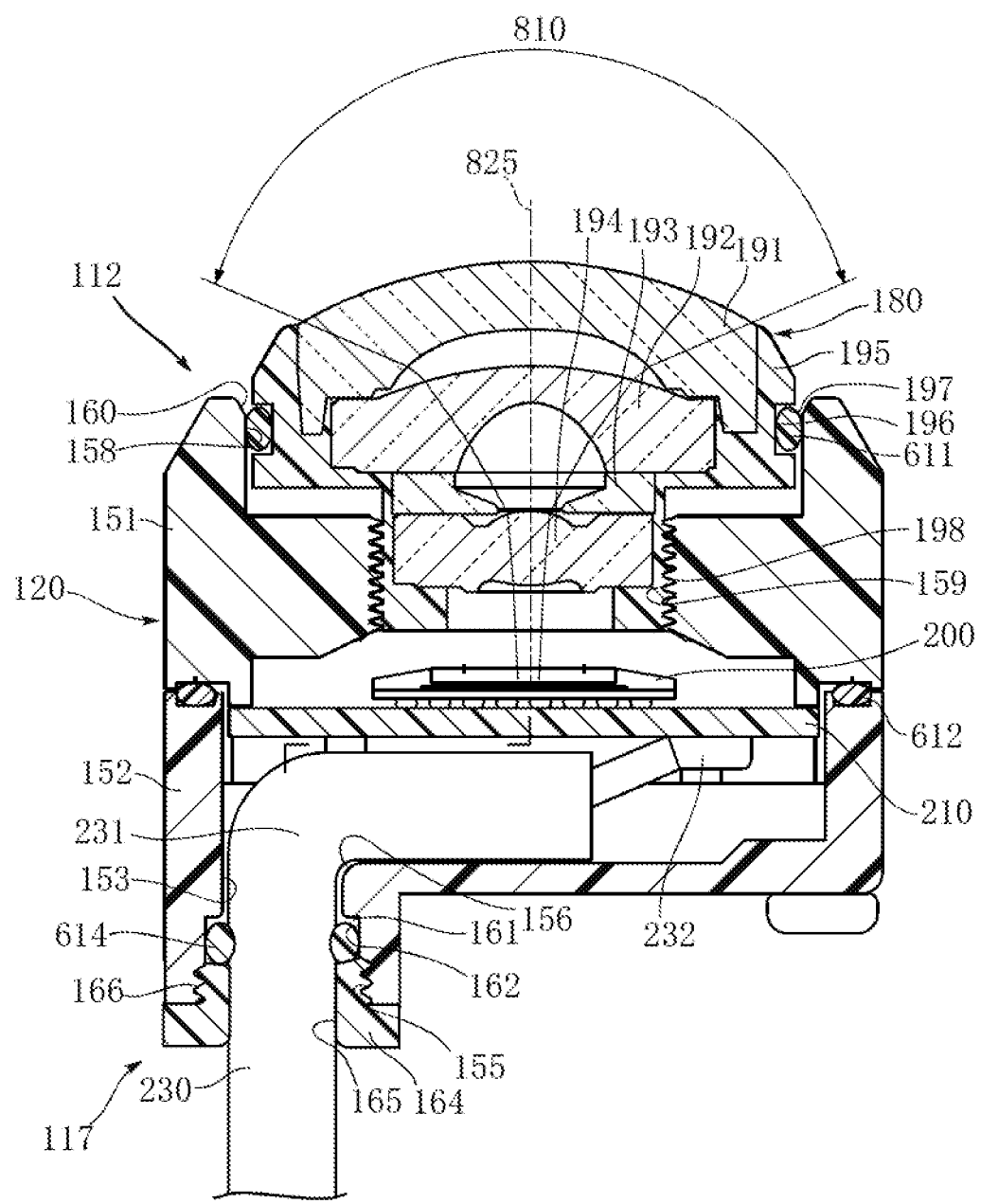
FIG. 58 is a cross section of the essential part showing the eleventh embodiment of the camera module according to the present invention.
Figure 59:
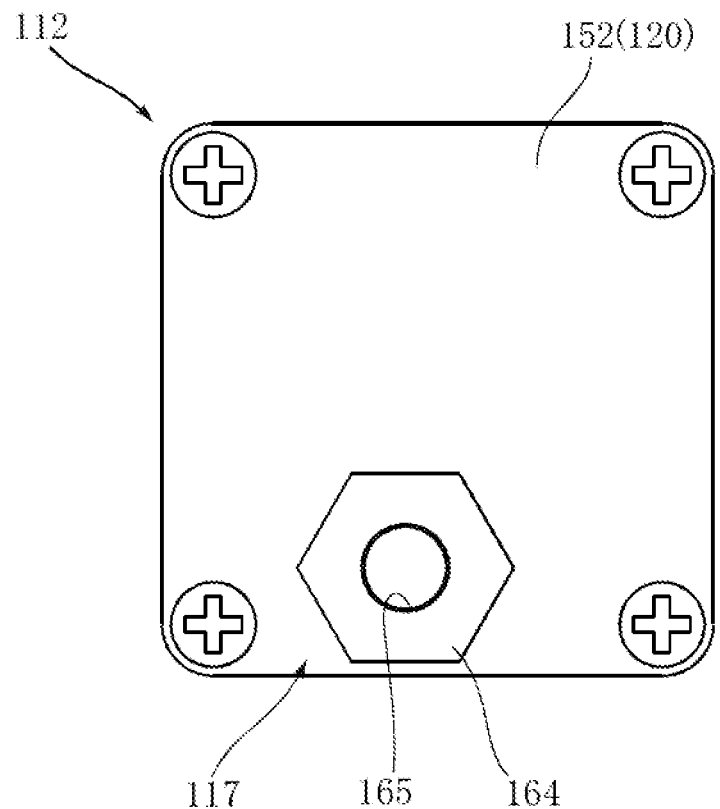
FIG. 59 is a bottom view showing the waterproof cable penetration part and the camera module shown in FIG. 58.

FIG. 58 and FIG. 59 show the eleventh embodiment of the camera module according to the present invention. The camera module 112 of this embodiment comprises a waterproof cable penetration part 117 that is configured differently from the foregoing waterproof cable penetration parts 115, 116. Incidentally, the cable 230 is omitted in FIG. 59 for the sake of convenience in understanding the present invention.

In this embodiment, as shown in FIG. 58, the female screw is formed at a portion that is adjacent to the lower portion relative to the O-ring housing part 161 of the lower part 152 of the case 120. Meanwhile, the male screw 166 for screwing with the female screw 155 is formed on the cover 164. Upon assembling the waterproof cable penetration part 117, the upper tip of the cover 164 pushes the O-ring 614 into the O-ring housing part 161 when the cover 164 is rotated so as to screw the male screw 166 with the female screw 155. Consequently, the O-ring 614 is to achieve a state of being sandwiched by the cable 230 and the side surface 162 with high pressure, and adequately prevent the infiltration of water from the cable hole 153.

Figure 60:
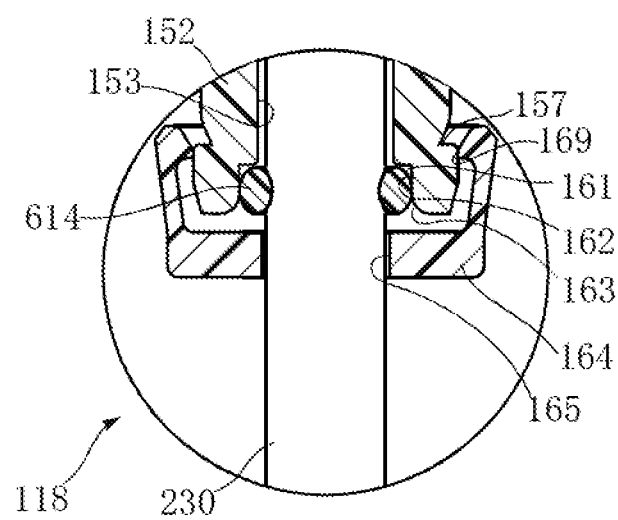
FIG. 60 is a cross section of the essential part showing the assembly of the waterproof cable penetration part of the twelfth embodiment of the camera module according to the present invention.

FIG. 60 shows the assembly of the waterproof cable penetration part of the twelfth embodiment of the camera module according to the present invention. In this embodiment, a concave part 157 is formed at a portion that is position on the outer side relative to the cable hole 153 (O-ring housing part 161) of the lower part 152. The concave part 157 is an annular groove that is formed to encompass the cable hole 153, and has a wedge-shaped cross section that is hollowed inward in the radial direction of the cross-section surface of the portion of the cable 230 that penetrates the cable hole 153. Meanwhile, the cover 164 is formed with a convex part 169. The convex part 169 is shaped like an annular nail protruding inward in the radial direction. The minimum radius of the convex part 169 is the same as or slightly smaller than the minimum radius of the concave part 157.

Figure 61:
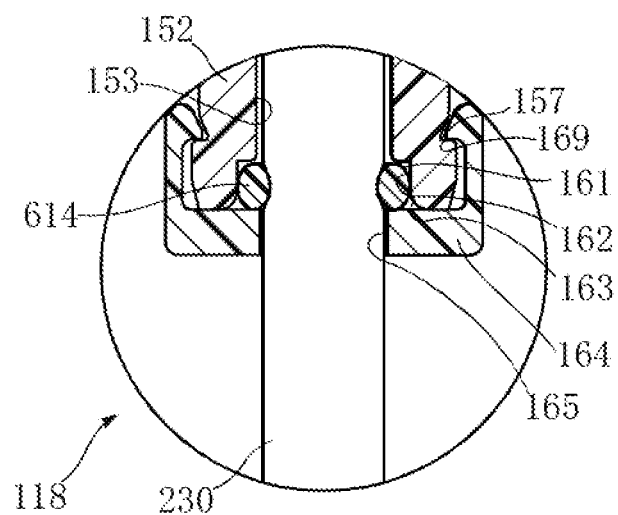
FIG. 61 is a cross section of the essential part showing the waterproof cable penetration part of the twelfth embodiment of the camera module according to the present invention.
Figure 62A:
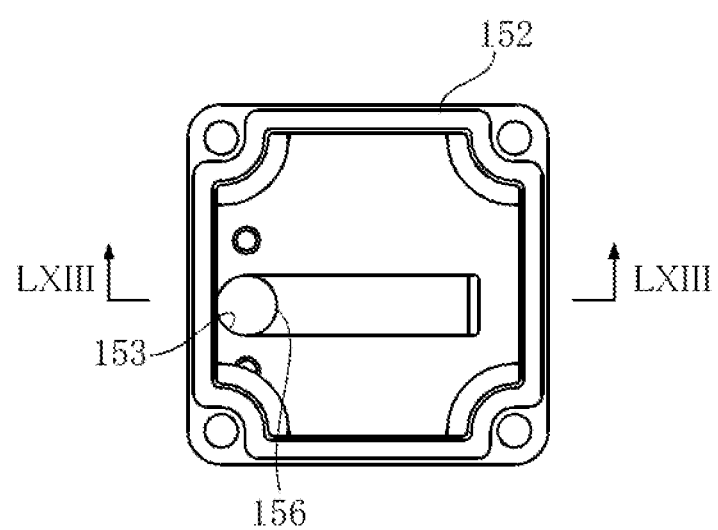
FIG. 62A is a plan view showing the lower part of the case that is used for the waterproof cable penetration part of the thirteenth embodiment of the camera module according to the present invention.
Figure 62B:
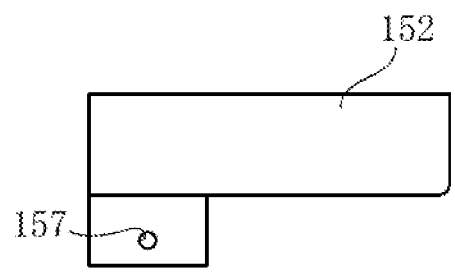
FIG. 62B is a front view showing the lower part of the case that is used for the waterproof cable penetration part of the thirteenth embodiment of the camera module according to the present invention.
Figure 62C:
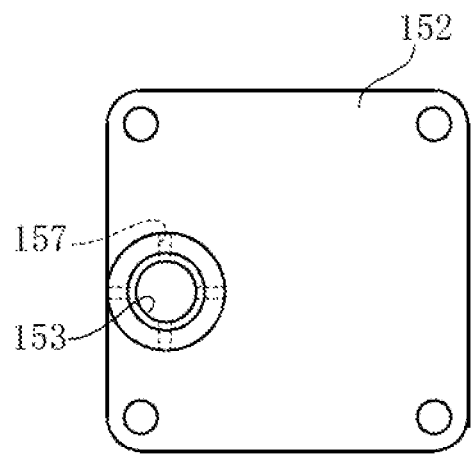
FIG. 62C is a bottom view showing the lower part of the case that is used for the waterproof cable penetration part of the thirteenth embodiment of the camera module according to the present invention.
Figure 63:
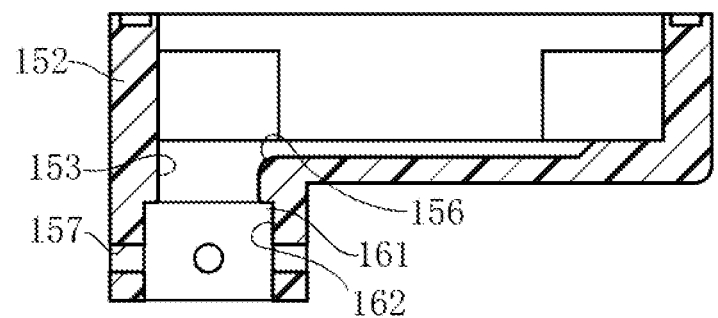
FIG. 63 is a cross section along line LXIII-LXIII of FIG. 62.

When the cover 164 is pressed against the lower part 152 along the cable 230, the convex part 169 engages with the concave part 157 as shown in FIG. 61 together with the elastic deformation of the cover 164. The mounting of the cover 164 is thereby complete, the pushing of the O-ring 614 into the O-ring housing part 161 is complete, and the waterproof cable penetration part 118 is thereby formed.

According to this kind of embodiment, the mounting of the cover 164 can be completed in an extremely short period of time. In addition, the O-ring 614 can be adequately pushed into the O-ring housing part 161 simultaneously with the mounting of the cover 164.

FIG. 62A, FIG. 62B, FIG. 62C and FIG. 63 show the lower part 152 of the case 120 that is used for the waterproof cable penetration part 119 of the thirteenth embodiment of the camera module according to the present invention. With the lower part 152 of this embodiment, the configuration of the concave part 157 is different from the foregoing waterproof cable penetration part 118. In this embodiment, the concave part 157 is configured from four through-holes disposed at an even pitch so as to encompass the cable 230. The four through-holes have the same longitudinal location of the cable hole 153, and are respectively extending in the radial direction of the cable hole 153.

Figure 64A:
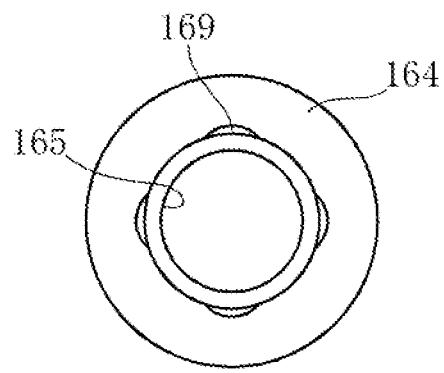
FIG. 64A is a plan view showing the cover that is used for the waterproof cable penetration part according to the thirteenth embodiment of the present invention.
Figure 64B:
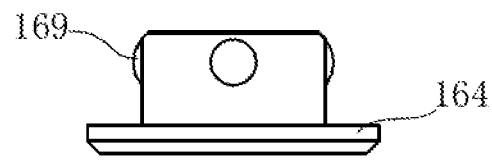
FIG. 64B is a front view showing the cover that is used for the waterproof cable penetration part according to the thirteenth embodiment of the present invention.
Figure 64C:
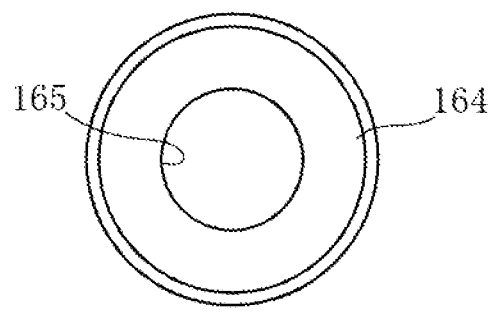
FIG. 64C is a bottom view showing the cover that is used for the waterproof cable penetration part according to the thirteenth embodiment of the present invention.

FIG. 64A, FIG. 64B, and FIG. 64C show the cover 164 that is used for the waterproof cable penetration part 119 of the thirteenth embodiment of the camera module according to the present invention. In this embodiment, the convex part 169 is configured from four protrusions. The four protrusions have the same longitudinal location of the cable hole 165, and are respectively of a semi-dome shape protruding in the radial direction of the cable hole 165. The respective protrusions configuring the convex part 169 are of a size and disposed so that they can be fitted into the respective through-holes configuring the concave part 157.

Figure 65:
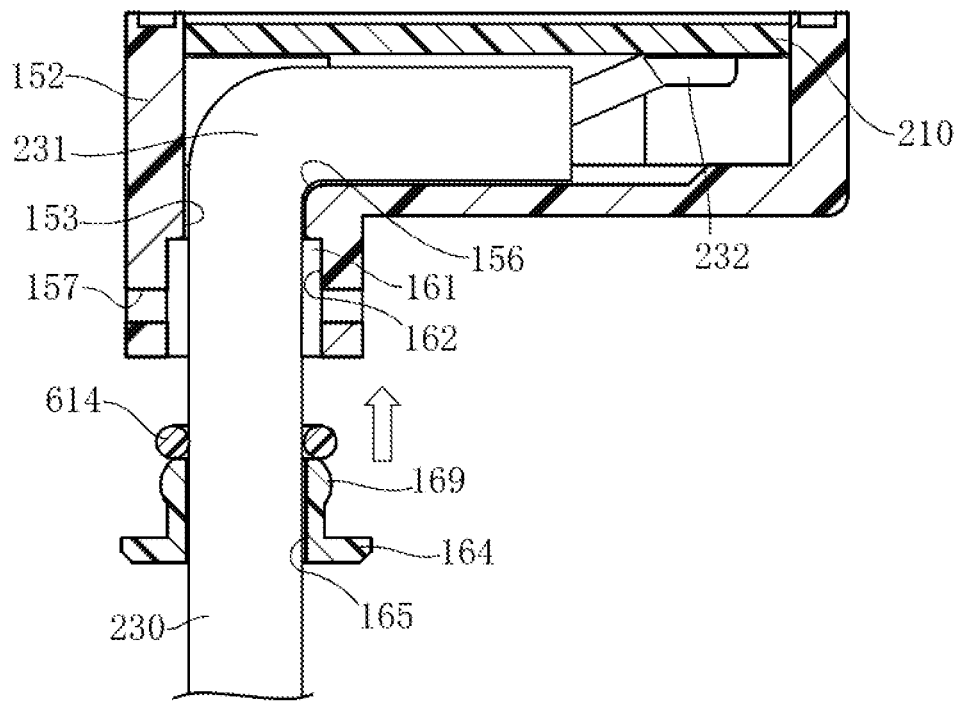
FIG. 65 is a cross section of the essential part showing the assembly of the cable penetration part of the thirteenth embodiment of the camera module according to the present invention.
Figure 66:
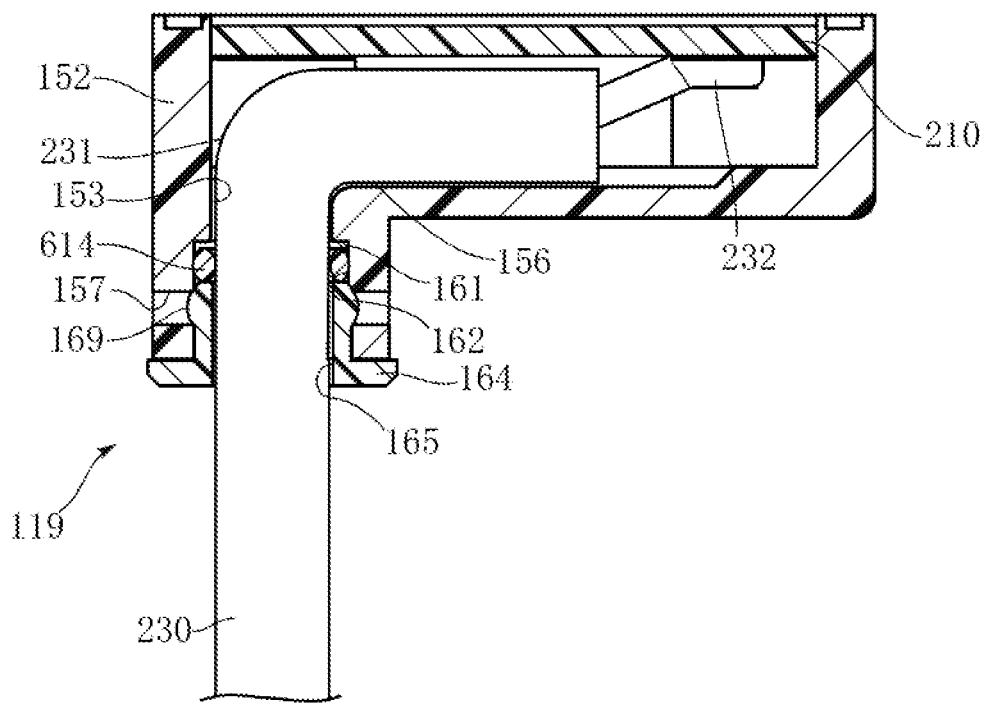
FIG. 66 is a cross section of the essential part showing the cable penetration part of the thirteenth embodiment of the camera module according to the present invention.

FIG. 65 shows the assembly of the waterproof cable penetration part 119 of the thirteenth embodiment of the camera module according to the present invention. As shown in FIG. 65, the cable 230 is inserted through the cover 164 and the O-ring 614. Subsequently, the cover 164 and the O-ring 614 are pushed upward toward the cable hole 153 along the cable 230. Consequently, only the O-ring 614 is inserted into the O-ring housing part 161. Here, the four protrusions configuring the convex part 169 of the cover 164 are fitted into the four through-holes configuring the concave part 157 of the lower part 152. The waterproof cable penetration part 119 is thereby completed as shown in FIG. 66.

Even with this kind of embodiment, it is possible to complete the mounting of the cover 164 in an extremely short period of time. In addition, the O-ring 614 can be appropriately inserted into the O-ring housing part 161 simultaneously with the foregoing mounting of the cover 164. Incidentally, the concave part 157 may be an annular groove having a semicircle cross-section shape that is provided so as to encompass the cable 230 and, in the foregoing case, the convex part 169 may be formed as a protrusion having an annular semicircle cross-section shape that encompasses the cable 230.

Figure 67:
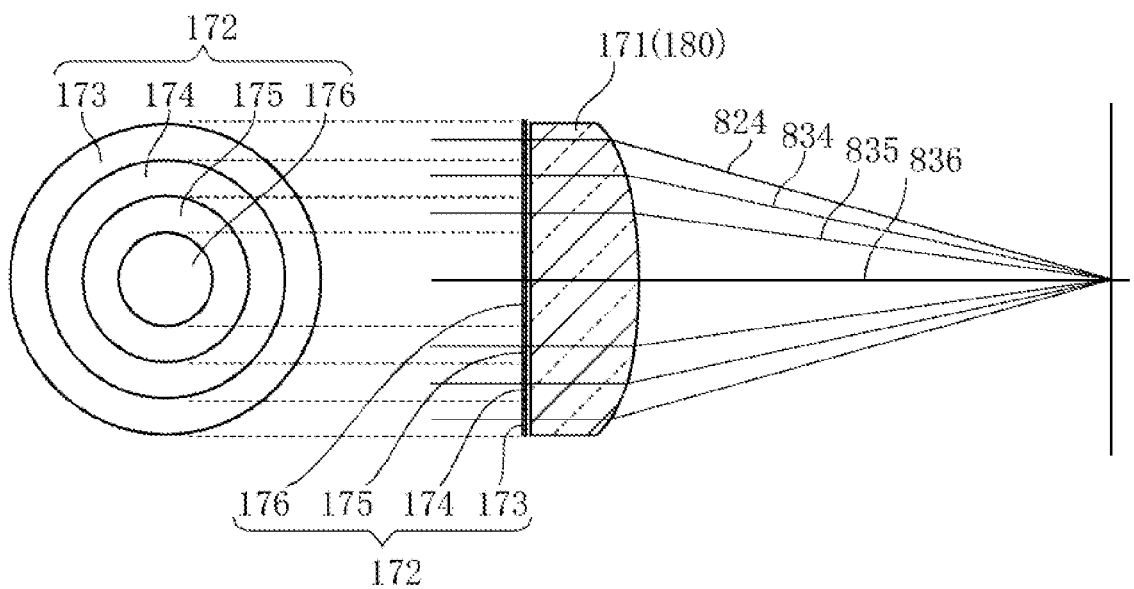
FIG. 67 is a cross section showing a modified example of the lens of the lens unit that is used in the camera module according to the present invention.

FIG. 67 shows an example of the lens configuration of the lens unit 180. In this example, a filter 172 is provided to the lens 171 of the lens unit 180. The filter 172 is configured from four band pass filters 173, 174, 175, 176. The band pass filters 173, 174, 175, 176 are filters that selectively permeate, in order, infrared rays 824, red light 834, green light 835, and blue light 836. These band pass filters 173, 174, 175, 176 are disposed concentrically. As a result of providing the filter 172, the focal point of the infrared rays 824, the red light 834, the green light 835, and the blue light 836 having different wavelengths can be positioned to be approximately the same. This is suitable for improving the sharpness of the screen image captured with the lens unit 180.

The waterproof cable penetration part and the camera module according to the present invention are not limited to the foregoing embodiments. The specific configuration of the respective components of the waterproof cable penetration part and the camera module according to the present invention can be freely subject to various design changes.

To summarize the above, the configurations and their variations in the foregoing embodiments are listed below as Appendixes.

APPENDIX 1

A camera module, comprising:
an imaging element; and
an illuminator for illuminating at least a part of an imaging area that is imaged by the imaging element,
wherein the illuminator comprises a plurality of LED modules each including an LED chip and with mutually different main emitting directions.

APPENDIX 2

The camera module according to Appendix 1, further comprising:
a case for housing the imaging element,
wherein the case is provided with a plurality of retention holes for retaining the plurality of LED modules.

APPENDIX 3

The camera module according to Appendix 2,
wherein each of the LED modules comprises a translucent head with the LED chip built therein, and a lead that establishes electrical continuity with the LED chip,
wherein each of the retention holes includes a head housing part which houses the translucent head and in which a depth direction thereof coincides with the main emitting direction of the LED module, and
the lead housing part includes a root part that is connected to the head housing part and which extends in the main emitting direction, and a tip part that extends in a direction that is different from the direction extended from the root part.

APPENDIX 4

The camera module according to Appendix 3,
wherein the lead housing part has a cross-section size that is smaller than that of the translucent head.

APPENDIX 5

The camera module according to Appendix 3,
wherein the lead housing part has a cross-section size that is larger than that of the translucent head.

APPENDIX 6

The camera module according to Appendix 3, further comprising:
a substrate mounted with the plurality of LED modules,
wherein each of the tip parts of the plurality of retention holes is orthogonal to the substrate.

APPENDIX 7

The cameral module according to Appendix 1, further comprising:
a case which houses the imaging element and to which are formed a plurality of mounting surfaces facing mutually different directions; and
a flexible wiring substrate having flexibility in which the plurality of LED modules are mounted on a surface thereof,
wherein the flexible wiring substrate is sandwiched between the plurality of mounting surfaces and the LED module.

APPENDIX 8

The camera module according to Appendix 1, further comprising:
a substrate having a plurality of mounting surfaces facing mutually different directions,
wherein the plurality of LED modules are mounted on the plurality of mounting surfaces.

APPENDIX 9

The camera module, comprising:
an imaging element; and
an illuminator for illuminating at least a part of an imaging area that is imaged by the imaging element, and
wherein the illuminator comprises an LED module, and an optical component for bending light from the LED module.

APPENDIX 10

The camera module according to Appendix 9, further comprising:
a wide-angle lens for converging light at the imaging element,
wherein the optical component is a wide angle prism for widening the angle of light from the LED module.

APPENDIX 11

The camera module according to Appendix 10,
wherein the wide angle prism is formed so that light from the LED module is bent more as the prism recedes from the wide-angle lens in a first direction that is orthogonal to an optical axis direction of the wide-angle lens.

APPENDIX 12

The camera module according to Appendix 11,
wherein the wide angle prism is formed so that light from the LED module is bent more at the edge than the center in a second direction that is orthogonal to the optical axis direction and the first direction.

APPENDIX 13

The camera module according to Appendix 9, further comprising:
a narrow-angle lens for converging light at the imaging element,
wherein the optical component includes a convex lens part for narrowing the angle of light from the LED module.

APPENDIX 14

The camera module according to Appendix 13,
wherein each of the convex lens parts is formed to overlap with any one of the plurality of LED modules in an optical axis directional vision of the narrow-angle lens.

APPENDIX 15

A camera module, comprising:
lens unit including one or more lenses;
a case for retaining the lens unit; and
an imaging element which is retained by the case and which receives light through the lens, wherein the lens unit is formed with a male screw having as a rotating axis thereof an optical axis of the lens, and an outer peripheral surface that is parallel to the rotating axis, the case is formed with a female screw that is screwed with the male screw of the lens unit, and an inner peripheral surface that faces the outer peripheral surface of the lens unit, and wherein the camera module further includes an O-ring sandwiched between the inner peripheral surface and the outer peripheral surface.

APPENDIX 16

The camera module according to Appendix 15,
wherein the outer peripheral surface is a bottom surface of an annular groove that is formed on the lens unit.

APPENDIX 17

The camera module according to Appendix 16,
wherein the case is formed with a cone-shaped surface which is adjacent to a side opposite to the imaging element relative to the inner peripheral surface in the rotating axis direction, and whose diameter increases as it recedes from the imaging element.

APPENDIX 18

The camera module according to Appendix 16,
wherein the outer peripheral surface has a diameter that is smaller than a lens with the largest diameter among the one or more lenses included in the lens unit.

APPENDIX 19

The camera module according to Appendix 15,
wherein the inner peripheral surface is a bottom surface of an annular groove that is formed on the case.

APPENDIX 20

The camera module according to Appendix 19,
wherein the lens unit is formed with a cone-shaped surface which is adjacent to the imaging element side relative to the outer peripheral surface in the rotating axis direction, and whose diameter decreases as it approaches the imaging element.

APPENDIX 21

The camera module according to Appendix 19,
wherein the outer peripheral surface is a maximum diameter portion of the lens unit.

APPENDIX 22

The camera module according to Appendix 15,
wherein the angle of view of the lens unit is 180 degrees or more.

APPENDIX 23

A waterproof cable penetration part, comprising:
a cable hole provided to a case of a camera module; and
a cable that penetrates the cable hole,
wherein the waterproof cable penetration part further includes an O-ring that is fitted into the cable, and
wherein the cable hole is formed with an O-ring housing part for housing the O-ring and having a side surface that is adjacent to an outer peripheral surface of the O-ring.

APPENDIX 24

The waterproof cable penetration part according to Appendix 23,
wherein, of the O-ring housing part, an outward portion in a longitudinal direction of a penetration portion of the cable is formed with a cone-shaped surface whose diameter increases outward along the longitudinal direction.

APPENDIX 25

The waterproof cable penetration part according to Appendix 23,
including a cable hole that is penetrated by the cable, and further including a cover for covering the O-ring housing part.

APPENDIX 26

The waterproof cable penetration part according to Appendix 25,
wherein the cover is fixed to the case with a bolt.

APPENDIX 27

The waterproof cable penetration part according to Appendix 25,
wherein, of the case, a male screw is formed at a portion that is positioned outside relative to the O-ring housing part, and
wherein the cover is formed with a female screw that is screwed with the male screw.

APPENDIX 28

The waterproof cable penetration part according to Appendix 25,
wherein, of the case, a female screw is formed at a portion that is positioned outward in a longitudinal direction of a penetration portion of the cable relative to the O-ring housing part, and
wherein the cover is formed with a male screw that is screwed with the female screw.

APPENDIX 29

The waterproof cable penetration part according to Appendix 25,
wherein a convex part protruding in a direction that intersects with a longitudinal direction of a penetration portion of the cable is formed to one of the case and the cover, and
wherein a concave part that is hollowed in a direction that intersects with a longitudinal direction of a penetration portion of the cable is formed to the other one of the case and cover.

APPENDIX 30

The waterproof cable penetration part according to Appendix 23,
wherein the case is formed with a corner part that is positioned inward of the cable hole, and wherein the cable has a bending part that is bent along the corner part.

APPENDIX 31

A camera module, comprising:
a lens unit including one or more lenses;
a case for retaining the lens unit;
an imaging element which is retained by the case and which receives light through the lens; and
the waterproof cable penetration part according to Appendix 23.

APPENDIX 32

The camera module according to Appendix 31,
wherein the lens unit is formed with a male screw having as a rotating axis thereof an optical axis of the lens, and an outer peripheral surface that is parallel to the rotating axis,
wherein the case is formed with a female screw that is screwed with the male screw of the lens unit, and an inner peripheral surface that faces the outer peripheral surface of the lens unit, and
wherein the camera module further includes an O-ring sandwiched between the inner peripheral surface and the outer peripheral surface.

APPENDIX 33

The camera module according to Appendix 32,
wherein the outer peripheral surface is a bottom surface of an annular groove that is formed on the lens unit.

APPENDIX 34

The camera module according to Appendix 32,
wherein the case is formed with a cone-shaped surface which is adjacent to a side opposite to the imaging element relative to the inner peripheral surface in the rotating axis direction, and whose diameter increases as it recedes from the imaging element.

The invention claimed is:

1. A vehicle-mounted camera, comprising:
an imaging device mounted on a vehicle; and
a reflector occupying at least a part of an imaging range of the imaging device,
wherein the imaging device comprises:
an imaging element;
an illuminator for illuminating at least a part of an imaging area that is imaged by the imaging element, wherein the illuminator is a camera module having a plurality of LED modules each including an LED chip, the LED modules having mutually different main emitting directions;
a case for housing the imaging element, wherein the case is provided with a plurality of retention holes for retaining the plurality of LED modules, wherein each of the LED modules comprises a translucent head with the LED chip built therein, and a lead that establishes electrical continuity with the LED chip; each of the retention holes includes a head housing part which houses the translucent head and in which a depth direction thereof coincides with the main emitting direction of the LED module; and the lead housing part includes a root part which is connected to the head housing part and which extends in the main emitting direction, and a tip part that extends in a direction that is different from the direction extended from the root part.

2. The vehicle-mounted camera according to claim 1, wherein the imaging device and the reflector are both disposed in the vehicle.

3. The vehicle-mounted camera according to claim 2, wherein the imaging device is facing a forward vehicle traveling direction, and the reflector occupies a lower part of a vertical direction in the imaging range of the imaging device.

4. The vehicle-mounted camera according to claim 3, further comprising a light shield adjacent to an upper part of a vertical direction of the reflector in the imaging range of the imaging device.

5. The vehicle-mounted camera according to claim 3, wherein a range, outside a vehicle, in a reverse vehicle traveling direction is reflected on the reflector.

6. The vehicle-mounted camera according to claim 3, wherein a passenger seated in a backseat in the vehicle is reflected on the reflector.

7. The vehicle-mounted camera according to claim 2, further comprising a transparent bracket disposed in the forward vehicle traveling direction relative to the imaging device to face the imaging device, wherein the reflector is mounted on the transparent bracket.

8. The vehicle-mounted camera according to claim 7, wherein the transparent bracket includes a facing part that squarely faces the imaging device in a forward vehicle direction, a circuit part that extends from a forward vehicle direction relative to the imaging device to a reverse vehicle direction via an upper part of the vertical direction, and a posterior part that is positioned in the reverse vehicle direction relative to the imaging device and supports the imaging device.

9. The vehicle-mounted camera according to claim 7, wherein the transparent bracket is provided with a light shield adjacent to an upper part of a vertical direction of the reflector.

10. The vehicle-mounted camera according to claim 2, wherein the reflector assumes a position occupying a lower part of a vertical direction in the imaging range of the imaging device, and a position withdrawn from the imaging device.

11. The vehicle-mounted camera according to claim 1, wherein the imaging device is disposed in the vehicle, and the reflector is disposed outside the vehicle.

12. The vehicle-mounted camera according to claim 11, wherein the imaging device is disposed on an inner side of a vehicle window in a position of imaging outside the vehicle through the window, and the reflector is disposed at a position facing the imaging device, with the window interposed therebetween.

13. The vehicle-mounted camera according to claim 12, wherein an underside portion of the vehicle and the road are reflected on the reflector.

14. The vehicle-mounted camera according to claim 12, wherein the imaging device is a portable phone equipped with an imaging function.

15. The vehicle-mounted camera according to claim 11, wherein the imaging device is disposed at a position that is spaced from a rear vehicle window in the forward vehicle traveling direction, and the reflector is mounted on an outer side of the window.

16. The vehicle-mounted camera according to claim 1, wherein the lead housing part has a cross-section size that is smaller than that of the translucent head.

17. The vehicle-mounted camera according to claim 1, wherein the lead housing part has a cross-section size that is larger than that of the translucent head.

18. The vehicle-mounted camera according to claim 1, further comprising a substrate mounted with the plurality of LED modules, wherein each of the tip parts of the plurality of retention holes is orthogonal to the substrate.

19. The vehicle-mounted camera according to claim 1, wherein the illuminator includes an optical component for bending light from the LED module.

20. The vehicle-mounted camera according to claim 19, further comprising a wide-angle lens for converging light at the imaging element, wherein the optical component is a wide angle prism for widening the angle of light from the LED module.

21. The vehicle-mounted camera according to claim 20, wherein the wide angle prism is formed so that light from the LED module is bent more as the prism recedes from the wide-angle lens in a first direction that is orthogonal to an optical axis direction of the wide-angle lens.

22. The vehicle-mounted camera according to claim 20, wherein the wide angle prism is formed so that bend light from the LED module is bent more at the edge than the center in a second direction that is orthogonal to the optical axis direction and the first direction.

23. The vehicle-mounted camera according to claim 19, further comprising a narrow-angle lens for converging light at the imaging element, wherein the optical component includes a convex lens part for narrowing the angle of light from the LED module.

24. The vehicle-mounted camera according to claim 23, wherein each of the convex lens parts is formed to overlap with any one of the plurality of LED modules in an optical axis directional vision of the narrow-angle lens.

* * * * *